US010120078B2

(12) United States Patent
Bruder et al.

(10) Patent No.: US 10,120,078 B2
(45) Date of Patent: *Nov. 6, 2018

(54) DETECTOR HAVING A TRANSVERSAL OPTICAL SENSOR AND A LONGITUDINAL OPTICAL SENSOR

(71) Applicant: BASF SE, Ludwigshafen (DE)

(72) Inventors: Ingmar Bruder, Mutterstadt (DE); Simone Christina Spiller, Mannheim (DE); Erwin Thiel, Siegen (DE); Stephan Irle, Siegen (DE); Robert Send, Karlsruhe (DE); Henrike Wonneberger, Mannheim (DE)

(73) Assignee: BASF SE, Ludwigshafen (DE)

( * ) Notice: Subject to any disclaimer, the term of this patent is extended or adjusted under 35 U.S.C. 154(b) by 179 days.

This patent is subject to a terminal disclaimer.

(21) Appl. No.: 15/099,717

(22) Filed: Apr. 15, 2016

(65) Prior Publication Data

US 2016/0266257 A1  Sep. 15, 2016

Related U.S. Application Data

(63) Continuation of application No. 14/132,570, filed on Dec. 18, 2013, now Pat. No. 9,389,315.
(Continued)

(51) Int. Cl.
*G01S 17/89* (2006.01)
*G01S 17/46* (2006.01)
(Continued)

(52) U.S. Cl.
CPC .............. *G01S 17/89* (2013.01); *G01C 3/06* (2013.01); *G01S 3/781* (2013.01); *G01S 3/786* (2013.01);
(Continued)

(58) Field of Classification Search
CPC ........ G01S 3/781; G01S 17/89; G01S 7/4816; G01S 3/786; G01S 17/66; G01S 17/026;
(Continued)

(56) References Cited

U.S. PATENT DOCUMENTS

| 3,035,176 A | 5/1962 | Kis et al. |
| 3,112,197 A | 11/1963 | Neugebauer et al. |

(Continued)

FOREIGN PATENT DOCUMENTS

| CA | 1065054 | 10/1979 |
| CA | 2196563 | 12/1996 |

(Continued)

OTHER PUBLICATIONS

International Search Report dated Mar. 21, 2016, in PCT/IB2015/059406.
(Continued)

*Primary Examiner* — Que T Le
*Assistant Examiner* — Jennifer Bennett
(74) *Attorney, Agent, or Firm* — Oblon, McClelland, Maier & Neustadt, L.L.P.

(57) ABSTRACT

A detector having a transversal optical sensor adapted to determine a transversal position of at least one light beam traveling from an object to the detector and a longitudinal optical sensor having at least one sensor region. The longitudinal optical sensor is designed to affect at least one longitudinal sensor signal in a manner dependent on an illumination of the sensor region by the light beam. The longitudinal sensor signal, given the same total power of the illumination, is dependent on a beam cross-section of the light beam in the sensor region.

31 Claims, 8 Drawing Sheets

Related U.S. Application Data

(60) Provisional application No. 61/739,173, filed on Dec. 19, 2012, provisional application No. 61/749,964, filed on Jan. 8, 2013, provisional application No. 61/867,169, filed on Aug. 19, 2013.

(51) Int. Cl.
```
G01S 7/481      (2006.01)
G01S 3/786      (2006.01)
G01S 3/781      (2006.01)
G01S 17/66      (2006.01)
G01C 3/06       (2006.01)
```

(52) U.S. Cl.
CPC ............ *G01S 7/4816* (2013.01); *G01S 17/46* (2013.01); *G01S 17/66* (2013.01)

(58) Field of Classification Search
CPC ............... G01S 3/7864; G06T 7/2033; G06T 2207/10016; H04N 7/181; H04N 5/144; H04N 5/232; G01C 3/06; G06F 3/04883; G06F 3/017
See application file for complete search history.

(56) References Cited

U.S. PATENT DOCUMENTS

| | | |
|---|---|---|
| 3,384,752 A | 5/1968 | Odone |
| 3,562,785 A | 2/1971 | Craig |
| 3,937,950 A | 2/1976 | Hosoe et al. |
| 3,954,340 A | 5/1976 | Blomqvist et al. |
| 4,023,033 A | 5/1977 | Bricot et al. |
| 4,053,240 A | 10/1977 | Aizawa et al. |
| 4,079,247 A | 3/1978 | Briscot et al. |
| 4,256,513 A | 3/1981 | Yoshida |
| 4,286,035 A | 8/1981 | Nishizima et al. |
| 4,469,945 A | 9/1984 | Hoeberechts et al. |
| 4,524,276 A | 6/1985 | Ohtombe |
| 4,565,761 A | 1/1986 | Katagiri et al. |
| 4,593,187 A | 6/1986 | Grotts et al. |
| 4,603,258 A | 7/1986 | Sher et al. |
| 4,647,193 A | 3/1987 | Rosenfeld |
| 4,675,535 A | 6/1987 | Tsunekawa et al. |
| 4,694,172 A | 9/1987 | Powell et al. |
| 4,760,004 A | 7/1988 | Rochat et al. |
| 4,760,151 A | 7/1988 | Rochat et al. |
| 4,767,211 A | 8/1988 | Munakata et al. |
| 4,773,751 A | 9/1988 | Matsuda et al. |
| 4,927,721 A | 5/1990 | Gratzel et al. |
| 4,952,472 A | 8/1990 | Baranyi et al. |
| 5,082,363 A | 1/1992 | Nakanishi et al. |
| 5,216,476 A | 6/1993 | Lanckton |
| 5,350,644 A | 9/1994 | Gratzel et al. |
| 5,589,928 A | 12/1996 | Babbitt et al. |
| 5,856,844 A | 1/1999 | Batterman et al. |
| 6,266,142 B1 | 7/2001 | Junkins et al. |
| 6,359,211 B1 | 3/2002 | Spitler et al. |
| 6,512,233 B1 | 1/2003 | Sato et al. |
| 6,930,297 B1 | 8/2005 | Nakamura |
| 6,995,445 B2 | 2/2006 | Forrest et al. |
| 7,022,966 B2 | 4/2006 | Gonzo et al. |
| 7,049,601 B2 | 5/2006 | Agano |
| 7,196,317 B1 | 3/2007 | Meissner et al. |
| 7,247,851 B2 | 7/2007 | Okada et al. |
| 7,301,608 B1 | 11/2007 | Mendenhall et al. |
| 7,417,716 B2 | 8/2008 | Nagasaka et al. |
| 7,626,569 B2 | 12/2009 | Lanier |
| 7,677,742 B2 | 3/2010 | Hillmer et al. |
| 7,768,498 B2 | 8/2010 | Wey |
| 7,773,070 B2 | 8/2010 | Trisnadi et al. |
| 8,013,901 B2 | 9/2011 | Fukuhara et al. |
| 8,019,166 B2 | 9/2011 | Cheng et al. |
| 8,144,173 B2 | 3/2012 | Baba |
| 8,228,299 B1 | 7/2012 | Maloney et al. |
| 8,231,809 B2 | 7/2012 | Pschirer et al. |
| 8,345,003 B1 | 1/2013 | Trisnadi et al. |
| 8,363,526 B2 | 1/2013 | Hotta et al. |
| 8,390,793 B2 | 3/2013 | Yamaguchi et al. |
| 8,411,289 B2 | 4/2013 | Takahashi |
| 8,477,580 B2 | 7/2013 | Yamamoto et al. |
| 8,563,855 B2 | 10/2013 | Pschirer et al. |
| 8,593,565 B2 | 11/2013 | Shuster |
| 8,902,354 B2 | 12/2014 | Shuster |
| 8,908,157 B2 | 12/2014 | Eisele et al. |
| 9,104,910 B2 | 8/2015 | Huang |
| 9,385,326 B2 | 7/2016 | Wonneberger et al. |
| 9,389,315 B2 | 7/2016 | Bruder et al. |
| 9,428,518 B2 | 8/2016 | Wonneberger et al. |
| 9,557,856 B2 | 1/2017 | Send et al. |
| 9,665,182 B2 | 5/2017 | Send et al. |
| 9,741,954 B2 | 8/2017 | Bruder et al. |
| 9,829,564 B2 | 11/2017 | Bruder et al. |
| 9,958,535 B2 | 5/2018 | Send et al. |
| 9,989,623 B2 | 6/2018 | Send et al. |
| 2001/0025938 A1 | 10/2001 | Imai |
| 2002/0011576 A1 | 1/2002 | Cho et al. |
| 2003/0017360 A1 | 1/2003 | Tai et al. |
| 2003/0094607 A1 | 5/2003 | Guenther et al. |
| 2003/0128351 A1 | 7/2003 | Schmidt |
| 2003/0132391 A1 | 7/2003 | Agano |
| 2003/0227635 A1 | 12/2003 | Muller |
| 2004/0178325 A1 | 9/2004 | Forrest et al. |
| 2004/0216625 A1 | 11/2004 | Birnstock et al. |
| 2005/0052120 A1 | 3/2005 | Gupta et al. |
| 2005/0184301 A1 | 8/2005 | Nagasaka et al. |
| 2005/0217720 A1 | 10/2005 | Rey-Mermet et al. |
| 2005/0268957 A1 | 12/2005 | Enomoto et al. |
| 2005/0269616 A1 | 12/2005 | Andriessen |
| 2006/0049397 A1 | 3/2006 | Pfeiffer et al. |
| 2006/0082546 A1 | 4/2006 | Wey |
| 2007/0008515 A1 | 1/2007 | Otani et al. |
| 2007/0010924 A1 | 1/2007 | Otani et al. |
| 2007/0080925 A1 | 4/2007 | Radivojevic et al. |
| 2007/0109558 A1 | 5/2007 | Harding |
| 2007/0122927 A1 | 5/2007 | Li et al. |
| 2007/0176165 A1 | 8/2007 | Forrest et al. |
| 2008/0080789 A1 | 4/2008 | Marks |
| 2008/0157965 A1 | 7/2008 | Shahar |
| 2008/0259310 A1 | 10/2008 | Wada |
| 2008/0269482 A1 | 10/2008 | Pschirer et al. |
| 2008/0297487 A1 | 12/2008 | Hotelling et al. |
| 2009/0009747 A1 | 1/2009 | Wolf |
| 2009/0046543 A1 | 2/2009 | De Hoog et al. |
| 2009/0097010 A1 | 4/2009 | Yamaguchi |
| 2009/0153841 A1 | 6/2009 | Ophey et al. |
| 2009/0185158 A1 | 7/2009 | Wolf |
| 2009/0188547 A1 | 7/2009 | Hayashi et al. |
| 2009/0225319 A1 | 9/2009 | Lee |
| 2009/0231582 A1 | 9/2009 | Aebischer |
| 2010/0073462 A1 | 3/2010 | Lee et al. |
| 2010/0091263 A1 | 4/2010 | Kumagai et al. |
| 2010/0141964 A1 | 6/2010 | Horsch |
| 2010/0194942 A1 | 8/2010 | Wada |
| 2010/0231513 A1 | 9/2010 | Deliwala |
| 2010/0258179 A1 | 10/2010 | Wieting |
| 2010/0279458 A1 | 11/2010 | Yeh |
| 2010/0282309 A1 | 11/2010 | Pschirer et al. |
| 2010/0283868 A1 | 11/2010 | Clark et al. |
| 2010/0297405 A1 | 11/2010 | Flores et al. |
| 2011/0055846 A1 | 3/2011 | Perez et al. |
| 2011/0096319 A1 | 4/2011 | Otani et al. |
| 2011/0099105 A1 | 4/2011 | Menne et al. |
| 2011/0103215 A1 | 5/2011 | Hotta et al. |
| 2011/0123188 A1 | 5/2011 | Cardwell et al. |
| 2011/0194097 A1 | 8/2011 | Yamaguchi et al. |
| 2011/0284756 A1 | 11/2011 | Miko et al. |
| 2011/0297235 A1 | 12/2011 | Bergmann |
| 2011/0306413 A1 | 12/2011 | Bickerstaff et al. |
| 2011/0317146 A1 | 12/2011 | Gu et al. |
| 2012/0061587 A1 | 3/2012 | Wu |
| 2012/0063287 A1 | 3/2012 | Yamamoto et al. |
| 2012/0206336 A1 | 8/2012 | Bruder |
| 2012/0242867 A1 | 9/2012 | Shuster |
| 2012/0249998 A1 | 10/2012 | Eisele et al. |

(56) References Cited

U.S. PATENT DOCUMENTS

| | | |
|---|---|---|
| 2012/0250137 A1 | 10/2012 | Maxik et al. |
| 2012/0262365 A1 | 10/2012 | Mallinson |
| 2012/0262696 A1 | 10/2012 | Eisele et al. |
| 2012/0289672 A1 | 11/2012 | Kastler et al. |
| 2013/0076695 A1 | 3/2013 | Gomez et al. |
| 2013/0135604 A1 | 5/2013 | Gogolla et al. |
| 2013/0201492 A1 | 8/2013 | Takahashi |
| 2013/0222551 A1 | 8/2013 | Shamir et al. |
| 2013/0235390 A1 | 9/2013 | Holzapfel et al. |
| 2013/0271818 A1 | 10/2013 | Maxik et al. |
| 2014/0015242 A1 | 1/2014 | Forrest |
| 2014/0066656 A1 | 3/2014 | Bruder et al. |
| 2014/0078376 A1 | 3/2014 | Shuster |
| 2014/0132724 A1 | 5/2014 | Choi et al. |
| 2014/0209789 A1 | 7/2014 | Hu |
| 2014/0211295 A1 | 7/2014 | Maxik et al. |
| 2014/0217329 A1 | 8/2014 | Hayoz et al. |
| 2014/0291480 A1 | 10/2014 | Bruder et al. |
| 2014/0347442 A1 | 11/2014 | Wang et al. |
| 2015/0085166 A1 | 3/2015 | Shuster |
| 2015/0111337 A1 | 4/2015 | Welker et al. |
| 2015/0124241 A1 | 5/2015 | Eisele et al. |
| 2015/0124268 A1 | 5/2015 | Bruder et al. |
| 2015/0132887 A1 | 5/2015 | Welker et al. |
| 2015/0286340 A1 | 10/2015 | Send et al. |
| 2015/0372046 A1 | 12/2015 | Kim et al. |
| 2016/0099429 A1 | 4/2016 | Bruder et al. |
| 2016/0124074 A1 | 5/2016 | Wonneberger et al. |
| 2016/0127664 A1 | 5/2016 | Bruder et al. |
| 2016/0139243 A1 | 5/2016 | Send et al. |
| 2016/0140786 A1 | 5/2016 | Wang |
| 2016/0155575 A1 | 6/2016 | Yamato et al. |
| 2016/0177177 A1 | 6/2016 | Koenemann et al. |
| 2016/0211464 A1 | 7/2016 | Tanabe et al. |
| 2016/0218302 A1 | 7/2016 | Hermes et al. |
| 2016/0248021 A1 | 8/2016 | Sundarraj et al. |
| 2016/0266257 A1 | 9/2016 | Bruder et al. |
| 2016/0364015 A1 | 12/2016 | Send et al. |
| 2017/0039793 A1 | 2/2017 | Send et al. |
| 2017/0074652 A1 | 2/2017 | Send et al. |
| 2017/0082426 A1 | 3/2017 | Bruder et al. |
| 2017/0082486 A1 | 3/2017 | Send et al. |
| 2017/0123593 A1 | 5/2017 | Send et al. |
| 2017/0183295 A1 | 6/2017 | Koenemann et al. |
| 2017/0205230 A1 | 7/2017 | Send et al. |
| 2017/0219694 A1 | 8/2017 | Send et al. |
| 2017/0219709 A1 | 8/2017 | Send et al. |
| 2017/0237926 A1 | 8/2017 | Bruder et al. |
| 2017/0363465 A1 | 12/2017 | Send et al. |
| 2017/0363741 A1 | 12/2017 | Send et al. |
| 2018/0003993 A1 | 1/2018 | Send et al. |
| 2018/0007343 A1 | 1/2018 | Send et al. |
| 2018/0017679 A1 | 1/2018 | Valouch et al. |
| 2018/0031672 A1 | 2/2018 | Bruder et al. |
| 2018/0067213 A1 | 3/2018 | Send et al. |
| 2018/0136319 A1 | 5/2018 | Send et al. |

FOREIGN PATENT DOCUMENTS

| | | |
|---|---|---|
| CN | 1270706 | 10/2000 |
| CN | 1677053 A | 10/2005 |
| CN | 1723564 A | 1/2006 |
| CN | 1809801 A | 7/2006 |
| CN | 1894976 | 1/2007 |
| CN | 1896686 A | 1/2007 |
| CN | 101129074 | 2/2008 |
| CN | 101290348 A | 10/2008 |
| CN | 101449181 | 6/2009 |
| CN | 101650173 A | 2/2010 |
| CN | 1016555350 | 2/2010 |
| CN | 101859439 A | 10/2010 |
| CN | 102096962 | 6/2011 |
| CN | 201897828 | 7/2011 |
| CN | 102435136 | 5/2012 |
| CN | 102506754 A | 6/2012 |
| CN | 102549380 | 7/2012 |
| CN | 102549381 A | 7/2012 |
| CN | 102737435 | 10/2012 |
| CN | 103106411 A | 5/2013 |
| CN | 103322910 A | 9/2013 |
| CN | 103492835 | 1/2014 |
| CN | 103649677 | 3/2014 |
| DE | 2 417 854 | 10/1974 |
| DE | 25 01 124 A1 | 8/1975 |
| DE | 32 25 372 A1 | 2/1983 |
| DE | 196 04 856 | 8/1997 |
| DE | 10146752 | 4/2002 |
| DE | 10 2005 043 627 A1 | 3/2007 |
| DE | 10 2005 053 995 A1 | 5/2007 |
| DE | 10 2007 037 875 A1 | 2/2009 |
| DE | 10 2010 042 278 | 4/2012 |
| EP | 0 112 169 A2 | 6/1984 |
| EP | 0 185 450 A2 | 6/1986 |
| EP | 0 754 930 A2 | 1/1997 |
| EP | WO 01/29576 A1 | 4/2001 |
| EP | 1 176 646 A1 | 1/2002 |
| EP | 1 191 819 | 3/2002 |
| EP | 1 330 117 | 7/2003 |
| EP | 1 667 246 A1 | 6/2006 |
| EP | 1 832 910 | 9/2007 |
| EP | 2 205 657 | 7/2010 |
| EP | 2 220 141 | 8/2010 |
| EP | 2 507 286 | 10/2012 |
| EP | 2 527 866 A1 | 11/2012 |
| EP | 2 725 617 | 4/2014 |
| EP | 2 813 324 | 12/2014 |
| EP | 2 818 493 A1 | 12/2014 |
| EP | 2 831 180 | 2/2015 |
| EP | 3 008 421 | 4/2016 |
| EP | 3 008 757 | 4/2016 |
| EP | 3 036 503 | 6/2016 |
| GB | 2 432 723 | 5/2007 |
| JP | S59-50579 | 3/1984 |
| JP | S61-135280 | 6/1986 |
| JP | 61-186804 | 8/1986 |
| JP | H02-170004 | 6/1990 |
| JP | 5-48833 A | 2/1993 |
| JP | 8-159714 | 6/1996 |
| JP | 8-292586 A | 11/1996 |
| JP | 10-26513 A | 1/1998 |
| JP | 10-221064 | 8/1998 |
| JP | H11-230860 | 8/1999 |
| JP | 11-257917 | 9/1999 |
| JP | 2001-516150 | 9/2001 |
| JP | 2002-176191 | 6/2002 |
| JP | 2003-307407 | 10/2003 |
| JP | 2004-508691 | 3/2004 |
| JP | 2005-509909 | 4/2005 |
| JP | 2005-241340 A | 9/2005 |
| JP | 2007-521559 | 8/2007 |
| JP | 2007-530978 | 11/2007 |
| JP | 2008-522418 | 6/2008 |
| JP | 2010-218770 | 9/2010 |
| JP | 2010-531520 | 9/2010 |
| JP | 2011-027707 | 2/2011 |
| JP | 2012-522248 | 9/2012 |
| JP | 2012-229964 | 11/2012 |
| JP | 2012-231154 | 11/2012 |
| JP | 2013-051674 | 3/2013 |
| TW | 2011-40111 A | 11/2011 |
| WO | 99-09603 | 2/1999 |
| WO | WO 02/101838 A1 | 12/2002 |
| WO | 03/012371 A1 | 2/2003 |
| WO | WO 2004/114112 A1 | 12/2004 |
| WO | WO 2005/106965 | 11/2005 |
| WO | WO 2005/106965 A1 | 11/2005 |
| WO | WO 2007/054470 A1 | 5/2007 |
| WO | WO 2009/013282 A1 | 1/2009 |
| WO | WO 2009/053291 A1 | 4/2009 |
| WO | WO 2009/058115 A1 | 5/2009 |
| WO | WO 2010/088032 A2 | 8/2010 |
| WO | WO 2010/094636 A1 | 8/2010 |
| WO | WO 2011/067192 A2 | 6/2011 |
| WO | WO 2011/083722 | 7/2011 |

(56) References Cited

FOREIGN PATENT DOCUMENTS

| | | |
|---|---|---|
| WO | WO 2012/001628 A1 | 1/2012 |
| WO | WO 2012/046181 A1 | 4/2012 |
| WO | WO 2012/049038 | 4/2012 |
| WO | WO 2012/085803 A1 | 6/2012 |
| WO | WO 2012/110924 A1 | 8/2012 |
| WO | WO 2012/139354 | 10/2012 |
| WO | 2012/152812 A1 | 11/2012 |
| WO | 2012/168395 A1 | 12/2012 |
| WO | WO 2006/134370 | 12/2012 |
| WO | WO 2013/009676 | 1/2013 |
| WO | WO 2013/091016 A1 | 6/2013 |
| WO | 2013/118037 A1 | 8/2013 |
| WO | WO 2013/144177 A1 | 10/2013 |
| WO | 2013/170982 A1 | 11/2013 |
| WO | 2014/086722 A1 | 6/2014 |
| WO | 2014/097489 A1 | 6/2014 |
| WO | WO 2014/097181 A1 | 6/2014 |
| WO | 2014/178923 A2 | 11/2014 |
| WO | 2014/078155 A1 | 12/2014 |
| WO | 2014/198623 A1 | 12/2014 |
| WO | 2014/198626 A1 | 12/2014 |
| WO | 2014/198629 A1 | 12/2014 |
| WO | 2015/024871 A1 | 2/2015 |
| WO | WO 2015/091607 | 6/2015 |
| WO | WO 2015/159192 | 10/2015 |
| WO | WO 2015/161989 | 10/2015 |
| WO | WO 2015/162528 | 10/2015 |
| WO | 2015/193804 A2 | 12/2015 |
| WO | 2016/005893 A1 | 1/2016 |
| WO | 2016/092454 A1 | 6/2016 |
| WO | WO 2016/146725 | 9/2016 |

OTHER PUBLICATIONS

International Search Report and Written Opinion in PCT/IB2015/059411 dated Mar. 16, 2016 filed Dec. 7, 2015.
Nam-Trung Nguyen, "Micro-optotfluidic Lenses: A review", Biomicrofluidics, 2010, vol. 4, 031501-15.
Uriel Levy et al., "Tunable optofluidic devices", Microfluid Nanofluid, 2008, vol. 4, pp. 97-105.
International Search Report and Written Opinion dated Mar. 15, 2016 in PCT/IB2015/059404 filed Dec. 7, 2015.
International Search Report and Written Opinion dated Mar. 21, 2016, in PCT/IB2015/059403, filed Dec. 7, 2015.
International Search Report dated Mar. 22, 2016 in PCT/IB2015/059408 filed Dec. 7, 2015.
International Search Report and Written Opinion of the International Searching Authority dated Mar. 12, 2015 in PCT/EP2014/078155 Filed Dec. 17, 2014.
Extended Search Report dated Aug. 23, 2011 in Europe Application No. 11154531.5 (With English Translation of Category of Cited Documents).
Erwin Bacher, et al., "Synthesis and Characterization of Photo-Cross-Linkable Hole-Conducting Polymers", Macromolecules, vol. 38, 2005, pp. 1640-1647.
H. Bruce Goodbrand, et al., "Ligand-Accelerated Catalysis of the Ullmann Condensation: Application to Hole Conducting Triarylamines", J. Org. Chem., vol. 64, 1999, pp. 670-674.
Felix E. Goodson, et al., "Palladium-Catalyzed Synthesis of Pure, Regiodefined Polymeric Triarylamines", J. Am. Chem. Soc., vol. 121, 1999, pp. 7527-7539.
John F. Hartwig, "Transition Metal Catalyzed Synthesis of Arylamines and Aryl Ethers from Aryl Halides and Triflates: Scope and Mechanism", Angew. Chem. Int. Ed., vol. 37, 1998, pp. 2046-2067.
Sheila I. Hauck, et al.. "Tetraazacyclophanes by Palladium-Catalyzed Aromatic Amination. Geometrically Defined, Stable, High-Spin Diradicals", Organic Letters, vol. 1, No. 13, 1999, pp. 2057-2060.
Ping-Hsin Huang, et al., "Synthesis and Characterization of new fluorescent two-photon absorption chromophores", J. Mater. Chem., vol. 16, 2006, pp. 850-857.

Qinglan Huang, et al., "Molecularly 'Engineered' Anode Adsorbates for Probing OLED Interfacial Structure—Charge Injection/Luminance Relationships: Large. Structure-Dependent Effects", J. Am. Chem. Soc., vol. 125, 2003, pp. 14704-14705.
A. Balionyte, et al., "Carbazolyl-substituted triphenyldiamine derivatives as novel photoconductive amorphous molecular materials", Journal of Photochemistry and Photobiology A: Chemistry, vol. 162, 2004, pp. 249-252.
John P. Wolfe, et al., "Rational Development of Practical Catalysts for Aromatic Carbon-Nitrogen Bond Formation", Acc. Chem. Res. vol. 31, 1998, pp. 805-818.
Bryant H. Yang, et al.. "Palladium-Catalyzed amination of aryl halides and sulfonates", Journal of Organometallic Chemistry. vol. 576, 1999, pp. 125-146.
James Lindley, "Copper Assisted Nucleophilic Substitution of Aryl Halogen", Tetrahedron, vol. 40, No. 9, 1984, pp. 1433-1456.
Yunqi Liu, et al., "Synthesis and characterization of a novel bipolar polymer for light-emitting diodes", Chem. Commun., vol. 24, 1998, pp. 2747-2748.
Narukuni Hirata, et al., "Interface engineering for solid-state dye-sensitised nanocrystalline solar cells: the use of an organic redox cascade", Chem. Commun., vol. 5, 2006, pp. 535-537.
Zhong Hui Li, et al., "Synthesis and Functional Properties of Strongly Luminescent Diphenylamino End-Capped Oligophenylenes", J. Org. Chem., vol. 69, 2004, pp. 921-927.
International Search Report dated Sep. 24, 2014 in PCT/EP2014/061682.
Jiun Yi Shen, et al., "High $T_g$ blue emitting materials for electroluminescent devices", J. Mater. Chem., vol. 15, 2005, pp. 2455-2463.
International Preliminary Report on Patentability and Written Opinion dated Dec. 15, 2015 in PCT/EP2014/061682.
International Preliminary Report on Patentability and Written Opinion dated Dec. 23, 2015 in PCT/EP2014/061695.
International Search Report and Written Opinion dated May 31, 2012 in PCT/IB2012/050592 filed on Feb. 9. 2012.
International Search Report dated Sep. 9, 2014 in PCT/EP2014/061688 filed Jun. 5, 2014.
Written Opinion of the International Searching Authority dated Sep. 9, 2014 in PCT/EP2014/061688 filed Jun. 5, 2014.
International Search Report and Written Opinion dated Oct. 31. 2014 in PCT/EP2014/067466 filed Aug. 15, 2014.
Office Action dated Apr. 22, 2015 in Chinese Patent Application No. 201280018328.5 (submitting English translation only).
International Search Report and Written Opinion dated Sep. 3, 2014 in PCT/EP2014/061691.
International Preliminary Report on Patentability dated Sep. 25, 2015 in PCT/EP2014/061691.
Kuthirumal. S., et al., "Flexible Depth of Field Photography," IEEE Transactions on Pattern Analysis and Machine Intelligence, vol. 33, No. 1 (2011), pp. 58-71.
Hiura Shinsaku et al., "Depth Measurement by the Multi-Focus Camera," Computer Vision and Pattern Recognition, 1998. Proceedings. 1998 IEEE Computer Society Conference on Santa Barbara, CA, USA, Jun. 23-25. 1998, pp. 953-959.
Jie-Ci Yang et al., "An Intelligent Automated Door Control System Based on a Smart", Sensors, 2013, 13(5), pp. 5923-5936; doi: 10.3390/s130505923 www.mdpi.com/journal/sensors.
International Preliminary Report on Patentability and Written Opinion dated Dec. 23, 2015 in PCT/EP2014/061688.
Denis Klimentjew, et al., "Multi Sensor Fusion of Camera and 3D Laser Range Finder for Object Recognition" 2010 IEEE International Conference on Multisensor Fusion and Integration for Intelligent Systems, 2010, pp. 236-241.
International Search Report and Written Opinion dated Oct. 31, 2014 in PCT/EP2014/067466.
International Search Report and Written Opinion dated Nov. 21, 2014 in PCT/EP2014/067465.
"So funktioniert die DLP-Technologie" DLP-Technologie—www.dlp.com/de/technology/how-dlp-works, 2014, 2 Pages.
"NEW—Ultra-Compact Pockels Cells with Brewster Polarizer and Waveplate for Laser Q-Switching" Leysop Ltd, Manfacturers and Suppliers of Electro-Optic Components—http://www.leysop.com/integrated_pockels_cell.htm, Aug. 4, 2013, 2 Pages.

(56) References Cited

OTHER PUBLICATIONS

D. Scaramuzza, et al.. "Extrinsic Self Calibration of a Camera and a 3D Laser Range Finder from Natural Scenes" 2007 IEEE/RSJ International Conference on Intelligent Robots and Systems, 2007, 8 pages.
Volker Viereck, et al., "Large-area applications of optical MEMS: micromirror arrays guide daylight, optimize indoor illumination, Optical Components, Photonik International 2, 2009, pp. 48-49.
C.U. Murade, et al., "High speed adaptive liquid microlens array", Optics Express, vol. 20, No. 16, Jul. 2012, pp. 18180-18187.
Jason Heikenfeld, et al., "Recent Progress in Arrayed Electrowetting Optics", Optics & Photonics News, Jan. 2009, 7 pages, www.osa-opn.org.
Tao Peng, "Algorithms and models for 3-D shape measurement using digital fringe projections", Dissertation, University of Maryland (College Park. Md.). Jan. 16, 2007, 268 pages (http://drum.lib.umd.edu/handle/1903/6654; http://en.wikipedia.org/wiki/Gray_code; http://en.wikipedia.org/wiki/Structured-light_3D_scanner).
International Search Report and Written Opinion dated Jan. 18, 2016 in PCT/IB2015/057412 filed Sep. 28, 2015.
International Search Report and Written Opinion dated May 27, 2016, in PCT/EP2016/051817, filed Jan. 28, 2016.
Bahaa E. A. Saleh, et al., "Fundamentais of Photonics" John Wiley & Sons, Inc., Chapter 3, 1991, pp. 80-107 (with Cover Page).
M. R. Andersen, et al., "Kinect Depth Sensor Evaluation for Computer Vision Applications",Electrical and Computer Engineering, Technical Report ECE-TR-6, Aarhus University, 2012, 39 pages.
V. P. S. Perera, et al., "Dye-Sensitized Solid-State Photovoltaic Cells Based on Dye Multilayer-Semiconductor Nanostructures", J. Phys. Chem. B, vol. 107, 2003, pp. 13758-13761.
G. R. A. Kumara, et al., "Fabrication of Dye-Sensitized Solar Cells Using Triethylamine Hydrothiocyanate as a CuI Crystal Growth Inhibitor", Langmuir, vol. 18, 2002, pp. 10493-10495.
Tobat P. I. Saragi, et al., "Comparison of Charge-Carrier Transport in Thin Films of Spiro-Linked Compounds and Their Corresponding Parent Compounds", Adv. Funct. Mater., vol, 16, 2006, pp. 966-974.
Tomas Leijtens, et al., "Hole Transport Materials with Low Glass Transition Temperatures and High Solubility for Application in Solid-State Dye-Sensitized Solar Cells", ACS Nano, vol. 6, No. 2, 2012, pp. 1455-1462.
U. Bach, et al., "Solid-state dye-sensitized mesoporous $TiO_2$ solar cells with high photon-to-electron conversion efficiencies", Nature, vol. 395, No. 6702, Oct. 8, 1998, pp, 583-585.
Bin Peng, et al., "Systematic investigation of the role of compact $TiO_2$ layer in solid state dye-sensitized $TiO_2$ solar cells", Coordination Chemistry Reviews, vol. 248, 2004, pp. 1479-1489.
Brian O'Regan, et al., "A low-cost, high-efficiency solar cell based on dye-sensitized colloidal $TiO_2$ films", Nature, vol. 353, 1991, pp. 737-740.
Takumi Kinoshita, et al., "Wideband dye-sensitized solar cells employing a phosphine-coordinated ruthenium sensitizer", Nature Photonics, vol. 7, 2013, pp. 535-239.
Lukas Schmidt-Mende, et al., "Organic Dye for Highly Efficient Solid-State Dye-Sensitized Solar Cells", Adv. Mater., vol. 17, No. 7, 2005, pp. 813-815.
Qingjiang Yu, et al., "High-Efficiency Dye-Sensitized Solar Cells: The Influence of Lithium Ions on Exciton Dissociation, Charge Recombination, and Surface States", ACS Nano, vol. 4, No. 10, 2010, pp. 6032-6038.
Seigo Ito, et al., "High-Efficiency Organic-Dye-Sensitized Solar Cells Controlled by Nanocrystalline-$TiO_2$ Electrode Thickness", Adv. Mater., vol. 18, 2006, pp. 1202-1205.
International Search Report and Written Opinion of the International Searching Authority dated May 16, 2014 in PCT/IB2013/061095.
Atte Haapalinna, et al., "Measurement of the Absolute Linearity of Photodetectors with a Diode Laser," Meas. Sci. Technol., 10, (1999) 1075-1078.

Supplementary European Search Report dated Nov. 19, 2014, issued in corresponding European Patent Application No. EP 12 74 6808.
Paul Pargas, "Phenomena of Image Sharpness Recognition of CdS and CdSe Photoconductors" Journal of the Optical Society of America, vol. 54, No. 4, Apr. 1964, pp. 516-519.
Paul Pargas, "A Lens Measuring Method Using Photoconductive Cells" Journal of the SMPTE, vol. 74, Jun. 1965, pp. 501-504.
Jack T. Billings, "An Improved Method for Critical Focus of Motion-Picture Optical Printers" Journal of the SMPTE, vol. 80, Aug. 1971, pp. 624-628.
U.S. Appl. No. 15/744,334, filed Jan. 12, 2018, Send, et al.
Wang, Feng-Peng et al., "Distance Measurement using Digital Cameras Based on Laser Spot Detection", published on Jun. 30, 2011, School of Physics and Electronic Information, Gannan Normal University, Ganzhou 341000, China (with English Abstract).
International Search Report dated Aug. 28, 2015, in PCT/IB2015/052769, filed Apr. 16, 2015.
International Search Report and Written Opinion dated Jun. 30, 2015 in PCT/IB15/052233 Filed Mar. 26, 2015.
International Search Report dated Sep. 22, 2015, in Application No. PCT/IB2015/052785, filed on Apr. 16, 2015.
International Search Report dated Nov. 27, 2015, in PCT/IB2015/055121, filed Jul. 7, 2015.
International Search Report and Written Opinion dated Mar. 29, 2016, in PCT/IB32015/054536, filed Jun. 16, 2015.
International Search Report dated May 20, 2016, in PCT/EP2016/054532.
International Preliminary Report on Patentability dated Aug. 1, 2017, in PCT/EP2016/051817.
Linyi Bian, et al., "Recent Progress in the Design of Narrow Bandgap Conjugated Polymers for High-Efficiency Organic Solar Cells", Progress in Polymer Science, vol. 37, 2012, pp. 1292-1331.
Antonio Facchetti, "Polymer donor-polymer acceptor (all-polymer) solar Cells", Materials Today, vol. 16 No. 4, Apr. 2013, pp. 123-132.
Graham H. Carey, et al., "Colloidal Quantum Dot Solar Cells", Chemical Reviews, vol. 115 No. 23, 2015, pp. 12732-12763.
Jason P. Clifford, et al., "Fast, Sensitive and Spectrally Tunable Colloidal Quantum-Dot Photodetectors", Nature Nanotechnology, Jan. 2009, pp. 1-5.
Kotaro Fukushima, et al., "Crystal Structures and Photocarrier Generation of Thioindigo Derivatives", Journal of Physical Chemistry B, vol. 102 No. 31, 1998, pp. 5985-5990.
Serap Günes, et al., "Hybrid Solar Cells", Inorganica Chimica Acta, vol. 361, 2008, pp. 581-588.
R. S. Mane, et al., "Chemical Deposition Method for Metal Chalcogenide Thin Films", Materials Chemistry and Physics, vol. 65, 2000, pp. 1-31.
Wilfried Hermes, "Emerging Thin-Film Photovoltaic Technologies", Chemie Ingenieur Technik, 2015, vol. 87 No. 4, pp. 376-389.
Paul H. Keck, "Photoconductivity in Vacuum Coated Selenium Films", Journal Optical Society of America, vol. 42 No. 4, Apr. 1952, pp. 221-225, with cover page.
Frank H. Moser, et al., "Phthalocyanine Compounds", Reinhold Publishing Corporation, 1963, p. 69-76 with cover pages.
M. Popescu, "Disordered Chalcogenide Optoelectronics and Materials: Phenomena and Applications", Journal of Optoelectronics and Advanced Materials, vol. 7 No. 4, Aug. 2005, pp. 2189-2210.
Friedrich Andreas Sperlich, "Electron Paramagnetic Resonance Spectroscopy of Conjugated Polymers and Fullerenes for Organic Photovoltaics", Julius-Maximilians-Universität Würzburg, 2013, pp. 1-127.
F. Stöckmann, "Superlinear Photoconductivity", Physica Status Solidi, vol. 34, 1969, pp. 751-757.
Evangelos Theocharous, "Absolute Linearity Measurements on a PbS Detector in the Infrared", Applied Optics, vol. 45 No. 11, Apr. 10, 2006, pp. 2381-2386.
Evangelos Theocharous, et al., "Absolute Linearity Measurements on HgCdTe Detectors in the Infrared Region", Applied Optics, vol. 43 No. 21, Jul. 20. 2004, pp. 4182-4188.
Arthur L. Thomas, "Phthalocyanine Research and Applications", CRC Press, 1990, pp. 253-271 with cover pages.
U.S. Appl. No. 15/751,283, filed Feb. 8, 2018, Send, et al.

(56) References Cited

OTHER PUBLICATIONS

Baeg et al., "Organic Light Detectors: Photodiodes and Phototransistors", *Advanced Materials*, vol. 25, No. 31, Mar. 11, 2013, pp. 4267-4295.

Office Action dated Jan. 3, 2018, in Chinese Patent Application No. 201610552144.7 parallel to U.S. Appl. No. 15/364,680.

International Preliminaty Report on Patentability and Written Opinion dated Feb. 22, 2018 in PCT/EP2016/069049).

Office Action dated Mar. 5, 2018, in corresponding Chinese Patent Application No. 201480056299.0.

U.S. Appl. No. 15/775,424, filed May 11, 2018, Send, et al.

U.S. Appl. No. 15/778,454, filed May 23, 2018, Send, et al.

U.S. Appl. No. 15/960,581, filed Apr. 24, 2018, Send, et al.

R. M. Schaffert, "A New High-Sensitivity Organic Photoconductor for Electrophotography", *IBM J. Res. Develop.*, 1971, p. 75-89.

P. Gregory, Ed., *Chemist and Technology of printing and imaging systems*, Chapman & Hall, 1996, Chap, 4, R.S. Gairns, *Electrophotography* p. 76-112.

http://www.plenoptic.info/pages/refocusing.html.

C. Hahne, A. Aggoun, S. Haxha, V. Velisavljevic, and J. Fernández, "Light field geometry of a standard plenoptic camera," Opt. Express 22, 26659-26673 (2014).

C. Hahne, A. Aggoun, S. Haxha, V. Velisavljevic, and J. Fernández, "Baseline of virtual cameras acquired by a standard plenoptic camera setup," in 3D-TV-Conference: The True Vision—Capture, Transmission and Display of 3D Video (3DTV-CON), Jul. 2-4, 2014.

C. Hahne, A. Aggoun, and V. Velisavlievic, "The refocusing distance of a standard plenoptic photograph." in 3D-TV-Conference: The True Vision—Capture, Transmission and Display of 3D Video (3DTV-CON), Jul. 8-10, 2015.

C. Hahne and A. Aggoun, "Embedded FIR filter design for real-time refocusing using a standard plenoptic video camera," Proc. SPIE 9023, in Digital Photography X, 902305 (Mar. 7, 2014).

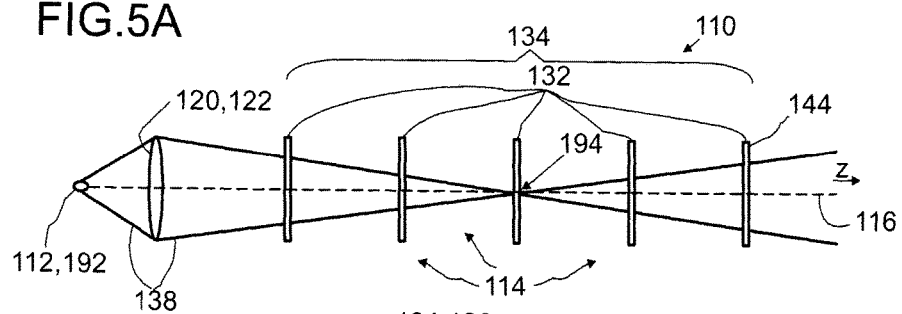
FIG.5A
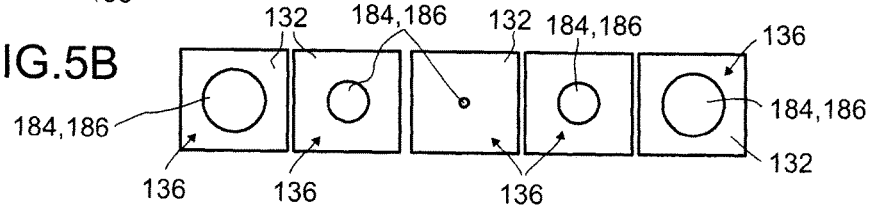
FIG.5B
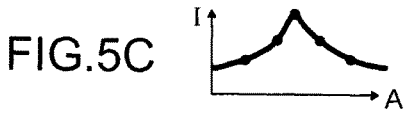
FIG.5C
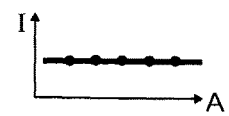
FIG.5D
FIG.5E
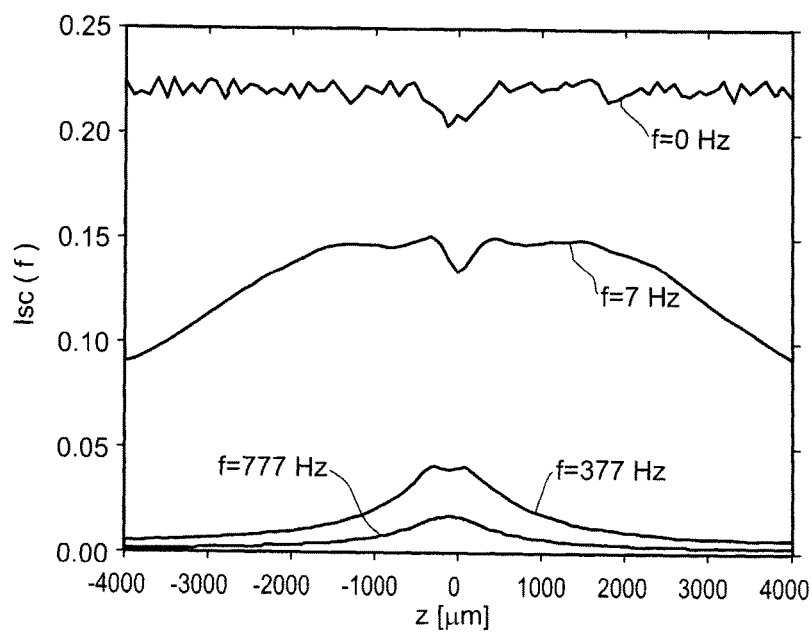

DETECTOR HAVING A TRANSVERSAL OPTICAL SENSOR AND A LONGITUDINAL OPTICAL SENSOR

REFERENCE TO PRIOR APPLICATIONS

This application is a Continuation of U.S. application Ser. No. 14/132,570, filed Dec. 18, 2013, now U.S. Pat. No. 9,389,315; which claims priority to U.S. Provisional application Ser. No. 61/739,173, filed Dec. 19, 2012; U.S. Provisional application Ser. No. 61/749,964, filed Jan. 8, 2013; and U.S. Provisional application Ser. No. 61/867,169, filed Aug. 19, 2013. All of the above applications are incorporated herein by reference in their entireties.

FIELD OF THE INVENTION

The invention relates to a detector for determining a position of at least one object. Furthermore, the invention relates to a human-machine interface, an entertainment device, a tracking system and a camera. Furthermore, the invention relates to a method for optically detecting a position of at least one object and to various uses of the detector. Such devices, methods and uses can be employed for example in various areas of daily life, gaming, traffic technology, production technology, security technology, medical technology or in the sciences. Additionally or alternatively, the application may be applied in the field of mapping of spaces, such as for generating maps of one or more rooms, one or more buildings or one or more streets. However, other applications are also possible in principle.

PRIOR ART

A large number of optical sensors and photovoltaic devices are known from the prior art. While photovoltaic devices are generally used to convert electromagnetic radiation, for example, ultraviolet, visible or infrared light, into electrical signals or electrical energy, optical detectors are generally used for picking up image information and/or for detecting at least one optical parameter, for example, a brightness.

A large number of optical sensors which can be based generally on the use of inorganic and/or organic sensor materials are known from the prior art. Examples of such sensors are disclosed in US 2007/0176165 A1, U.S. Pat. No. 6,995,445 B2, DE 2501124 A1, DE 3225372 A1 or else in numerous other prior art documents. To an increasing extent, in particular for cost reasons and for reasons of large-area processing, sensors comprising at least one organic sensor material are being used, as described for example in US 2007/0176165 A1. In particular, so-called dye solar cells are increasingly of importance here, which are described generally, for example in WO 2009/013282 A1.

As a further example, WO 2013/144177 A1 discloses quinolinium dyes having a fluorinated counter anion, an electrode layer which comprises a porous film made of oxide semiconductor fine particles sensitized with these kinds of quinolinium dyes having a fluorinated counter anion, a photoelectric conversion device which comprises such a kind of electrode layer, and a dye sensitized solar cell which comprises such a photoelectric conversion device.

A large number of detectors for detecting at least one object are known on the basis of such optical sensors. Such detectors can be embodied in diverse ways, depending on the respective purpose of use. Examples of such detectors are imaging devices, for example, cameras and/or microscopes. High-resolution confocal microscopes are known, for example, which can be used in particular in the field of medical technology and biology in order to examine biological samples with high optical resolution. Further examples of detectors for optically detecting at least one object are distance measuring devices based, for example, on propagation time methods of corresponding optical signals, for example laser pulses. Further examples of detectors for optically detecting objects are triangulation systems, by means of which distance measurements can likewise be carried out.

Proceeding from such known detectors and methods for optically detecting objects, it can be ascertained that in many cases a considerable technical outlay has to be implemented in order to carry out this object detection with sufficient precision.

By way of example, in microscopy a considerable outlay in respect of apparatus is required in order to obtain correct focusing of a light beam and/or in order to obtain depth information about the sample to be imaged.

Another example for recording depth detection are active sensors which usually function by emitting a signal and measuring reflections of the signal caused by the at last one object. The active sensors have found a wide dissemination, particularly in applications related to computer vision. M. R. Andersen, T. Jensen, P. Lisouski, A. K. Mortensen, M. K. Hansen, T. Gregersen, and P. Ahrendt, *Kinect Depth Sensor Evaluation for Computer Vision Applications*, Technical report ECE-TR-6, 2012, Dept. of Engineering, Aarhus University, Denmark, describe a depth sensor which projects an infrared (IR) point pattern onto at least one object and measures its reflection pattern by use of an IR camera. According to their study, the authors could observe that this depth sensor required a settling time of approximately 30 seconds from the time the device was powered until a reliable depth signal was acquired, in particular owing to a large amount of computing power being required for performing this kind of procedure. Equivalently, a similar settling time could be observed when the depth sensor was rotated and quickly pointed towards a different scene.

A further problem arises when more than one active sensor is employed for acquiring depth information, particularly for extending a measurement range. As soon as signals which originate from one or more different or identical active sensors overlap, the origin of the signals becomes unidentifiable, so that in the region where the signals overlap no depth information can be recorded. A similar problem arises when two or more active sensors point towards each other. Particularly, since the measurement volume of an optical sensor can be described as an approximate cone, a large measurement volume can only be covered by a number of active sensors which, however, results in overlapping volumes and, thus, uncovered regions.

Distance measurements, by contrast, are based in many cases on technically inadequate assumptions such as, for example, the assumption of a specific size of an object in an image evaluation. Other methods are based in turn on complex pulse sequences, such as, for example, distance measurements by means of laser pulses. Yet other methods are based on the use of a plurality of detectors such as, for example, triangulation methods.

In WO 2005/106965 A1, a setup of an organic solar cell is disclosed. A photo current is generated in response to incident light. Further, a method for producing the organic solar cell is disclosed. Therein, reference is made to the fact that defects or traps may diminish the efficiency of the organic solar cell.

Various position detectors are known in the art. Thus, in JP 8-159714 A, a distance measurement device is disclosed. Therein, by using a detector and a shadow-forming element, a distance between an object and the detector is determined based on the fact that shadow formation of objects depends on the distance. In US 2008/0259310 A1, an optical position detector is disclosed. The position of a transmission system is determined by using a variety of known distances and measured angles. In US 2005/0184301 A1, a distance measurement device is disclosed. The measurement device makes use of a plurality of light-emitting diodes having different wavelengths. In CN 101650173 A, a position detector is disclosed which is based on the use of geometric principles. Further, in JP 10-221064 A, a complex optical setup is disclosed which is similar to optical setups used in holography.

In U.S. Pat. No. 4,767,211, a device and a method for optical measurement and imaging are disclosed. Therein, a ratio of reflected light traveling along an optical axis and reflected light traveling off-axis is determined by using different photo-detectors and a divider. By using this principal, depressions in a sample may be detected.

In U.S. Pat. No. 4,647,193, a range of a target object is determined by using a detector having multiple components. The detector is placed away from a focal plane of a lens. The size of a light spot of light from the object varies with the range of the object and, thus, is dependent on the range of the object. By using different photo-detectors, the size of the light spot and, thus, the range of the object may be determined by comparing signals generated by the photo-detectors.

In U.S. Pat. No. 6,995,445 and US 2007/0176165 A1, a position sensitive organic detector is disclosed. Therein, a resistive bottom electrode, is used which is electrically contacted by using at least two electrical contacts. By forming a current ratio of the currents from the electric contacts, a position of a light spot on the organic detector may be detected.

In US 2007/0080925 A1, a low power consumption display device is disclosed. Therein, photoactive layers are utilized which both respond to electrical energy to allow a display device to display information and which generate electrical energy in response to incident radiation. Display pixels of a single display device may be divided into displaying and generating pixels. The displaying pixels may display information and the generating pixels may generate electrical energy. The generated electrical energy may be used to provide power to drive an image.

U.S. provisional applications 61/739,173, filed on Dec. 19, 2012, and 61/749,964, filed on Jan. 8, 2013, the full content of which is herewith included by reference, disclose a method and a detector for determining a position of at least one object, by using at least one transversal optical sensor and at least one optical sensor. Specifically, the use of sensor stacks is disclosed, in order to determine a longitudinal position of the object with a high degree of accuracy and without ambiguity.

European patent application number EP 13171898.3, filed on Jun. 13, 2013, the full content of which is herewith included by reference, discloses an optical detector comprising an optical sensor having a substrate and at least one photosensitive layer setup disposed thereon. The photosensitive layer setup has at least one first electrode at least one second electrode and at least one photovoltaic material sandwiched in between the first electrode and the second electrode. The photovoltaic material comprises at least one organic material. The first electrode comprises a plurality of first electrode stripes, and the second electrode comprises a plurality of second electrode stripes, wherein the first electrode stripes and the second electrode stripes intersect such that a matrix of pixels is formed at intersections of the first electrode stripes and the second electrode stripes. The optical detector further comprises at least one readout device, the readout device comprising a plurality of electrical measurement devices being connected to the second electrode stripes and a switching device for subsequently connecting the first electrode stripes to the electrical measurement devices.

European patent application number EP 13171900.7, also filed on Jun. 13, 2013, the full content of which is herewith included by reference, discloses a detector device for determining an orientation of at least one object, comprising at least two beacon devices being adapted to be at least one of attached to the object, held by the object and integrated into the object, the beacon devices each being adapted to direct light beams towards a detector, and the beacon devices having predetermined coordinates in a coordinate system of the object. The detector device further comprises at least one detector adapted to detect the light beams traveling from the beacon devices towards the detector and at least one evaluation device, the evaluation device being adapted to determine longitudinal coordinates of each of the beacon devices in a coordinate system of the detector. The evaluation device is further adapted to determine an orientation of the object in the coordinate system of the detector by using the longitudinal coordinates of the beacon devices.

European patent application number EP 13171901.5, filed on Jun. 13, 2013, the full content of which is herewith included by reference, discloses a detector for determining a position of at least one object. The detector comprises at least one optical sensor being adapted to detect a light beam traveling from the object towards the detector, the optical sensor having at least one matrix of pixels. The detector further comprises at least one evaluation device, the evaluation device being adapted to determine a number N of pixels of the optical sensor which are illuminated by the light beam. The evaluation device is further adapted to determine at least one longitudinal coordinate of the object by using the number N of pixels which are illuminated by the light beam.

In WO 2012/110924 A1, on which the present invention is based and the content of which is herewith included by reference, a detector for optically detecting at least one object is proposed. The detector comprises at least one optical sensor. The optical sensor has at least one sensor region. The optical sensor is designed to generate at least one sensor signal in a manner dependent on an illumination of the sensor region. The sensor signal, given the same total power of the illumination, is dependent on a geometry of the illumination, in particular on a beam cross section of the illumination on the sensor area. The detector furthermore has at least one evaluation device. The evaluation device is designed to generate at least one item of geometrical information from the sensor signal, in particular at least one item of geometrical information about the illumination and/or the object.

Despite the advantages implied by the above-mentioned devices and detectors specifically by the detector disclosed in WO 2012/110924 A1, there still is a need for a simple, cost-efficient and, still, reliable spatial detector. Thus, an improved spatial resolution of an object in conjunction with the possibility of tracking the object in space is desirable.

Problem Addressed by the Invention

Therefore, a problem addressed by the present invention is that of specifying devices and methods for optically detecting at least one object which at least substantially avoid the disadvantages of known devices and methods of this type. In particular, an improved detector for determining the position of an object in space and, preferably, for reliably tracking the object in space is desirable.

SUMMARY OF THE INVENTION

This problem is solved by the invention with the features of the independent patent claims. Advantageous developments of the invention, which can be realized individually or in combination, are presented in the dependent claims and/or in the following specification and detailed embodiments.

As used herein, the expressions "have", "comprise" and "contain" as well as grammatical variations thereof are used in a non-exclusive way. Thus, the expression "A has B" as well as the expression "A comprises B" or "A contains B" may both refer to the fact that, besides B, A contains one or more further components and/or constituents, and to the case in which, besides B, no other components, constituents or elements are present in A.

In a first aspect of the present invention, a detector for determining a position of at least one object is disclosed.

The object generally may be an arbitrary object, chosen from a living object and a non-living object. Thus, as an example, the at least one object may comprise one or more articles and/or one or more parts of an article. Additionally or alternatively, the object may be or may comprise one or more living beings and/or one or more parts thereof, such as one or more body parts of a human being, e.g. a user, and/or an animal.

As used herein, a position generally refers to an arbitrary item of information on a location and/or orientation of the object in space. For this purpose, as an example, one or more coordinate systems may be used, and the position of the object may be determined by using one, two, three or more coordinates. As an example, one or more Cartesian coordinate systems and/or other types of coordinate systems may be used. In one example, the coordinate system may be a coordinate system of the detector in which the detector has a predetermined position and/or orientation. As will be outlined in further detail below, the detector may have an optical axis, which may constitute a main direction of view of the detector. The optical axis may form an axis of the coordinate system, such as a z-axis. Further, one or more additional axes may be provided, preferably perpendicular to the z-axis.

Thus, as an example, the detector may constitute a coordinate system in which the optical axis forms the z-axis and in which, additionally, an x-axis and a y-axis may be provided which are perpendicular to the z-axis and which are perpendicular to each other. As an example, the detector and/or a part of the detector may rest at a specific point in this coordinate system, such as at the origin of this coordinate system. In this coordinate system, a direction parallel or antiparallel to the z-axis may be regarded as a longitudinal direction, and a coordinate along the z-axis may be considered a longitudinal coordinate. An arbitrary direction perpendicular to the longitudinal direction may be considered a transversal direction, and an x- and/or y-coordinate may be considered a transversal coordinate.

Alternatively, other types of coordinate systems may be used. Thus, as an example, a polar coordinate system may be used in which the optical axis forms a z-axis and in which a distance from the z-axis and a polar angle may be used as additional coordinates. Again, a direction parallel or antiparallel to the z-axis may be considered a longitudinal direction, and a coordinate along the z-axis may be considered a longitudinal coordinate. Any direction perpendicular to the z-axis may be considered a transversal direction, and the polar coordinate and/or the polar angle may be considered a transversal coordinate.

As used herein, a detector for determining a position of at least one object generally is a device adapted for providing at least one item of information on the position of the at least one object. The detector may be a stationary device or a mobile device. Further, the detector may be a stand-alone device or may form part of another device, such as a computer, a vehicle or any other device. Further, the detector may be a hand-held device. Other embodiments of the detector are feasible.

The detector may be adapted to provide the at least one item of information on the position of the at least one object in any feasible way. Thus, the information may e.g. be provided electronically, visually, acoustically or in any arbitrary combination thereof. The information may further be stored in a data storage of the detector or a separate device and/or may be provided via at least one interface, such as a wireless interface and/or a wire-bound interface.

The detector comprises:
  at least one transversal optical sensor, the transversal optical sensor being adapted to determine a transversal position of at least one light beam traveling from the object to the detector, the transversal position being a position in at least one dimension perpendicular an optical axis of the detector, the transversal optical sensor being adapted to generate at least one transversal sensor signal;
  at least one longitudinal optical sensor, wherein the longitudinal optical sensor has at least one sensor region, wherein the longitudinal optical sensor is designed to generate at least one longitudinal sensor signal in a manner dependent on an illumination of the sensor region by the light beam, wherein the longitudinal sensor signal, given the same total power of the illumination, is dependent on a beam cross-section of the light beam in the sensor region;
  at least one evaluation device, wherein the evaluation device is designed to generate at least one item of information on a transversal position of the object by evaluating the transversal sensor signal and to generate at least one item of information on a longitudinal position of the object by evaluating the longitudinal sensor signal.

As will be outlined in further detail below, the components listed above may be separate components. Alternatively, two or more of the components listed above may be integrated into one component. Thus, the at least one transversal optical sensor and the at least one longitudinal optical sensor may at least partially be integrated into one optical sensor. Alternatively, at least one longitudinal optical sensor may be provided which is separate from at least one transversal optical sensor. Further, the at least one evaluation device may be formed as a separate evaluation device independent from the at least one transversal optical sensor and the at least one longitudinal optical sensor, but may preferably be connected to the at least one transversal optical sensor and the at least one longitudinal optical sensor in order to receive the transversal sensor signal and the longitudinal sensor signal. Alternatively, the at least one evaluation device may fully or partially be integrated into the at least one transversal optical sensor and/or the at least one longitudinal optical sensor.

As used herein, the term transversal optical sensor generally refers to a device which is adapted to determine a transversal position of at least one light beam traveling from the object to the detector. With regard to the term transversal position, reference may be made to the definition given above. Thus, preferably, the transversal position may be or may comprise at least one coordinate in at least one dimension perpendicular to an optical axis of the detector. As an example, the transversal position may be a position of a light spot generated by the light beam in a plane perpendicular to the optical axis, such as on a light-sensitive sensor surface of the transversal optical sensor. As an example, the position in the plane may be given in Cartesian coordinates and/or polar coordinates. Other embodiments are feasible.

For potential embodiments of the transversal optical sensor, reference may be made to the position sensitive organic detector as disclosed in U.S. Pat. No. 6,995,445 and US 2007/0176165 A1. However, other embodiments are feasible and will be outlined in further detail below.

The at least one transversal sensor signal generally may be an arbitrary signal indicative of the transversal position. As an example, the transversal sensor signal may be or may comprise a digital and/or an analog signal. As an example, the transversal sensor signal may be or may comprise a voltage signal and/or a current signal. Additionally or alternatively, the transversal sensor signal may be or may comprise digital data. The transversal sensor signal may comprise a single signal value and/or a series of signal values. The transversal sensor signal may further comprise an arbitrary signal which is derived by combining two or more individual signals, such as by averaging two or more signals and/or by forming a quotient of two or more signals, as will be outlined in further detail below.

As used herein, a longitudinal optical sensor generally is a device which is designed to generate at least one longitudinal sensor signal in a manner dependent on an illumination of the sensor region by the light beam, wherein the longitudinal sensor signal, given the same total power of the illumination, is dependent on a beam cross-section of the light beam in the sensor region. For potential embodiments of the longitudinal optical sensor, reference may be made to the optical sensor as disclosed in WO 2012/110924 A1. Preferably, however, as will be outlined in further detail below, the detector according to the present invention comprises a plurality of optical sensors, such as a plurality of optical sensors as disclosed in WO 2012/110924 A1, preferably as a sensor stack.

Thus, as an example, the detector according to the present invention may comprise a stack of optical sensors as disclosed in WO 2012/110924 A1, in combination with one or more transversal optical sensors. As an example, one or more transversal optical sensors may be disposed on a side of the stack of longitudinal optical sensors facing towards the object. Alternatively or additionally, one or more transversal optical sensors may be disposed on a side of the stack of longitudinal optical sensors facing away from the object. Again, additionally or alternatively, one or more transversal article sensors may be interposed in between the longitudinal optical sensors of the stack.

As will further be outlined below, preferably, both the at least one transversal optical sensor longitudinal optical sensor and the at least one longitudinal optical sensor may comprise one or more photo detectors, preferably one or more organic photodetectors and, most preferably, one or more dye-sensitized organic solar cells (DSCs, also referred to as dye solar cells), such as one or more solid dye-sensitized organic solar cells (s-DSCs). Thus, preferably, the detector may comprise one or more DSCs (such as one or more sDSCs) acting as the at least one transversal optical sensor and one or more DSCs (such as one or more sDSCs) acting as the at least one longitudinal optical sensor, preferably a stack of a plurality of DSCs (preferably a stack of a plurality of sDSCs) acting as the at least one longitudinal optical sensor.

As used herein, the term evaluation device generally refers to an arbitrary device designed to generate the at least one item of information on the transversal position of the object and the longitudinal position of the object. As an example, the evaluation device may be or may comprise one or more integrated circuits, such as one or more application-specific integrated circuits (ASICs), and/or one or more data processing devices, such as one or more computers, preferably one or more microcomputers and/or microcontrollers. Additional components may be comprised, such as one or more preprocessing devices and/or data acquisition devices, such as one or more devices for receiving and/or preprocessing of the transversal sensor signal and/or the longitudinal sensor signal, such as one or more AD-converters and/or one or more filters. Further, the evaluation device may comprise one or more data storage devices. Further, as outlined above, the evaluation device may comprise one or more interfaces, such as one or more wireless interfaces and/or one or more wire-bound interfaces.

The at least one evaluation device may be adapted to perform at least one computer program, such as at least one computer program performing or supporting the step of generating the at least one item of information on the transversal position and/or the step of generating the at least one item of information on the longitudinal position. As an example, one or more algorithms may be implemented which, by using the transversal sensor signal and/or the longitudinal sensor signal as input variables, may perform a predetermined transformation into the transversal position and/or the longitudinal position of the object.

As outlined above, preferably, the transversal optical sensor is a photo detector having at least one first electrode, at least one second electrode and at least one photovoltaic material, wherein the photovoltaic material is embedded in between the first electrode and the second electrode. As used herein, a photovoltaic material generally is a material or combination of materials adapted to generate electric charges in response to an illumination of the photovoltaic material with light.

As used herein, the term light generally refers to electromagnetic radiation in one or more of the visible spectral range, the ultraviolet spectral range and the infrared spectral range. Therein, the term visible spectral range generally refers to a spectral range of 380 nm to 780 nm. The term infrared (IR) spectral range generally refers to electromagnetic radiation in the range of 780 nm to 1000 µm, preferably in the range of 780 nm to 3.0 µm. The term ultraviolet spectral range generally refers to electromagnetic radiation in the range of 1 nm to 380 nm, preferably in the range of 100 nm to 380 nm. Preferably, light as used within the present invention is visible light, i.e. light in the visible spectral range.

The term light beam generally refers to an amount of light emitted into a specific direction. Thus, the light beam may be a bundle of the light rays having a predetermined extension in a direction perpendicular to a direction of propagation of the light beam. Preferably, the light beam may be or may comprise one or more Gaussian light beams which may be characterized by one or more Gaussian beam parameters, such as one or more of a beam waist, a Rayleigh-length or any other beam parameter or combination of beam parameters suited to characterize a development of a beam diameter and/or a beam propagation in space.

Preferably, the second electrode of the transversal optical sensor may be a split electrode having at least two partial electrodes, wherein the transversal optical sensor has a sensor area, wherein the at least one transversal sensor signal indicates a position of the light beam in the sensor area. Thus, as outlined above, the transversal optical sensor may be or may comprise one or more photo detectors, preferably one or more organic photo detectors, more preferably one or more DSCs or sDSCs. The sensor area may be a surface of the photo detector facing towards the object. The sensor area preferably may be oriented perpendicular to the optical axis. Thus, the transversal sensor signal may indicate a position of a light spot generated by the light beam in a plane of the sensor area of the transversal optical sensor.

Generally, as used herein, the term partial electrode refers to an electrode out of a plurality of electrodes, adapted for measuring at least one current and/or voltage signal, preferably independent from other partial electrodes. Thus, in case a plurality of partial electrodes is provided, the second electrode is adapted to provide a plurality of electric potentials and/or electric currents and/or voltages via the at least two partial electrodes, which may be measured and/or used independently.

When using at least one transversal optical sensor having at least one split electrode having two or more partial electrodes as a second electrode, currents through the partial electrodes may be dependent on a position of the light beam in the sensor area. This may generally be due to the fact that Ohmic losses or resistive losses may occur on the way from a location of generation of electrical charges due to the impinging light to the partial electrodes. Thus, besides the partial electrodes, the second electrode may comprise one or more additional electrode materials connected to the partial electrodes, wherein the one or more additional electrode materials provide an electrical resistance. Thus, due to the Ohmic losses on the way from the location of generation of the electric charges to the partial electrodes through with the one or more additional electrode materials, the currents through the partial electrodes depend on the location of the generation of the electric charges and, thus, to the position of the light beam in the sensor area. For details of this principle of determining the position of the light beam in the sensor area, reference may be made to the preferred embodiments below and/or to the physical principles and device options as disclosed e.g. in U.S. Pat. No. 6,995,445 and/or US 2007/0176165 A1.

The transversal optical sensor may further be adapted to generate the transversal sensor signal in accordance with the electrical currents through the partial electrodes. Thus, a ratio of electric currents through two horizontal partial electrodes may be formed, thereby generating an x-coordinate, and/or a ratio of electric currents through to vertical partial electrodes may be formed, thereby generating a y-coordinate. The detector, preferably the transversal optical sensor and/or the evaluation device, may be adapted to derive the information on the transversal position of the object from at least one ratio of the currents through the partial electrodes. Other ways of generating position coordinates by comparing currents through the partial electrodes are feasible.

The partial electrodes generally may be defined in various ways, in order to determine a position of the light beam in the sensor area. Thus, two or more horizontal partial electrodes may be provided in order to determine a horizontal coordinate or x-coordinate, and two or more vertical partial electrodes may be provided in order to determine a vertical coordinate or y-coordinate. Thus, the partial electrodes may be provided at a rim of the sensor area, wherein an interior space of the sensor area remains free and may be covered by one or more additional electrode materials. As will be outlined in further detail below, the additional electrode material preferably may be a transparent additional electrode material, such as a transparent metal and/or a transparent conductive oxide and/or, most preferably, a transparent conductive polymer.

Further preferred embodiments may refer to the photovoltaic material. Thus, the photovoltaic material of the transversal optical sensor may comprise at least one organic photovoltaic material. Thus, generally, the transversal optical sensor may be an organic photo detector. Preferably, the organic photo detector may be a dye-sensitized solar cell. The dye-sensitized solar cell preferably may be a solid dye-sensitized solar cell, comprising a layer setup embedded in between the first electrode and the second electrode, the layer setup comprising at least one n-semiconducting metal oxide, at least one dye, and at least one solid p-semiconducting organic material. Further details and optional embodiments of the dye-sensitized solar cell (DSC) will be disclosed below.

The at least one first electrode of the transversal optical sensor preferably is transparent. As used in the present invention, the term transparent generally refers to the fact that the intensity of light after transmission through the transparent object equals to or exceeds 10%, preferably 40% and, more preferably, 60% of the intensity of light before transmission through the transparent object. More preferably, the at least one first electrode of the transversal optical sensor may fully or partially be made of at least one transparent conductive oxide (TCO). As an example, indium-doped tin oxide (ITO) and/or fluorine-doped tin oxide (FTO) may be named. Further examples will be given below.

Further, the at least one second electrode of the transversal optical sensor preferably may fully or partially be transparent. Thus, specifically, the at least one second electrode may comprise two or more partial electrodes and at least one additional electrode material contacting the two or more partial electrodes. The two or more partial electrodes may be intransparent. As an example, the two or more partial electrodes may fully or partially be made of a metal. Thus, the two or more partial electrodes preferably are located at a rim of the sensor area. The two or more partial electrodes, however, may electrically be connected by the at least one additional electrode material which, preferably, is transparent. Thus, the second electrode may comprise an intransparent rim having the two or more partial electrodes and a transparent inner area having the at least one transparent additional electrode material. More preferably, the at least one second electrode of the transversal optical sensor, such as the above-mentioned at least one additional electrode material, may fully or partially be made of at least one conductive polymer, preferably a transparent conductive polymer. As an example, conductive polymers having an electrical conductivity of at least 0.01 S/cm may be used, preferably of at least 0.1 S/cm or, more preferably, of at least 1 S/cm or even at least 10 S/cm or at least 100 S/cm. As an example, the at least one conductive polymer may be selected from the group consisting of a poly-3,4-ethylenedioxythiophene (PEDOT), preferably PEDOT being electrically doped with at least one counter ion, more preferably PEDOT doped with sodium polystyrene sulfonate (PEDOT: PSS); a polyaniline (PANI); a polythiophene.

As outlined above, the conductive polymer may provide an electrical connection between the at least two partial electrodes. The conductive polymer may provide an Ohmic resistivity, allowing for determining the position of charge generation. Preferably, the conductive polymer provides an electric resistivity of 0.1-20 k$\Omega$ between the partial electrodes, preferably an electric resistivity of 0.5-5.0 k$\Omega$ and, more preferably, an electric resistivity of 1.0-3.0 k$\Omega$.

Generally, as used herein, a conductive material may be a material which have a specific electrical resistance of less than $10^4$, less than $10^3$, less than $10^2$, or of less than 10 $\Omega$m. Preferably, the conductive material has a specific electrical resistance of less than $10^{-1}$, less than $10^{-2}$, less than $10^{-3}$, less than $10^{-5}$, or less than $10^{-6}$ $\Omega$m. Most preferably, the specific electrical resistance of the conductive material is less than $5\times10^{-7}$ $\Omega$m or is less than $1\times10^{-7}$ $\Omega$m, particularly in the range of the specific electrical resistance of aluminum.

As outlined above, preferably, at least one of the transversal optical sensor and the longitudinal optical sensor is a transparent optical sensor. Thus, the at least one transversal optical sensor may be a transparent transversal optical sensor and/or may comprise at least one transparent transversal optical sensor. Additionally or alternatively, the at least one longitudinal optical sensor may be a transparent longitudinal optical sensor and/or may comprise at least one transparent longitudinal optical sensor. In case a plurality of longitudinal optical sensors is provided, such as a stack of longitudinal optical sensors, preferably all longitudinal optical sensors of the plurality and/or the stack or all longitudinal optical sensors of the plurality and/or the stack but one longitudinal optical sensor are transparent. As an example, in case a stack of longitudinal optical sensors is provided, wherein the longitudinal optical sensors are arranged along the optical axis of the detector, preferably all longitudinal optical sensors but the last longitudinal optical sensor facing away from the object may be transparent longitudinal optical sensors. The last longitudinal optical sensor, i.e. the longitudinal optical sensor on the side of the stack facing away from the object, may be a transparent longitudinal optical sensor or an intransparent longitudinal optical sensor. Exemplary embodiments will be given below.

In case one of the transversal optical sensor and the longitudinal optical sensor is a transparent optical sensor or comprises at least one transparent optical sensor, the light beam may pass through the transparent optical sensor before impinging on the other one of the transversal optical sensor and the longitudinal optical sensor. Thus, the light beam from the object may subsequently reach the transversal optical sensor and the longitudinal optical sensor or vice versa.

Further embodiments refer to the relationship between the transversal optical sensor and the longitudinal optical sensor. Thus, in principle, the transversal optical sensor and the longitudinal optical sensor at least partially may be identical, as outlined above. Preferably, however, the transversal optical sensor and the longitudinal optical sensor at least partially may be independent optical sensors, such as independent photo detectors and, more preferably, independent DSCs or sDSCs.

As outlined above, the transversal optical sensor and the longitudinal optical sensor preferably may be stacked along the longitudinal optical axis. Thus, a light beam travelling along the optical axis may both impinge on the transversal optical sensor and on the longitudinal optical sensor, preferably subsequently. Thus, the light beam may subsequently pass through the transversal optical sensor and the longitudinal optical sensor or vice versa.

Further embodiments of the present invention referred to the nature of the light beam which propagates from the object to the detector. The light beam might be admitted by the object itself, i.e. might originate from the object. Additionally or alternatively, another origin of the light beam is feasible. Thus, as will be outlined in further detail below, one or more illumination sources might be provided which illuminate the object, such as by using one or more primary rays or beams, such as one or more primary rays or beams having a predetermined characteristic. In the latter case, the light beam propagating from the object to the detector might be a light beam which is reflected by the object and/or a reflection device connected to the object.

As outlined above, the at least one longitudinal sensor signal, given the same total power of the illumination by the light beam, is dependent on a beam cross-section of the light beam in the sensor region of the at least one longitudinal optical sensor. As used herein, the term beam cross-section generally refers to a lateral extension of the light beam or a light spot generated by the light beam at a specific location. In case a circular light spot is generated, a radius, a diameter or a Gaussian beam waist or twice the Gaussian beam waist may function as a measure of the beam cross-section. In case non-circular light-spots are generated, the cross-section may be determined in any other feasible way, such as by determining the cross-section of a circle having the same area as the non-circular light spot, which is also referred to as the equivalent beam cross-section.

Thus, given the same total power of the illumination of the sensor region by the light beam, a light beam having a first beam diameter or beam cross-section may generate a first longitudinal sensor signal, whereas a light beam having a second beam diameter or beam-cross section being different from the first beam diameter or beam cross-section generates a second longitudinal sensor signal being different from the first longitudinal sensor signal. Thus, by comparing the longitudinal sensor signals, an information or at least one item of information on the beam cross-section, specifically on the beam diameter, may be generated. For details of this effect, reference may be made to WO 2012/110924 A1. Specifically in case one or more beam properties of the light beam propagating from the object to the detector are known, the at least one item of information on the longitudinal position of the object may thus be derived from a known relationship between the at least one longitudinal sensor signal and a longitudinal position of the object. The known relationship may be stored in the evaluation device as an algorithm and/or as one or more calibration curves. As an example, specifically for Gaussian beams, a relationship between a beam diameter or beam waist and a position of the object may easily be derived by using the Gaussian relationship between the beam waist and a longitudinal coordinate.

The above-mentioned effect, which is also referred to as the FiP-effect (alluding to the effect that the beam cross section $\phi$ influences the electric power P generated by the longitudinal optical sensor) may depend on or may be emphasized by an appropriate modulation of the light beam, as disclosed in WO 2012/110924 A1. Thus, preferably, the detector may furthermore have at least one modulation device for modulating the illumination. The detector may be designed to detect at least two longitudinal sensor signals in the case of different modulations, in particular at least two sensor signals at respectively different modulation frequencies. In this case, the evaluation device may be designed to generate the at least one item of information on the longitudinal position of the object by evaluating the at least two longitudinal sensor signals.

Generally, the longitudinal optical sensor may be designed in such a way that the at least one longitudinal sensor signal, given the same total power of the illumination, is dependent on a modulation frequency of a modulation of the illumination. Further details and exemplary embodiments will be given below. This property of frequency dependency is specifically provided in DSCs and, more preferably, in sDSCs. However, other types of optical sensors, preferably photo detectors and, more preferably, organic photo detectors may exhibit this effect.

Preferably, the transversal optical sensor and the longitudinal optical sensor both are thin film devices, having a layer setup of layer including electrode and photovoltaic material, the layer setup having a thickness of preferably no more than 1 mm, more preferably of at most 500 μm or even less. Thus, the sensor region of the transversal optical sensor and/or the sensor region of the longitudinal optical sensor preferably each may be or may comprise a sensor area, which may be formed by a surface of the respective device, wherein the surface may face towards the object or may face away from the object. Hereby, it may further be feasible to arrange the at least one transversal optical sensor and the at least one longitudinal optical sensor in a way that some surfaces comprising the sensor regions may face towards the object where other surfaces may face away from the object. Such a kind of arrangement of the respective devices, which might be helpful to optimize the path of the light beam through the stack and/or to reduce reflections within the light path, may, for any reason or purpose, be implemented in an alternating manner, such as with one, two, three or more devices where the sensor regions may face towards the object alternating with one, two, three or more other devices where the sensor regions may face away from the object.

Preferably, the sensor region of the transversal optical sensor and/or the sensor region of the longitudinal optical sensor may be formed by one continuous sensor region, such as one continuous sensor area or sensor surface per device. Thus, preferably, the sensor region of the longitudinal optical sensor or, in case a plurality of longitudinal optical sensors is provided (such as a stack of longitudinal optical sensors), each sensor region off the longitudinal optical sensor, may be formed by exactly one continuous sensor region. The longitudinal sensor signal preferably is a uniform sensor signal for the entire sensor region of the longitudinal optical sensor or, in case a plurality of longitudinal optical sensors is provided, is a uniform sensor signal for each sensor region of each longitudinal optical sensor.

The at least one transversal optical sensor and/or the at least one longitudinal optical sensor each, independently, may have a sensor region providing a sensitive area, also referred to as a sensor area, of at least 1 mm$^2$, preferably of at least 5 mm$^2$, such as a sensor area of 5 mm$^2$ to 1000 cm$^2$, preferably a sensor area of 7 mm$^2$ to 100 cm$^2$, more preferably a sensor area of 1 cm$^2$. The sensor area preferably has a rectangular geometry, such as a square geometry. However, other geometries and/or sensor areas are feasible.

The longitudinal sensor signal preferably may be selected from the group consisting of a current (such as a photocurrent) and a voltage (such as a photo voltage). Similarly, the transversal sensor signal preferably may be selected from the group consisting of a current (such as a photocurrent) and a voltage (such as a photo voltage) or any signal derived thereof, such as a quotient of currents and/or voltages.

Further, longitudinal sensor signal and/or the transversal sensor signal may be preprocessed, in order to derive refined sensor signals from raw sensor signals, such as by averaging and/or filtering.

Generally, the longitudinal optical sensor may comprise at least one semiconductor detector, in particular an organic semiconductor detector comprising at least one organic material, preferably an organic solar cell and particularly preferably a dye solar cell or dye-sensitized solar cell, in particular a solid dye solar cell or a solid dye-sensitized solar cell. Preferably, the longitudinal optical sensor is or comprises a DSC or sDSC. Thus, preferably, the longitudinal optical sensor comprises at least one first electrode, at least one n-semiconducting metal oxide, at least one dye, at least one p-semiconducting organic material, preferably a solid p-semiconducting organic material, and at least one second electrode. In a preferred embodiment, the longitudinal optical sensor comprises at least one DSC or, more preferably, at least one sDSC. As outlined above, preferably, the at least one longitudinal optical sensor is a transparent longitudinal optical sensor or comprises at least one transparent longitudinal optical sensor. Thus, preferably, both the first electrode and the second electrode are transparent or, in case a plurality of longitudinal optical sensors is provided, at least one of the longitudinal optical sensors is designed such that both the first electrode and the second electrode are transparent.

As outlined above, in case a stack of longitudinal optical sensors is provided, preferably some or even all longitudinal optical sensors of the stack are transparent but the last longitudinal optical sensor of the stack. The last longitudinal optical sensor of the stack, i.e. the longitudinal optical sensor of the stack furthest away from the object, may be transparent or intransparent. The stack may, besides the at least one transversal optical sensor and the at least one longitudinal optical sensor, comprise one or more further optical sensors which may function as one or more of a transversal optical sensor, a longitudinal optical sensor (also referred to as an imaging device) and an imaging sensor.

Thus, it may be possible to locate an imaging device in the optical path of the light beam in a manner that the light beam travels through the stack of the transparent longitudinal optical sensors until it impinges on the imaging device.

Thus, generally, the detector may further comprise at least one imaging device, i.e. a device capable of acquiring at least one image. The imaging device can be embodied in various ways. Thus, the imaging device can be for example part of the detector in a detector housing. Alternatively or additionally, however, the imaging device can also be arranged outside the detector housing, for example as a separate imaging device. Alternatively or additionally, the imaging device can also be connected to the detector or even be part of the detector. In a preferred arrangement, the stack of the transparent longitudinal optical sensors and the imaging device are aligned along a common optical axis along which the light beam travels. However, other arrangements are possible.

In addition, the detector may comprise at least one transfer device, such as an optical lens, which will be described later in more detail, and which may further be arranged along the common optical axis. By way of example, the light beam which emerges from the object may in this case travel first through the at least one transfer device and thereafter through the stack of the transparent longitudinal optical sensors until it finally impinges on the imaging device.

As used herein, an imaging device is generally understood as a device which can generate a one-dimensional, a two-dimensional, or a three-dimensional image of the object or of a part thereof. In particular, the detector, with or without the at least one optional imaging device, can be completely or partly used as a camera, such as an IR camera, or an RGB camera, i.e. a camera which is designed to deliver three basic colors which are designated as red, green, and blue, on three separate connections.

Thus, as an example, the at least one imaging device may be or may comprise at least one imaging device selected from the group consisting of: a pixelated organic camera element, preferably a pixelated organic camera chip; a pixelated inorganic camera element, preferably a pixelated inorganic camera chip, more preferably a CCD- or CMOS-chip; a monochrome camera element, preferably a monochrome camera chip; a multicolor camera element, preferably a multicolor camera chip; a full-color camera element, preferably a full-color camera chip. The imaging device may be or may comprise at least one device selected from the group consisting of a monochrome imaging device, a multichrome imaging device and at least one full color imaging device. A multi-chrome imaging device and/or a full color imaging device may be generated by using filter techniques and/or by using intrinsic color sensitivity or other techniques, as the skilled person will recognize. Other embodiments of the imaging device are also possible.

The imaging device may be designed to image a plurality of partial regions of the object successively and/or simultaneously. By way of example, a partial region of the object can be a one-dimensional, a two-dimensional, or a three-dimensional region of the object which is delimited for example by a resolution limit of the imaging device and from which electromagnetic radiation emerges. In this context, imaging should be understood to mean that the electromagnetic radiation which emerges from the respective partial region of the object is fed into the imaging device, for example by means of the at least one optional transfer device of the detector. The electromagnetic rays can be generated by the object itself, for example in the form of a luminescent radiation. Alternatively or additionally, the at least one detector may comprise at least one illumination source for illuminating the object.

In particular, the imaging device can be designed to image sequentially, for example by means of a scanning method, in particular using at least one row scan and/or line scan, the plurality of partial regions sequentially. However, other embodiments are also possible, for example embodiments in which a plurality of partial regions is simultaneously imaged. The imaging device is designed to generate, during this imaging of the partial regions of the object, signals, preferably electronic signals, associated with the partial regions. The signal may be an analogue and/or a digital signal. By way of example, an electronic signal can be associated with each partial region. The electronic signals can accordingly be generated simultaneously or else in a temporally staggered manner. By way of example, during a row scan or line scan, it is possible to generate a sequence of electronic signals which correspond to the partial regions of the object, which are strung together in a line, for example. Further, the imaging device may comprise one or more signal processing devices, such as one or more filters and/or analogue-digital-converters for processing and/or preprocessing the electronic signals.

As outlined above, the at least one longitudinal optical sensor may be transparent or intransparent, or may comprise at least one transparent longitudinal optical sensor. A combination of at least one transparent and at least one intransparent longitudinal optical sensor is possible.

In a further preferred embodiment, the last longitudinal optical sensor may be intransparent. For this purpose, at least those parts of the last longitudinal optical sensor which are subject to be illuminated by the light beam which travels from the object and which may impinge on the last longitudinal optical sensor may comprise an optical sensor material, preferably an inorganic optical sensor material, and/or an organic optical sensor material, and/or a hybrid organic-inorganic optical sensor material, which exhibits intransparent optical properties. Intransparency may also be achieved by using at least one intransparent electrode. In this embodiment, the last longitudinal optical sensor may be designed such that its electrode facing towards the object is transparent, whereas its electrode facing away from the object may be intransparent, or vice-versa. Additionally or alternatively, a respective material which exhibits intransparent optical properties may be selected for at least one of the n-semiconducting metal oxides, for at least one of the dyes, and/or for at least one of the p-semiconducting organic materials which may comprise the last longitudinal optical sensor.

As outlined above, the detector may comprise at least one imaging device. The imaging device may fully or partially be embodied as an independent imaging device, independent from the at least one transversal optical sensor and the at least one longitudinal optical sensor. Additionally or alternatively, the at least one optional imaging device may fully or partially be integrated into one or both of the at least one transversal optical sensor and the at least one longitudinal optical sensor. Thus, as an example, the imaging device may be used for determining a transversal position of a light spot and, thus, may be used as a transversal optical sensor or as a part thereof.

As outlined above, the detector may comprise a stack of at least two optical sensors, the at least two optical sensors comprising the at least one transversal optical sensor and the at least one longitudinal optical sensor and, optionally, the at least one imaging device. Thus, as an example, the stack may comprise the at least one transversal optical sensor, the at least one longitudinal optical sensor (preferably at least one transparent longitudinal optical sensor) and, optionally, in a position furthest away from the object, at least one imaging device, preferably at least one intransparent imaging device such as a CCD or CMOS chip.

The stack of at least two optical sensors optionally may partially or fully be immersed in an oil, in a liquid and/or in a solid material in order to avoid and/or decrease reflections at interfaces. Hereby, the oil, the liquid, and/or the solid material may preferably be transparent, preferentially to a high degree, at least over a part of the ultraviolet, visible, and/or infrared spectral range. In a preferred embodiment, the solid material may be generated by inserting at least one curable substance into a region between at least two optical sensors and treating the curable substance with a treatment, such as by incident light, particularly with light within the ultraviolet range, and/or by an application of a temperature above or below room temperature, by which treatment the curable substance might be cured, preferentially by hardening the curable substance into the solid material. Alternatively, at least two different curable substances may be inserted into a region between at least two optical sensors, whereby the two different curable substances are selected in a manner that they begin to set into the solid material with or without the treatment as indicated above. However, further treatments and/or other procedures of providing the transparent solid material may be possible. Thus, at least one of the optical sensors of the stack may fully or partially be immersed in the oil and/or the liquid and/or covered with the solid material.

Alternatively or additionally, the region between the at least two optical sensors may be partially or fully filled with a substance, such as the oil, the liquid and/or the solid material. Hereby, the substance may preferably exhibit a refractive index with a value which may differ from that of the optical sensors adjoining to the substance on one or both sides of the region. However, inserting the additional substance in the regions may require the optical sensors within the stack to observe a minimum spacing between them.

In case a stack of at least two optical sensors is used, the last optical sensor of the stack may be transparent or intransparent. Thus, an intransparent inorganic optical sensor may be used in a position furthest away from the object. As an example, the last optical sensor of the stack may be or may comprise the at least one optional imaging device, such as at least one CCD or CMOS chip, preferably a full-color CCD or CMOS chip.

Thus, the intransparent last optical sensor may be used as an imaging device, wherein the imaging device is impinged by the light beam after the light beam has traveled before through the stack of the transparent optical sensors until it impinges the imaging device. In particular, the imaging device can be completely or partly used as a camera, such as an IR camera, or an RGB camera, as described above. Hereby, the intransparent last optical sensor can be embodied in various ways as imaging device. Thus, the intransparent last optical sensor can be for example part of the detector in a detector housing. Alternatively or additionally, however, the intransparent last optical sensor can also be arranged outside the detector housing, for example as a separate imaging device.

The stack comprising the at least one transversal optical sensor, the at least one longitudinal optical sensor and the optional at least one imaging device may be designed such that the elements of the stack are arranged along an optical axis of the detector. The last element of the stack may be an intransparent optical sensor, preferably selected from the group consisting of an intransparent transversal optical sensor, an intransparent longitudinal optical sensor and an intransparent imaging device such as an intransparent CCD or CMOS chip.

In a preferred arrangement, the stack comprising the at least one transversal optical sensor, the at least one longitudinal optical sensor and, optionally, the at least one imaging device may be arranged along a common optical axis of the detector, along which the light beam may travel. In case the stack contains a plurality of optical sensors, the optical sensors comprising the at least one transversal optical sensor, the at least one longitudinal optical sensor and, optionally, the at least one imaging device, wherein at least one of the optical sensors is a transparent optical sensor and wherein at least one of the optical sensors is an intransparent optical sensor, the transparent optical sensor and the intransparent optical sensor, the latter preferably being positioned furthest away from the object, may be arranged along the optical axis of the detector. However, other arrangements are possible.

In a further preferred embodiment, the intransparent last optical sensor is having at least one matrix of pixels, wherein a 'matrix' generally refers to an arrangement of a plurality of the pixels in space, which may be a linear arrangement or an areal arrangement. Generally, the matrix may, thus, preferably be selected from the group consisting of a one-dimensional matrix and a two-dimensional matrix. As an example, the matrix may comprise 100 to 100 000 000 pixels, preferably 1 000 to 1 000 000 pixels and, more preferably, 10 000 to 500 000 pixels. Most preferably, the matrix is a rectangular matrix having pixels arranged in rows and columns.

As further used herein, a pixel generally refers to a light-sensitive element of an optical sensor, such as a minimum uniform unit of the optical sensor adapted to generate a light signal. As an example, each pixel may have a light-sensitive area of 1 $\mu m^2$ to 5 000 000 $\mu m^2$, preferably 100 $\mu m^2$ to 4 000 000 $\mu m^2$, preferably 1 000 $\mu m^2$ to 1 000 000 $\mu m^2$ and more preferably 2 500 $\mu m^2$ to 50 000 $\mu m^2$. Still, other embodiments are feasible. The intransparent last optical sensor may be adapted to generate at least one signal which indicates an intensity of illumination for each of the pixels. Thus, as an example, the intransparent last optical sensor may be adapted to generate at least one electronic signal for each of the pixels, whereby each signal indicates the intensity of illumination for the respective pixel. The signal may be an analogue and/or a digital signal. Further, the detector may comprise one or more signal processing devices, such as one or more filters and/or analogue-digital-converters for processing and/or preprocessing the at least one signal.

The intransparent last optical sensor having a matrix of pixels can be selected from the group consisting of: an inorganic semiconductor sensor device such as a CCD chip and/or a CMOS chip; an organic semiconductor sensor device. In the latter case, as an example, the optical sensor may, for example, comprise at least one organic photovoltaic device having a matrix of pixels. As used herein, an organic photovoltaic device generally refers to a device having at least one organic photosensitive element and/or at least one organic layer. Therein, generally, any type of organic photovoltaic device may be used, such as organic solar cells and/or an arbitrary device having at least one organic photosensitive layer. As an example, an organic solar cell and/or a dye-sensitized organic solar cell may be comprised. Further, a hybrid device may be used, such as inorganic-organic photovoltaic devices.

Further preferred embodiments refer to the evaluation device. Thus, the evaluation device may be designed to generate the at least one item of information on the longitudinal position of the object from at least one predefined relationship between the geometry of the illumination and a relative positioning of the object with respect to the detector, preferably taking account of a known power of the illumination and optionally taking account of a modulation frequency with which the illumination is modulated.

In a further preferred embodiment, the detector furthermore may comprise at least one transfer device, wherein the transfer device is designed to feed light emerging from the object to the transversal optical sensor and the longitudinal optical sensor, preferably subsequently. Details and preferred embodiments will be given below.

As outlined above, the light beam propagating from the object of the detector may originate from the object or may originate from any other source. Thus, the object itself may emit the light beam. Additionally or alternatively, the object might be illuminated by using an illumination source generating primary light, wherein the object elastically or inelastically reflects the primary light, thereby generating the light beam propagating to the detector. The illumination source itself may be part of the detector. Thus, the detector may comprise at least one illumination source. The illumination source generally may be selected from: an illumination source, which is at least partly connected to the object and/or is at least partly identical to the object; an illumination source which is designed to at least partly illuminate the object with a primary radiation, preferably primary light, wherein the light beam preferably is generated by a reflection of the primary radiation on the object and/or by light emission by the object itself, stimulated by the primary radiation.

As outlined above, the detector preferably has a plurality of longitudinal optical sensors. More preferably, the plurality of longitudinal optical sensors is stacked, such as along the optical axis of the detector. Thus, the longitudinal optical sensors may form a longitudinal optical sensor stack. The longitudinal optical sensor stack preferably may be oriented such that the sensor regions of the longitudinal optical sensors are oriented perpendicular to the optical axis. Thus, as an example, sensor areas or sensor surfaces of the single longitudinal optical sensors may be oriented in parallel, wherein slight angular tolerances might be tolerable, such as angular tolerances of no more than 10°, preferably of no more than 5°.

In case stacked longitudinal optical sensors are provided, the at least one transversal optical sensor preferably fully or partially is located on a side of the stacked longitudinal optical sensors facing the object. However, other embodiments are feasible. Thus, embodiments in which the at least one transversal optical sensor is fully or partially located on a side of the transversal optical sensor stack facing away from the object. Again, additionally or alternatively, embodiments are feasible in which the at least one transversal optical sensor is located fully or partially in between the longitudinal optical sensor stack.

The longitudinal optical sensors preferably are arranged such that a light beam from the object illuminates all longitudinal optical sensors, preferably sequentially. Specifically in this case, preferably, at least one longitudinal sensor signal is generated by each longitudinal optical sensor. This embodiment is specifically preferred since the stacked setup of the longitudinal optical sensors allows for an easy and efficient normalization of the signals, even if an overall power or intensity of the light beam is unknown. Thus, the single longitudinal sensor signals may be known to be generated by one and the same light beam. Thus, the evaluation device may be adapted to normalize the longitudinal sensor signals and to generate the information on the longitudinal position of the object independent from an intensity of the light beam. For this purpose, use may be made of the fact that, in case the single longitudinal sensor signals are generated by one and the same light beam, differences in the single longitudinal sensor signals are only due to differences in the cross-sections of the light beam at the location of the respective sensor regions of the single longitudinal optical sensors. Thus, by comparing the single longitudinal sensor signals, information on a beam cross-section may be generated even if the overall power of the light beam is unknown. From the beam cross-section, information regarding the longitudinal position of the object may be gained, specifically by making use of a known relationship between the cross-section of the light beam and the longitudinal position of the object.

Further, the above-mentioned stacking of the longitudinal optical sensors and the generation of a plurality of longitudinal sensor signals by these stacked longitudinal optical sensors may be used by the evaluation device in order to resolve an ambiguity in a known relationship between a beam cross-section of the light beam and the longitudinal position of the object. Thus, even if the beam properties of the light beam propagating from the object to the detector are known fully or partially, it is known that, in many beams, the beam cross-section narrows before reaching a focal point and, afterwards, widens again. Thus, before and often as a focal point in which the light beam has the narrowest beam cross-section, positions along the axis of propagation of the light beam occur in which the light beam has the same cross-section. Thus, as an example, at a distance z0 before and after the focal point, the cross-section of the light beam is identical. Thus, in case only one longitudinal optical sensor is used, a specific cross-section of the light beam might be determined, in case the overall power or intensity of the light beam is known. By using this information, the distance z0 of the respective longitudinal optical sensor from the focal point might be determined. However, in order to determine whether the respective longitudinal optical sensor is located before or behind the focal point, additional information is required, such as a history of movement of the object and/or the detector and/or information on whether the detector is located before or behind the focal point. In typical situations, this additional information may not be provided. Therefore, by using a plurality of longitudinal optical sensors, additional information may be gained in order to resolve the above-mentioned ambiguity. Thus, in case the evaluation device, by evaluating the longitudinal sensor signals, recognizes that the beam cross-section of the light beam on a first longitudinal optical sensor is larger than the beam cross-section of the light beam on a second longitudinal optical sensor, wherein the second longitudinal optical sensor is located behind the first longitudinal optical sensor, the evaluation device may determine that the light beam is still narrowing and that the location of the first longitudinal optical sensor is situated before the focal point of the light beam. Contrarily, in case the beam cross-section of the light beam on the first longitudinal optical sensor is smaller than the beam cross-section of the light beam on the second longitudinal optical sensor, the evaluation device may determine that the light beam is widening and that the location of the second longitudinal optical sensor is situated behind the focal point. Thus, generally, the evaluation device may be adapted to recognize whether the light beam widens or narrows, by comparing the longitudinal sensor signals of different longitudinal sensors.

In addition to the at least one longitudinal coordinate of the object, at least one transversal coordinate of the object may be determined. Thus, generally, the evaluation device may further be adapted to determine at least one transversal coordinate of the object by determining a position of the light beam on the at least one transversal optical sensor, which may be a pixelated, a segmented or a large-area transversal optical sensor, as will be outlined in further detail below.

Thus, in case a pixelated transversal optical sensor is used and/or in case the at least one transversal optical sensor comprises at least one pixelated optical sensor having a matrix of pixels, the evaluation device may be adapted to determine a center of illumination of the at least one matrix by the light beam, wherein the at least one transversal coordinate of the object is determined by evaluating at least one coordinate of the center of illumination. Thus, the coordinate of the center of illumination may be a pixel coordinate of the center of illumination. As an example, the matrix may comprise rows and columns of pixels, wherein the row number of the light beam and/or the center of the light beam within the matrix may provide an x-coordinate, and wherein the column number of the light beam and/or the center of the light beam within the matrix may provide a y-coordinate.

The detector, as outlined above, may comprise at least one stack of optical sensors, the optical sensors comprising the at least one transversal optical sensor and the at least on longitudinal optical sensor, and, optionally, the at least one imaging device. The stack of optical sensors may comprise at least one longitudinal optical sensor stack, being a stack of longitudinal optical sensors, having at least two longitudinal optical sensors in a stacked fashion. The longitudinal optical sensor stack preferably may comprise at least three longitudinal optical sensors, more preferably at least four longitudinal optical sensors, even more preferably at least five longitudinal optical sensors or even at least six longitudinal optical sensors. By tracking the longitudinal sensor signals of the longitudinal optical sensors, even a beam profile of the light beam might be evaluated.

In case a plurality of the longitudinal optical sensors is used, wherein the plurality of the optical sensors may be arranged in the stacked fashion and/or in another arrangement, the longitudinal optical sensors may have identical spectral sensitivities or may provide different spectral sensitivities. Thus, as an example, at least two of the longitudinal optical sensors may have a differing spectral sensitivity. As used herein, the term spectral sensitivity generally refers to the fact that the sensor signal of the optical sensor, for the same power of the light beam, may vary with the wavelength of the light beam. Thus, generally, at least two of the optical sensors may differ with regard to their spectral properties. This embodiment generally may be achieved by using different types of absorbing materials for the optical sensors, such as different types of dyes or other absorbing materials.

Preferably, the at least one transversal optical sensor uses at least one transparent substrate. Similarly, preferably, the at least one longitudinal optical sensor uses at least one transparent substrate. In case a plurality of longitudinal optical sensors is used, such as a stack of longitudinal optical sensors, preferably, at least one of these longitudinal optical sensors uses a transparent substrate. Herein, the substrates employed for the plurality of optical sensors may exhibit identical properties or may differ from each other, in particular, with regard to a geometrical quantity and/or a material quantity related to the substrates, such as the thickness, the shape, and/or the refractive index of each substrate. Thus, identical planar glass plates may be used for the plurality of optical sensors within the stack. On the other hand, different substrates may be employed for some optical sensors or for each optical sensor within a plurality of optical sensors, in particular, for a purpose of optimizing the light path within the stack, especially for guiding the light path along regions on the optical axis which might particularly be suited for exploiting the FiP-effect as described elsewhere in this application. Within this regard, the thickness of some substrates or of each substrate, which may be defined by the light path as traversed by the light beam travelling through the respective substrate, may thus be varied, in particular, for reducing or else increasing or even maximizing reflections of the light beam.

In addition or alternatively, the substrates employed for the plurality of optical sensors may differ by exhibiting a different shape which may be selected from the group comprising a planar, a planar-convex, a planar-concave, a biconvex, a biconcave or any other form which may be employed for optical purposes, such as lenses or prisms. Herein, the substrates may be rigid or else flexible. Suitable substrates are, as well as metal foils, in particular plastic sheets or films and especially glass sheets or glass films. Shape-changing materials, such as shape-changing polymers, constitute an example of materials which may preferentially be employed as flexible substrates. Furthermore, the substrate may be covered or coated, in particular, for the purpose of reducing and/or modifying reflections of the incident light beam. As an example, the substrate may be shaped in a manner that it might exhibit a mirror effect, such as that of a dichroic mirror, which might particularly be useful in a setup where a splitting of the optical axis behind the substrate may be required for any purpose.

Additionally or alternatively, differing spectral properties of the optical sensors may be generated by other means implemented into the optical sensors and/or into the detector, such as by using one or more wavelength-selective elements, such as one or more filters (such as color filters) in front of the optical sensors and/or by using one or more prisms and/or by using one or more dichroitic mirrors and/or by using one or more color conversion elements. Thus, in case a plurality of longitudinal optical sensors is provided, at least one of the longitudinal optical sensors may comprise a wavelength-selective element such as a color filter, having a specific transmission or reflection characteristic, thereby generating differing spectral properties of the optical sensors. Further, the longitudinal optical sensors may all be organic optical sensors, may all be inorganic optical sensors, may all be hybrid organic-inorganic optical sensors or may comprise an arbitrary combination of at least two optical sensors selected from the group consisting of organic optical sensors, inorganic optical sensors and hybrid organic-inorganic optical sensors.

In case the plurality of the longitudinal optical sensors is used, wherein at least two of the longitudinal optical sensors differ with regard to their respective spectral sensitivity, the evaluation device generally may be adapted to determine a color of the light beam by comparing sensor signals of the longitudinal optical sensors having the differing spectral sensitivity. As used herein, the expression "determine a color" generally refers to the step of generating at least one item of spectral information about the light beam. The at least one item of spectral information may be selected from the group consisting of a wavelength, specifically a peak wavelength; color coordinates, such as CIE coordinates. As further used herein, a "color" of the light beam generally refers to a spectral composition of the light beam. Specifically, the color of the light beam may be given in any arbitrary color coordinate system and/or in spectral units such as by giving a wavelength of a dominant peak of a spectrum of the light. Other embodiments are feasible. In case the light beam is a narrow-band light beam such as a laser light beam and/or a light beam generated by a semiconductor device such as a light-emitting diode, the peak wavelength of the light beam may be given to characterize the color of the light beam. The determination of the color of the light beam may be performed in various ways which are generally known to the skilled person. Thus, the spectral sensitivities of the longitudinal optical sensors may span a coordinate system in color space, and the signals provided by the optical sensors may provide a coordinate in this color space, as known to the skilled person for example from the way of determining CIE coordinates. As an example, the detector may comprise two, three or more longitudinal optical sensors in a stack. Thereof, at least two, preferably at least three, of the optical sensors may have differing spectral sensitivities, whereby three different longitudinal optical sensors with maximum absorption wavelengths in a spectral range between 600 nm and 780 nm (red), between 490 nm and 600 nm (green), and between 380 nm and 490 nm (blue) are generally preferred. Further, the evaluation device may be adapted to generate at least one item of color information for the light beam by evaluating the signals of the longitudinal optical sensors having differing spectral sensitivities.

The evaluation device may be adapted to generate at least two color coordinates, preferably at least three color coordinates, wherein each of the color coordinates is determined by dividing a signal of one of the spectrally sensitive optical sensors by a normalization value. As an example, the normalization value may contain a sum of the signals of all spectrally sensitive optical sensors. Additionally or alternatively, the normalization value may contain a detector signal of a white detector. The at least one item of color information may contain the color coordinates. The at least one item of color information may, as an example, contain CIE coordinates.

Furthermore, in addition to the preferred at least two, more preferably at least three, spectrally sensitive longitudinal optical sensors, wherein at least two of the optical sensors differ with regard to their respective spectral sensitivity, particularly wherein the spectral sensitivities of the at least two longitudinal optical sensors may span a coordinate system in color space, the stack may comprise a last longitudinal optical sensor, wherein the last longitudinal optical sensor may be intransparent. An intransparency of the last longitudinal optical sensor may be achieved by selecting an optically intransparent material from the group consisting of: organic optical sensor materials, inorganic optical sensor materials and hybrid organic-inorganic optical sensor materials.

In a preferred embodiment, the intransparent last longitudinal optical sensor may be configured to exhibit an absorption spectrum which either does not vary at all or varies only to minor extent over the spectral range of the at least two different optical sensors. Whereas each of the at least two different optical sensors displays a specific spectral sensitivity which may, as described above, vary considerably over their spectral range allowing them to be sensitive to a specific color, the intransparent last longitudinal optical sensor may, thus, absorb substantially all colors over the spectral ranges of the at least two of the longitudinal optical sensors have a differing spectral sensitivity. By this property, the last longitudinal optical sensor may be described as a white detector, wherein the white detector may be adapted to absorb light in an absorption range covering the visible spectral range. This arrangement has the advantage that, irrespective of the specific color, each beam which propagates through the at least two different optical sensors until it impinges the intransparent last longitudinal optical sensor, will be recorded by at least two different optical sensors, i.e. by at least one of the at least two different optical sensors which is sensitive to the color as the first longitudinal optical sensor and by the intransparent last longitudinal optical sensor as the second longitudinal optical sensor. As described above, by recording at least one object by both the first longitudinal optical sensor and the second longitudinal optical sensor it will be possible to resolve the ambiguity in the known relationship between the beam cross-section of the light beam and the longitudinal position of the at least one object, wherein the resolving of the ambiguity may work separately for each color which may be recorded. In addition, it may be advantageous to set a first signal recorded by the first longitudinal optical sensor in relationship to a second signal recorded by the last or second longitudinal optical sensor, such as by calculating a quotient or another related relationship. A result obtained by creating such a relationship may particularly facilitate the recognition of a certain color by this arrangement.

As outlined above, the intransparent last longitudinal optical sensor may be a large-area sensor having a single sensitive area or may comprise at least one matrix of pixels, i.e. may be a pixelated optical sensor or imaging sensor. In a further preferred embodiment, the pixels themselves may be equipped with different spectral sensitivity which may allow them to become sensitive to a specific color. Hereby, the specific colors may be distributed over the area of the last longitudinal optical sensor in any fashion, for example in a random fashion. However, an arrangement is preferred wherein pixels with sensitivity to a specific color are placed in an alternating fashion over the area of the intransparent last longitudinal optical sensor. By way of example, two, three, or four pixels with different sensitivity, e.g. three pixels with a specific sensitivity to red, green, and blue, alternate each other in a one-dimensional or, preferably, in a two-dimensional manner, over the area of the last longitudinal optical sensor. This arrangement may further been interrupted by white pixels, i.e. pixels which exhibit a spectral sensitivity over a large spectral range, e.g. over the visible spectrum, or over a spectrum which may include infrared or ultraviolet shares.

In a further preferred embodiment, the detector may be adapted, such as by using at least one optically sensitive element. As further used herein, the "optically sensitive element" may be considered as an arbitrary optical element which may be sensitive to a specific value of an optical property or to a specific range of values of the optical property of the light beam which may impinge on the optically sensitive element in a manner that the specific value of the optical property or to the specific range of values of the optical property is preferred with regard to other values of the light beam. The optical property as employed here may be selected from the group referring to the light beam and consisting of: a wavelength, a phase, and a polarization. Thus, the optically sensitive element may be designated as a wavelength-sensitive element, a phase-sensitive element, and/or a polarization-sensitive element, respectively. Examples for wavelength-sensitive elements may comprise one or more of a prism, a grating, a dichroitic mirror, a color wheel, or a color drum.

By using the optically sensitive element, the light beam may be influenced by an optical effect related to the at least one optical property immediately before an interaction, during the interaction and/or immediately after the interaction of the light beam with the optically sensitive element. Consequently, an expression like "passing through the optically sensitive element" may refer to a time period during which the light beam may interact with the respective element. In general, the optically sensitive element may induce the optical effect on the light beam impinging on the optically sensitive element, such as by altering a transmission or a reflectance of the impinging light beam.

Within this particular embodiment, for sequentially detecting detector signals for the different optical properties, such as different colors, different phases, and/or different polarizations, the at least one optically sensitive element may be adapted to sequentially influence the light beam. As an example for a sequential process, a rotating filter wheel may be used having filter segments of different transmission properties, for periodically influencing the light beam. Thus, each cycle of rotation of the filter wheel may be split into time segments, wherein each segment may correspond to a different optical property, such as to a different color, a different phase and/or a different polarization. With regard to a filter wheel wherein each segment corresponds to a different polarization, the filter wheel may preferably exhibit an elliptical polarization, in particular a circular polarization, which may be changing along the circumference of the filter wheel, for example in a discrete or in a continuous manner. However, other embodiments, such as filter wheels which may employ different orientations of a linear polarization within different segments, may be feasible.

In general, at least one optical sensor may be placed behind the filter wheel, in order to generate at least one combined detector signal. By evaluating the at least one combined detector signal in a time-resolved fashion, such as by using a phase-sensitive detection, the combined detector signal may be split into partial detector signals corresponding to the different time segments and, thus, corresponding to the different colors of the light beam. Thereby, detector signals for each color, each phase and/or each polarization may be generated, which may correspond to the light beams impinging on the detector. Collecting the data for different optical properties, i.e. different colors or phases or polarizations, from the broadly absorbing stack of optical sensors, may result in acquiring the overall distribution. Consequently, the use of a filter wheel may, therefore, allow determining simultaneously the respective optical property, such as color, phase, or polarization, and intensity and depth by using the detector according to the present invention, thereby avoiding the previous necessity to employ solar cells exhibiting different absorption spectra.

Generally, as outlined above, the evaluation device may be adapted to generate the at least one item of information on the longitudinal position of the object by determining a diameter of the light beam from the at least one longitudinal sensor signal. As used herein and as used in the following, the diameter of the light beam or, equivalently, a beam waist of the light beam might be used to characterize the beam cross-section of the light beam at a specific location. As outlined above, a known relationship might be used between the longitudinal position of the object and the beam cross-section in order to determine the longitudinal position of the object by evaluating the at least one longitudinal sensor signal. As an example, as outlined above, a Gaussian relationship might be used, assuming that the light beam propagates at least approximately in a Gaussian Manner. For this purpose, the light beam might be shaped appropriately, such as by using an illumination source generating a light beam having known propagation properties, such as a known Gaussian profile. For this purpose, the illumination source itself may generate the light beam having the known properties, which, for example, is the case for many types of lasers, as the skilled person knows. Additionally or alternatively, the illumination source and/or the detector may have one or more beam-shaping elements, such as one or more lenses and/or one or more diaphragms, in order to provide a light beam having known properties, as the skilled person will recognize. Thus, as an example, one or more transfer elements may be provided, such as one or more transfer elements having known beam-shaping properties. Additionally or alternatively, the illumination source and/or the detector, such as the at least one optional transfer element, may have one or more wavelength-selective elements, such as one or more filters, such as one or more filter elements for filtering out wavelengths outside an excitation maximum of the at least one transversal optical sensor and/or the at least one longitudinal optical sensor.

Thus, generally, the evaluation device may be adapted to compare the beam cross-section and/or the diameter of the light beam with known beam properties of the light beam in order to determine the at least one item of information on the longitudinal position of the object, preferably from a known dependency of a beam diameter of the light beam on at least one propagation coordinate in a direction of propagation of the light beam and/or from a known Gaussian profile of the light beam.

In a specific embodiment, the evaluation device is adapted to determine a number N of pixels of at least one pixelated optical sensor of the detector, such as of the last longitudinal optical sensor, which are illuminated by the light beam, the evaluation device further being adapted to determine at least one longitudinal coordinate of the object by using the number N of pixels which are illuminated by the light beam. Therefore, the evaluation device may be adapted to compare, for each of the pixels, the signal to at least one threshold in order to determine whether the pixel is an illuminated pixel or not. This at least one threshold may be an individual threshold for each of the pixels or may be a threshold which is a uniform threshold for the whole matrix. In case a plurality of optical sensors is provided, at least one threshold may be provided for each of the optical sensors and/or for a group comprising at least two of the optical sensors, wherein, for two optical sensors, their respective thresholds may be identical or different. Thus, for each of the optical sensors, an individual threshold may be provided. The threshold may be predetermined and/or fixed. Alternatively, the at least one threshold may be variable. Thus, the at least one threshold may be determined individually for each measurement or groups of measurements. Thus, at least one algorithm may be provided adapted to determine the threshold.

The evaluation device may generally be adapted to determine at least one pixel having the highest illumination out of the pixels by comparing the signals of the pixels. Thus, the detector generally may be adapted to determine one or more pixels and/or an area or region of the matrix having the highest intensity of the illumination by the light beam. As an example, in this way, a center of illumination by the light beam may be determined. The highest illumination and/or the information about the at least one area or region of highest illumination may be used in various ways. Thus, as outlined above, the at least one above-mentioned threshold may be a variable threshold. As an example, the evaluation device may be adapted to choose the above-mentioned at least one threshold as a fraction of the signal of the at least one pixel having the highest illumination. Thus, the evaluation device may be adapted to choose the threshold by multiplying the signal of the at least one pixel having the highest illumination with a factor of $1/e^2$. This option is particularly preferred in case Gaussian propagation properties are assumed for the at least one light beam, since the threshold $1/e^2$ generally determines the borders of a light spot having a beam radius or beam waist generated by a Gaussian light beam on the optical sensor.

A further aspect of the present invention makes use of at least two detectors according to the present invention, wherein each of such detectors may be selected as of at least one detector according to one or more of the embodiments disclosed above or disclosed in further detail below. Thus, for optional embodiments of the method, reference might be made to the respective embodiments of the detector.

In a preferred embodiment, the at least one object might be illuminated by using at least one illumination source which generates primary light, wherein the at least one object elastically or inelastically reflects the primary light, thereby generating a plurality of light beams which propagate to one of the at least two detectors. The at least one illumination source may form or may not form a constituent part of each of the at least two detectors which. Thus, the at least one illumination source may be formed independently of the at least two detectors and may, therefore, particularly be located in at least one position which is separated from the at least two detectors. By way of example, the at least one illumination source itself may be or may comprise an ambient light source and/or may be or may comprise an artificial illumination source. This embodiment is preferably suited for an application in which at least two detectors, preferentially two identical detectors, are employed for acquiring depth information, in particular, for the purpose to providing a measurement volume which extends the inherent measurement volume of a single detector.

The inherent measurement volume of a single detector may, in many cases, be described as an approximate half-cone, wherein a first object which is located within the inherent measurement volume may be detected by the single detector whereas a second object which is located outside the inherent measurement volume can principally not be detected by the single detector. The conical surface of the approximate half-cone can be considered to be formed by a virtual reverse light beam which would be emitted by the at least one optical sensor. The virtual reverse light beam would, thus, emerge from the surface of the at least one optical sensor which, however, does not constitute a point source but rather an extended area. From simple geometrical considerations it can be deduced that no virtual reverse light beam emitted by the at least one optical sensor in this manner will able to reach all positions in all directions in the volume which surrounds the at least one optical sensor. However, the locations which may be virtually hit by the virtual reverse light beam form an approximate half-cone which can be described as the inherent measurement volume of the single detector.

Therefore, in order to be able to cover a large measurement volume which exceeds the inherent measurement volume of a single detector, at least two detectors may be used, wherein the at least two detectors may be identical or may differ from each other with respect to at least one certain technical property as described elsewhere. In general, the large measurement volume comprises an overlapping volume, which denotes a region in space, which may be coherent or not, wherein double or even multiple detection may occur, i.e. a specific object may be detected by two or more detectors independently, at the same time or at different times. Even in case when two or more detectors, particularly two or more identical detectors, are employed, the double or multiple detection of a specific object does not destroy a reliable acquisition of the depth information about the specific object in the overlapping volume. Since the at least one illumination source may be formed independently of the at least two detectors, typically, no relationship exists between a specific illumination source and a specific detector. Therefore, a reliable acquisition of the depth information will also be possible when at least two of the detectors point towards each other. As a result of this disconnection between the specific illumination source and the specific detector, the recording of the depth information about the specific object will not be impaired when the specific object may be located in the overlapping volume. On the contrary, the depth information in the overlapping volume which concerns a specific object may independently been acquired by more than one detector at the same time and can, thus, be used to improve the accuracy of the depth measurement for the specific object. By way of example, this improvement may be achieved by comparing respective depth values which are recorded simultaneously or successively for the same object by at least two separate single detectors.

In a further aspect of the present invention, a human-machine interface for exchanging at least one item of information between a user and a machine is proposed. The human-machine interface as proposed may make use of the fact that the above-mentioned detector in one or more of the embodiments mentioned above or as mentioned in further detail below may be used by one or more users for providing information and/or commands to a machine. Thus, preferably, the human-machine interface may be used for inputting control commands.

The human-machine interface comprises at least one detector according to the present invention, such as according to one or more of the embodiments disclosed above and/or according to one or more of the embodiments as disclosed in further detail below, wherein the human-machine interface is designed to generate at least one item of geometrical information of the user by means of the detector wherein the human-machine interface is designed to assign to the geometrical information at least one item of information, in particular at least one control command.

Generally, as used herein, the at least one item of geometrical information of the user may imply one or more items of information on a transversal position and/or on a longitudinal position of the user and/or one or more body parts of the user. Thus, preferably, the geometrical information of the user may imply one or more items of information on a transversal position and/or a longitudinal position as provided by the evaluation device of the detector. The user, a body part of the user or a plurality of body parts of the user may be regarded as one or more objects which may be detected by the at least one detector. Therein, precisely one detector may be provided, or a combination of a plurality of detectors may be provided. As an example, a plurality of detectors may be provided for determining positions of a plurality of body parts of the user and/or for determining an orientation of at least one body part of the user. The human-machine interface may comprise one or more detectors, wherein, in case a plurality of detectors is provided, the detectors may be identical or may differ. Herein, in case a plurality of detectors is used, the plurality of detectors, particularly the plurality of identical detectors, still allows for a reliable acquisition of depth information about the at least one object in an overlapping volume which may be recorded, as described above, by the plurality of detectors.

Thus, preferably, the at least one item of geometrical information of the user is selected from the group consisting of: a position of a body of the user; a position of at least one body part of the user; an orientation of a body of the user; an orientation of at least one body part of the user.

The human-machine interface may further comprise at least one beacon device connectable to the user. As used herein, a beacon device generally is an arbitrary device which may be detected by the at least one detector and/or which facilitates detection by the at least one detector. Thus, as will be outlined in further detail below, the beacon device may be an active beacon device adapted for generating the at least one light beam to be detected by the detector, such as by having one or more illumination sources for generating the at least one light beam. Additionally or alternatively, the beacon device may fully or partially be designed as a passive beacon device, such as by providing one or more reflective elements adapted to reflect a light beam generated by a separate illumination source. The at least one beacon device may permanently or temporarily be attached to the user. The attachment may take place by using one or more attachment means and/or by the user himself or herself, such as by the user holding the at least one beacon device by hand and/or by the user wearing the beacon device.

The human-machine interface may be adapted such that the detector may generate an information on the position of the at least one beacon device. Specifically in case a manner of attachment of the at least one beacon device to the user is known, from the at least one item of information on the position of the at least one beacon device at least one item of information regarding a position and/or an orientation of the user or one or more body parts of the user may be gained.

The beacon device preferably is one of a beacon device attachable to a body or a body part of the user and a beacon device which may be held by the user. As outlined above, the beacon device may fully or partially be designed as an active beacon device. Thus, the beacon device may comprise at least one illumination source adapted to generate at least one light beam to be transmitted to the detector, preferably at least one light beam having known beam properties. Additionally or alternatively, the beacon device may comprise at least one reflector adapted to reflect light generated by an illumination source, thereby generating a reflected light beam to be transmitted to the detector.

The beacon device preferably may comprise at least one of: a garment to be worn by the user, preferably a garment selected from the group consisting of a glove, a jacket, a hat, shoes, trousers and a suit; a stick that may be held by hand; a bat; a club; a racket; a cane; a toy, such as a toy gun.

In a further aspect of the present invention, an entertainment device for carrying out at least one entertainment function is disclosed. As used herein, an entertainment device is a device which may serve the purpose of leisure and/or entertainment of one or more users, in the following also referred to as one or more players. As an example, the entertainment device may serve the purpose of gaming, preferably computer gaming. Additionally or alternatively, the entertainment device may also be used for other purposes, such as for exercising, sports, physical therapy or motion tracking in general. Thus, the entertainment device may be implemented into a computer, a computer network or a computer system or may comprise a computer, a computer network or a computer system which runs one or more gaming software programs.

The entertainment device comprises at least one human-machine interface according to the present invention, such as according to one or more of the embodiments disclosed above and/or according to one or more of the embodiments disclosed below. The entertainment device is designed to enable at least one item of information to be input by a player by means of the human-machine interface. The at least one item of information may be transmitted to and/or may be used by a controller and/or a computer of the entertainment device.

The at least one item of information preferably may comprise at least one command adapted for influencing the course of a game. Thus, as an example, the at least one item of information may include at least one item of information on at least one of a movement, the orientation and a position of the player and/or of one or more body parts of the player, thereby allowing for the player to simulate a specific position and/or action required for gaming. As an example, one or more of the following movements may be simulated and communicated to a controller and/or a computer of the entertainment device: dancing; running; jumping; swinging of a racket; swinging of a bat; swinging of a club; pointing of an object towards another object, such as pointing of a toy gun towards a target.

The entertainment device, preferably a controller and/or a computer of the entertainment device, is designed to vary the entertainment function in accordance with the information. Thus, as outlined above, a course of a game might be influenced in accordance with the at least one item of information. Thus, the entertainment device might include one or more controllers which might be separate from the evaluation device of the at least one detector and/or which might be fully or partially identical to the at least one evaluation device or which might even include the at least one evaluation device. Preferably, the at least one controller might include one or more data processing devices, such as one or more computers and/or microcontrollers.

In a further embodiment of the present invention, the entertainment device may be part of an equipment, the equipment being a mobile piece or, in particular, an immobile piece, wherein the equipment may at least partially incorporate the entertainment device. The equipment may include a single, separate piece being located at a position, either a fixed position or a position at least intermittently subject to a variation, but the equipment may also comprise at least two pieces, preferably two to tell pieces, such as three, four, five, or six pieces, wherein the at least two pieces may be distributed over at least two positions differing from each other within an area, such as a room or a part thereof. Hereby, the entertainment device may be part of the equipment, wherein preferably some or each piece of the equipment may exhibit a part of the entertainment device, e.g. in such a manner that some or each piece of the equipment may comprise at least one detector according to the present invention or a part thereof, such as a sensor. As used herein, "immobile equipment" may include an immobile electronic article, in particular, designated as consumer electronics, wherein "consumer electronics" comprises electronic articles preferentially intended for everyday use, mainly in entertainment, communications and office matters, such as radio receivers, monitors, television sets, audio players, video players, personal computers and/or telephones. A particular example constituting the immobile equipment may be a surround system, which may for example be formed by a number of two, three, four, five, six or more separate pieces of the equipment, such as individual monitors or audio players, including loudspeakers, which may be distributed over an area, preferentially in a specific fashion, such as forming an arc-shaped assembly enclosing a room or a part thereof.

Additionally or alternatively, the entertainment device or a part thereof, such as one, some or each piece of the equipment, may further be equipped with one or more of the following devices: a photographic device, such as a camera, particularly a 2D camera, a picture analysis software, particularly a 2D picture analysis software, and a reference object, particularly a geometrically symmetric reference object, such as a book or a specially formed toy. Hereby, the reference object may also be a part of the immobile equipment and fulfill a further function of the entertainment device as described above and/or below, wherein the reference object may further comprise a detector, a 2D camera or another photographic device. Preferably, a constructive interaction of the photographic device, the picture analysis software and the particularly symmetric reference object, may facilitate an alignment of a 2D picture of an object in question as recorded by the photographic device with the 3D position of the same object as determined by the at least one detector.

In a further embodiment of the present invention, the object which may constitute a target of the at least one detector comprised within the at least one human-machine interface of the entertainment device, may be part of a controller as comprised within mobile equipment, wherein the mobile equipment may be configured to control another mobile equipment or immobile equipment. As used herein, "mobile equipment" may, thus, include mobile electronic articles, in particular, designated as consumer electronics, such as mobile phones, radio receivers, video recorders, audio players, digital cameras, camcorders, mobile computers, video game consoles and/or other devices adapted for remote control. This embodiment may particularly allow controlling immobile equipment with any kind of mobile equipment, preferably with a lesser number of pieces of equipment. As a non-limiting example, it may, thus, be possible to simultaneously control for example both a game console and a television set by using a mobile phone.

Additionally or alternatively, the object which may constitute the target of the detector may further be equipped with an additional sensor (apart from the sensors as comprised within the detector) particularly configured for determining a physical and/or chemical quantity related to the object, such as an inertia sensor for measuring the inertial motion of the object, or an acceleration sensor for determining the acceleration of the object. However, besides these preferred examples, other kinds of sensors adapted for acquiring further parameter related to the object, such as a vibrational sensor for determining vibrations of the object, a temperature sensor for recording the temperature of the object, or a humidity sensor for recording the humidity of the object may be employed. An application of the additional sensor within the object may allow improving the quality and/or the scope of the detection of the position of the object. As a non-limiting example, the additional inertia sensor and/or acceleration sensor may particularly be configured to record additional movements of the object, such as a rotation of the object, which may particularly be employed for increasing the accuracy of the object detection. Moreover, the additional inertia sensor and/or acceleration sensor may preferentially still be addressed in a case where the object being equipped with at least one of these sensors may leave a visual range of the detector comprised within the human-machine interface of the entertainment device. In this case, it might, nevertheless, be possible to follow the object after the object may have left the visual range of the detector by still being able to recording signals emitted from at least one of these sensors and using these signals for determining the location of the object by taking into account its actual inertia and acceleration values and calculating the position therefrom.

Additionally or alternatively, the object which may constitute the target of the detector may further be equipped with a further feature allowing both to simulate and/or to stimulate motions, for example by simulating motions of the object, wherein the object may be virtual or real and wherein the object may be controlled by a controller, and/or by stimulating motions of the object by applying the controller accordingly. This feature may particularly be employed for providing a more realistic entertainment experience for a user. As an illustrating example, a steering wheel as employed in an entertainment device may vibrate, wherein the amplitude of the vibrations may depend on a nature of a ground on which a virtual car may be driving on. As a further embodiment, the motion of the object may be stimulated by employing a gyroscope, which may be used for example for a stabilization of flying vehicles as described under the address en.wikipedia.org/wiki/gyroscope.

In a further embodiment of the present invention, the object which may constitute the target of the at least one detector may be equipped with at least one modulation device for modulating the illumination, in particular for a periodic modulation. Preferably, the object may comprise at least one illumination source, which may be part of the object or, alternatively or additionally, be held by the object or attached thereto and which may act as a beacon in a manner as described elsewhere in this application. The illumination may be adapted to generate at least one light beam to be transmitted to the detector, whereby the illumination source comprises a modulation device for modulating the illumination and/or the modulation device may be a separate device configured for controlling the emission of the illumination source.

According to this embodiment, apart from the fundamental modulation of the illumination source, the modulation device may generate additional modulation frequencies, also be denoted as "overtones", which might be used for transmitting any item of additional information or data from the object to the detector. This embodiment, which might also be designated as a "modulating retro-reflector", may open the way to employ the object equipped with the modulation device configured for generating both the fundamental and the additional modulation frequencies as remote control. Further, an already existing remote control may be replaced by the object equipped with the described modulation device. Against this background, this kind of object and a piece configured for remote control may interchangeably be used within an arrangement incorporating a detector according to the present invention.

In a further embodiment of the present invention, the entertainment device may further be equipped with additional items such as items commonly used within such an environment. Glasses or other devices being configured for creating a 3D vision within the mind of a player may constitute a particular example.

In a further embodiment of the present invention, the entertainment device may further be equipped with an augmented reality application. As further used herein, "augmented reality" may describe a live perception of reality comprising elements which may be modified by computer-generated data primarily related to physical phenomena such as sound, images, or others. An example may be vision glasses which are particularly adapted for augmented reality applications. Another example may include an arrangement comprising at least two detectors, preferably a multitude thereof, wherein the detectors may particularly be arranged to cover an area within a room or a preferably large part thereof, a photographic device, such as a camera, particularly a 2D camera, and an augmented reality application, wherein the arrangement might be employed to transform a real area into a playing filed, which may also be designated as an entertainment field.

In a further aspect of the present invention, a tracking system for tracking the position of at least one movable object is provided. As used herein, a tracking system is a device which is adapted to gather information on a series of past positions of the at least one object or at least one part of an object. Additionally, the tracking system may be adapted to provide information on at least one predicted future position of the at least one object or the at least one part of the object. The tracking system may have at least one track controller, which may fully or partially be embodied as an electronic device, preferably as at least one data processing device, more preferably as at least one computer or microcontroller. Again, the at least one track controller may comprise the at least one evaluation device and/or may be part of the at least one evaluation device and/or may fully or partially be identical to the at least one evaluation device.

The tracking system comprises at least one detector according to the present invention, such as at least one detector as disclosed in one or more of the embodiments listed above and/or as disclosed in one or more of the embodiments below. The tracking system further comprises at least one track controller. The tracking system may comprise one, two or more detectors, particularly two or more identical detectors, which allow for a reliable acquisition of depth information about the at least one object in an overlapping volume between the two or more detectors. The track controller is adapted to track a series of positions of the object, each position comprising at least one item of information on a transversal position of the object at a specific point in time and at least one item of information on a longitudinal position of the object at a specific point in time.

The tracking system may further comprise at least one beacon device connectable to the object. For a potential definition of the beacon device, reference may be made to the disclosure above. The tracking system preferably is adapted such that the detector may generate an information on the position of the object of the at least one beacon device. For potential embodiments of the beacon device, reference may be made to the disclosure above. Thus, again, the beacon device may fully or partially be embodied as an active beacon device and/or as a passive beacon device. As an example, the beacon device may comprise at least one illumination source adapted to generate at least one light beam to be transmitted to the detector. Additionally or alternatively, the beacon device may comprise at least one reflector adapted to reflect light generated by an illumination source, thereby generating a reflected light beam to be transmitted to the detector.

The tracking system may be adapted to initiate one or more actions of the tracking system itself and/or of one or more separate devices. For the latter purpose, the tracking system, preferably the track controller, may have one or more wireless and/or wire-bound interfaces and/or other types of control connections for initiating at least one action. Preferably, the at least one track controller may be adapted to initiate at least one action in accordance with at least one actual position of the object. As an example, the action may be selected from the group consisting of: a prediction of a future position of the object; pointing at least one device towards the object; pointing at least one device towards the detector; illuminating the object; illuminating the detector.

As an example of application of a tracking system, the tracking system may be used for continuously pointing at least one first object to at least one second object even though the first object and/or the second object might move. Potential examples, again, may be found in industrial applications, such as in robotics and/or for continuously working on an article even though the article is moving, such as during manufacturing in a manufacturing line or assembly line. Additionally or alternatively, the tracking system might be used for illumination purposes, such as for continuously illuminating the object by continuously pointing an illumination source to the object even though the object might be moving.

Further applications might be found in communication systems, such as in order to continuously transmit information to a moving object by pointing a transmitter towards the moving object.

In a further aspect of the present invention, a camera for imaging at least one object is disclosed. The camera comprises at least one detector according to the present invention, such as disclosed in one or more of the embodiments given above or given in further detail below.

Thus, specifically, the present application may be applied in the field of photography. Thus, the detector may be part of a photographic device, specifically of a digital camera. Specifically, the detector may be used for 3D photography, specifically for digital 3D photography. Thus, the detector may form a digital 3D camera or may be part of a digital 3D camera. As used herein, the term "photography" generally refers to the technology of acquiring image information of at least one object. As further used herein, a "camera" generally is a device adapted for performing photography. As further used herein, the term "digital photography" generally refers to the technology of acquiring image information of at least one object by using a plurality of light-sensitive elements adapted to generate electrical signals indicating an intensity and/or color of illumination, preferably digital electrical signals. As further used herein, the term "3D photography" generally refers to the technology of acquiring image information of at least one object in three spatial dimensions. Accordingly, a 3D camera is a device adapted for performing 3D photography. The camera generally may be adapted for acquiring a single image, such as a single 3D image, or may be adapted for acquiring a plurality of images, such as a sequence of images. Thus, the camera may also be a video camera adapted for video applications, such as for acquiring digital video sequences.

Thus, generally, the present invention further refers to a camera, specifically a digital camera, more specifically a 3D camera or digital 3D camera, for imaging at least one object. As outlined above, the term imaging, as used herein, generally refers to acquiring image information of at least one object. The camera comprises at least one detector according to the present invention. The camera, as outlined above, may be adapted for acquiring a single image or for acquiring a plurality of images, such as image sequence, preferably for acquiring digital video sequences. Thus, as an example, the camera may be or may comprise a video camera. In the latter case, the camera preferably comprises a data memory for storing the image sequence.

As used within the present invention, the expression "position" generally refers to at least one item of information regarding one or more of an absolute position and an orientation of one or more points of the object. Thus, specifically, the position may be determined in a coordinate system of the detector, such as in a Cartesian coordinate system. Additionally or alternatively, however, other types of coordinate systems may be used, such as polar coordinate systems and/or spherical coordinate systems.

In a further aspect of the present invention, a method for determining a position of at least one object is disclosed. The method preferably may make use of at least one detector according to the present invention, such as of at least one detector according to one or more of the embodiments disclosed above or disclosed in further detail below. Thus, for optional embodiments of the method, reference might be made to the embodiments of the detector.

The method comprises the following steps, which may be performed in the given order or in a different order. Further, additional method steps might be provided which are not listed. Further, two or more or even all of the method steps might be performed at least partially simultaneously. Further, two or more or even all of the method steps might be performed twice or even more than twice, repeatedly.

In a first method step, which might also be referred to as a step of determining at least one transversal position, at least one transversal optical sensor is used. The transversal optical sensor determines a transversal position of at least one light beam traveling from the object to the detector, wherein the transversal position is a position in at least one dimension perpendicular to an optical axis of the detector. The transversal optical sensor generates at least one transversal sensor signal.

In a further method step, which might also be referred to as a step of determining at least one longitudinal position, at least one longitudinal optical sensor is used. The longitudinal optical sensor has at least one sensor region. The longitudinal optical sensor generates at least one longitudinal sensor signal in a manner dependent on an illumination of the sensor region by the light beam. The longitudinal sensor signal, given the same total power of the illumination, is dependent on a beam cross-section of the light beam in the sensor region.

In a further method step, which might also be referred to as an evaluation step, at least one evaluation device is used. The evaluation device generates at least one item of information on a transversal position of the object by evaluating the transversal sensor signal and wherein the evaluation device further generates at least one item of information on a longitudinal position of the object by evaluating the longitudinal sensor signal.

In a further aspect of the present invention, a use of a detector according to the present invention is disclosed. Therein, a use of the detector for a purpose of use is proposed, selected from the group consisting of: a distance measurement, in particular in traffic technology; a position measurement, in particular in traffic technology; an entertainment application; a security application; a human-machine interface application; a tracking application; a photography application; an imaging application or camera application; a mapping application for generating maps of at least one space.

In the following, some additional remarks regarding potential embodiments of the detector, the human-machine interface, the tracking system and the method according to the present invention are given. As outlined above, preferably, for potential details of the setups of the at least one transversal optical detector and the at least one longitudinal optical detector, reference may be made to WO 2012/110924 A1, specifically with regard to potential electrode materials, organic materials, inorganic materials, layer setups and further details.

The object can generally be a living or else inanimate object. Examples of objects which can be detected completely or partly by means of the detector are described in even greater detail below.

Further, with regard to potential embodiments of the optional transfer device, reference may be made to WO 2012/110924 A1. Thus, this optional transfer device can comprise for example at least one beam path. The transfer device can for example comprise one or a plurality of mirrors and/or beam splitters and/or beam deflecting elements in order to influence a direction of the electromagnetic radiation. Alternatively or additionally, the transfer device can comprise one or a plurality of imaging elements which can have the effect of a converging lens and/or a diverging lens. By way of example, the optional transfer device can have one or a plurality of lenses and/or one or a plurality of convex and/or concave mirrors. Once again alternatively or additionally, the transfer device can have at least one wavelength-selective element, for example at least one optical filter. Once again alternatively or additionally, the transfer device can be designed to impress a predefined beam profile on the electromagnetic radiation, for example, at the location of the sensor region and in particular the sensor area. The abovementioned optional embodiments of the optional transfer device can, in principle, be realized individually or in any desired combination.

Further, generally, it shall be noted that, in the context of the present invention, an optical sensor may refer to an arbitrary element which is designed to convert at least one optical signal into a different signal form, preferably into at least one electrical signal, for example a voltage signal and/or a current signal. In particular the optical sensor can comprise at least one optical-electrical converter element, preferably at least one photodiode and/or at least one solar cell. As is explained in even greater detail below, in the context of the present invention, preference is attached particularly to a use of at least one organic optical sensor, that is to say an optical sensor which comprises at least one organic material, for example at least one organic semiconductor material.

In the context of the present invention, a sensor region should be understood to mean a two-dimensional or three-dimensional region which preferably, but not necessarily, is continuous and can form a continuous region, wherein the sensor region is designed to vary at least one measurable property, in a manner dependent on the illumination. By way of example, said at least one property can comprise an electrical property, for example, by the sensor region being designed to generate, solely or in interaction with other elements of the optical sensor, a photo voltage and/or a photocurrent and/or some other type of signal. In particular, the sensor region can be embodied in such a way that it generates a uniform, preferably a single, signal in a manner dependent on the illumination of the sensor region. The sensor region can thus be the smallest unit of the optical sensor for which a uniform signal, for example, an electrical signal, is generated, which preferably can no longer be subdivided to partial signals, for example for partial regions of the sensor region. The transversal optical sensor and/or the longitudinal optical sensor each can have one or else a plurality of such sensor regions, the latter case for example by a plurality of such sensor regions being arranged in a two-dimensional and/or three-dimensional matrix arrangement.

The at least one sensor region can comprise for example at least one sensor area, that is to say a sensor region whose lateral extent considerably exceeds the thickness of the sensor region, for example by at least a factor of 10, preferably by at least a factor of 100 and particularly preferably by at least a factor of 1000. Examples of such sensor areas can be found in organic or inorganic photovoltaic elements, for example, in accordance with the prior art described above, or else in accordance with the exemplary embodiments described in even greater detail below. The detector can have one or a plurality of such optical sensors and/or sensor regions. By way of example, a plurality of optical sensors can be arranged linearly in a spaced-apart manner or in a two-dimensional arrangement or else in a three-dimensional arrangement, for example by a stack of photovoltaic elements being used, preferably organic photovoltaic elements, preferably a stack in which the sensor areas of the photovoltaic elements are arranged parallel to one another. Other embodiments are also possible.

The optional transfer device can, as explained above, be designed to feed light propagating from the object to the detector to the transversal optical sensor and/or the longitudinal optical sensor, preferably successively. As explained above, this feeding can optionally be effected by means of imaging or else by means of non-imaging properties of the transfer device. In particular the transfer device can also be designed to collect the electromagnetic radiation before the latter is fed to the transversal and/or longitudinal optical sensor. The optional transfer device can also, as explained in even greater detail below, be wholly or partly a constituent part of at least one optional illumination source, for example by the illumination source being designed to provide a light beam having defined optical properties, for example having a defined or precisely known beam profile, for example at least one Gaussian beam, in particular at least one laser beam having a known beam profile.

For potential embodiments of the optional illumination source, reference may be made to WO 2012/110924 A1. Still, other embodiments are feasible. Light emerging from the object can originate in the object itself, but can also optionally have a different origin and propagate from this origin to the object and subsequently toward the transversal and/or longitudinal optical sensor. The latter case can be effected for example by at least one illumination source being used. This illumination source can for example be or comprise an ambient light source and/or may be or may comprise an artificial illumination source. By way of example, the detector itself can comprise at least one illumination source, for example at least one laser and/or at least one incandescent lamp and/or at least one semiconductor light source, for example, at least one light-emitting diode, in particular an organic and/or inorganic light-emitting diode. On account of their generally defined beam profiles and other properties of handleability, the use of one or a plurality of lasers as illumination source or as part thereof, is particularly preferred. The illumination source itself can be a constituent part of the detector or else be formed independently of the detector. The illumination source can be integrated in particular into the detector, for example a housing of the detector. Alternatively or additionally, at least one illumination source can also be integrated into the object or connected or spatially coupled to the object.

The light emerging from the object can accordingly, alternatively or additionally from the option that said light originates in the object itself emerge from the illumination source and/or be excited by the illumination source. By way of example, the electromagnetic light emerging from the object can be emitted by the object itself and/or be reflected by the object and/or be scattered by the object before it is fed to the optical sensor. In this case, emission and/or scattering of the electromagnetic radiation can be effected without spectral influencing of the electromagnetic radiation or with such influencing. Thus, by way of example, a wavelength shift can also occur during scattering, for example according to Stokes or Raman. Furthermore, emission of light can be excited, for example, by a primary light source, for example by the object or a partial region of the object being excited to effect luminescence, in particular phosphorescence and/or fluorescence. Other emission processes are also possible, in principle. If a reflection occurs, then the object can have for example at least one reflective region, in particular at least one reflective surface. Said reflective surface can be a part of the object itself, but can also be for example a reflector which is connected or spatially coupled to the object, for example a reflector plaque connected to the object. If at least one reflector is used, then it can in turn also be regarded as part of the detector which is connected to the object, for example, independently of other constituent parts of the detector.

The at least one illumination source of the detector can generally be adapted to the emission and/or reflective properties of the object, for example in terms of its wavelength. Various embodiments are possible.

The at least one optional illumination source generally may emit light in at least one of: the ultraviolet spectral range, preferably in the range of 200 nm to 380 nm; the visible spectral range (380 nm to 780 nm); the infrared spectral range, preferably in the range of 780 nm to 3.0 micrometers. Most preferably, the at least one illumination source is adapted to emit light in the visible spectral range, preferably in the range of 500 nm to 780 nm, most preferably at 650 nm to 750 nm or at 690 nm to 700 nm.

The feeding of the light to the transversal and/or longitudinal optical sensor can be effected in particular in such a way that a light spot, for example having a round, oval or differently configured cross section, is produced on the optional sensor area of the transversal and/or longitudinal optical sensor. By way of example, the detector can have a visual range, in particular a solid angle range and/or spatial range, within which objects can be detected. Preferably, the optional transfer device is designed in such a way that the light spot, for example in the case of an object arranged within a visual range of the detector, is arranged completely on the sensor region, in particular the sensor area. By way of example, a sensor area can be chosen to have a corresponding size in order to ensure this condition.

The at least one longitudinal optical sensor, as outlined above, can be designed for example in such a way that the longitudinal sensor signal, given the same power of the illumination, that is to say for example given the same integral over the intensity of the illumination on the sensor area, is dependent on the geometry of the illumination, that is to say for example on the diameter and/or the equivalent diameter for the sensor spot. By way of example, the longitudinal optical sensor can be designed in such a way that upon a doubling of the beam cross section given the same total power, a signal variation occurs by at least a factor of 3, preferably by at least a factor of 4, in particular a factor of 5 or even a factor of 10. This condition can hold true for example for a specific focusing range, for example for at least one specific beam cross section. Thus, by way of example, the longitudinal sensor signal can have, between at least one optimum focusing at which the signal can have for example at least one global or local maximum and a focusing outside said at least one optimum focusing, a signal difference by at least a factor of 3, preferably by at least a factor of 4, in particular a factor of 5 or even a factor of 10. In particular, the longitudinal sensor signal can have as a function of the geometry of the illumination, for example of the diameter or equivalent diameter of a light spot, at least one pronounced maximum, for example with a boost by at least a factor of 3, particularly preferably by at least a factor of 4 and particularly preferably by at least a factor of 10. Consequently, the longitudinal optical sensor may be based on the above-mentioned FiP-effect, which is disclosed in great detail in WO 2012/110924 A1. Thus, specifically in sDSCs, the focusing of the light beam may play a decisive role, i.e. the cross-section or cross-sectional area on which a certain number of auf photons (nph) is incident. The more tightly the light beam is focused, i.e. the smaller its cross-section, the higher the photo current may be. The term 'FiP' expresses the relationship between the cross-section $\phi$ (Fi) of the incident beam and the solar cell's power (P).

The at least one longitudinal optical sensor is combined with at least one transversal optical sensor in order to preferably provide appropriate position information of the object.

Such effects of the dependence of the at least one longitudinal sensor signal on a beam geometry, preferably a beam cross-section of the at least one light beam, were observed in the context of the investigations leading to the present invention in particular in the case of organic photovoltaic components, that is to say photovoltaic components, for example, solar cells, which comprise at least one organic material, for example at least one organic p-semiconducting material and/or at least one organic dye. By way of example, such effects, as is explained in even greater detail below by way of example, were observed in the case of dye solar cells, that is to say components which have at least one first electrode, at least one n-semiconducting metal oxide, at least one dye, at least one p-semiconducting organic material, preferably a solid organic p-type semiconductor, and at least one second electrode. Such dye solar cells, preferably solid dye solar cells (solid dye sensitized solar cells, sDSC), are known in principle in numerous variations from the literature. The described effect of the dependence of the sensor signal on a geometry of the illumination on the sensor area and a use of this effect have not, however, been described heretofore.

In particular, the at least one longitudinal optical sensor can be designed in such a way that the sensor signal, given the same total power of the illumination, is substantially independent of a size of the sensor region, in particular of a size of the sensor area, in particular as long as the light spot of the illumination lies completely within the sensor region, in particular the sensor area. Consequently, the longitudinal sensor signal can be dependent exclusively on a focusing of the electromagnetic rays on the sensor area. In particular the sensor signal can be embodied in such a way that a photocurrent and/or a photo voltage per sensor area have/has the same values given the same illumination, for example the same values given the same size of the light spot.

The evaluation device can comprise in particular at least one data processing device, in particular an electronic data processing device, which can be designed to generate the at least one item of information on the transversal position of the object by evaluating the at least one transversal sensor signal and to generate the at least one item of information on the longitudinal position of the object by evaluating the at least one longitudinal sensor signal. Thus, the evaluation device is designed to use the at least one transversal sensor signal and the at least one longitudinal sensor signal as input variables and to generate the items of information on the transversal position and the longitudinal position of the object by processing these input variables. The processing can be done in parallel, subsequently or even in a combined manner. The evaluation device may use an arbitrary process for generating these items of information, such as by calculation and/or using at least one stored and/or known relationship. Besides the at least one transversal sensor signal and at least one longitudinal sensor signal, one or a plurality of further parameters and/or items of information can influence said relationship, for example at least one item of information about a modulation frequency. The relationship can be determined or determinable empirically, analytically or else semi-empirically. Particularly preferably, the relationship comprises at least one calibration curve, at least one set of calibration curves, at least one function or a combination of the possibilities mentioned. One or a plurality of calibration curves can be stored for example in the form of a set of values and the associated function values thereof, for example in a data storage device and/or a table. Alternatively or additionally, however, the at least one calibration curve can also be stored for example in parameterized form and/or as a functional equation. Separate relationships for processing the at least one transversal sensor signal into the at least one item of information on the transversal position and for processing the at least one longitudinal sensor signal into the at least one item of information on the longitudinal position may be used. Alternatively, at least one combined relationship for processing the sensor signals is feasible. Various possibilities are conceivable and can also be combined.

By way of example, the evaluation device can be designed in terms of programming for the purpose of determining the items of information. The evaluation device can comprise in particular at least one computer, for example at least one microcomputer. Furthermore, the evaluation device can comprise one or a plurality of volatile or nonvolatile data memories. As an alternative or in addition to a data processing device, in particular at least one computer, the evaluation device can comprise one or a plurality of further electronic components which are designed for determining the items of information, for example an electronic table and in particular at least one look-up table and/or at least one application-specific integrated circuit (ASIC).

The combination of the at least one item of information on the transversal position and the at least one item of information on the longitudinal position allows for a multiplicity of possible uses of the detector, which will be described by way of example hereinafter. As outlined in great detail in WO 2012/110924 A1, a cross-section of the light beam, resulting in a specific diameter or equivalent diameter of a light spot on the sensor region of the at least one longitudinal optical sensor, can be dependent on a distance between the object and the detector and/or on the optional transfer device of the detector, for example at least one detector lens. By way of example, a variation of the distance between the object and a lens of the optional transfer device can lead to a defocusing of the illumination on the sensor region, accompanied by a change in the geometry of the illumination, for example a widening of a light spot, which can result in a correspondingly altered longitudinal sensor signal or a multiplicity of altered longitudinal sensor signals, in case a plurality of longitudinal optical sensors is used. Even without a transfer device, by way of example, from a known beam profile from the sensor signal and/or a variation thereof, for example, by means of a known beam profile and/or a known propagation of the light beam, it is possible to deduce a defocusing and/or the geometrical information. By way of example, given a known total power of the illumination, it is thus possible to deduce from the longitudinal sensor signal of the longitudinal optical sensor a geometry of the illumination and therefrom in turn the geometrical information, in particular at least one item of location information of the object.

Similarly, the at least one transversal optical sensor allows for an easy detection of a transversal position of the object. For this purpose, use may be made of the fact that a change in a transversal position of the object generally will lead to a change in a transversal position of the light beam in the sensor region of the at least one transversal optical sensor. Thus, for example by detecting a transversal position of a light spot generated by the light beam impinging on a sensor region, such as a sensor area, of the transversal optical sensor, the transversal position or at least one item of information on the transversal position of the object may be generated. Thus, the position of the light spot may be determined by comparing currents and/or voltage signals of partial electrodes of the transversal optical sensor, such as by forming at least one ratio of at least two currents through at least two different partial electrodes. For this measurement principle, as an example, reference may be made to U.S. Pat. No. 6,995,445 and/or US 2007/0176165 A1. The above-mentioned at least one relationship between the at least one transversal sensor signal and the at least one item of information on the transversal position of the object may include a known relationship between a transversal position of the light spot on a sensor region of the transversal optical sensor and a transversal position of the object. For this purpose, known imaging properties of the detector, specifically known imaging properties of at least one transfer device of the detector, may be used. Thus, as an example, the transfer device may include at least one lens, and the known imaging properties may make use of a known lens equation of the lens, thereby allowing for a transformation of at least one transversal coordinate of a light spot into at least one transversal coordinate of the object, as the skilled person will recognize. Therein, the known relationship may also make use of additional information, such as the at least one longitudinal sensor signal and/or the at least one item of information on the longitudinal position of the object. Thus, by using the at least one longitudinal sensor signal, the evaluation device may, as an example, first determine at least one item of information on a lateral position of the object, such as at least one distance between the object and the detector, specifically the transfer device and, more preferably, at least one lens of the transfer device. This item of information on the longitudinal position of the object may then be used in the lens equation in order to transform the at least one transversal sensor signal into the at least one item of information on the transversal position of the object, such as by transforming the at least one transversal coordinate of the light spot in the sensor region of the at least one transversal optical sensor into at least one transversal coordinate of the object. Other algorithms are feasible.

As outlined above, the total intensity of total power of the light beam is often unknown, since this total power e.g. may depend on the properties of the object, such as reflecting properties, and/or may depend on a total power of an illumination source and/or may depend on a large number of environmental conditions. Since the above-mentioned known relationship between the at least one longitudinal optical sensor signal and a beam cross-section of the light beam in the at least one sensor region of the at least one longitudinal optical sensor and, thus, a known relationship between the at least one longitudinal optical sensor signal and the at least one item of information on the longitudinal position of the object may depend on the total power of total intensity of the light beam, various ways of overcoming this uncertainty are feasible. Thus, as outlined in great detail in WO 2012/110924 A1, a plurality of longitudinal sensor signals may be detected by the same longitudinal optical sensor, such as by using different modulation frequencies of an illumination of the object. Thus, at least two longitudinal sensor signals may be acquired at different frequencies of a modulation of the illumination, wherein, from the at least two sensor signals, for example by comparison with corresponding calibration curves, it is possible to deduce the total power and/or the geometry of the illumination, and/or therefrom, directly or indirectly, to deduce the at least one item of information on the longitudinal position of the object.

Additionally or alternatively, however, as outlined above, the detector may comprise a plurality of longitudinal optical sensors, each longitudinal optical sensor being adapted to generate at least one longitudinal sensor signal. The longitudinal sensor signals generated by the longitudinal optical sensors may be compared, in order to gain information on the total power and/or intensity of the light beam and/or in order to normalize the longitudinal sensor signals and/or the at least one item of information on the longitudinal position of the object for the total power and/or total intensity of the light beam. Thus, as an example, a maximum value of the longitudinal optical sensor signals may be detected, and all longitudinal sensor signals may be divided by this maximum value, thereby generating normalized longitudinal optical sensor signals, which, then, may be transformed by using the above-mentioned known relationship, into the at least one item of longitudinal information on the object. Other ways of normalization are feasible, such as a normalization using a mean value of the longitudinal sensor signals and dividing all longitudinal sensor signals by the mean value. Other options are possible. Each of these options is suited to render the transformation independent from the total power and/or intensity of the light beam. In addition, information on the total power and/or intensity of the light beam might be generated.

The detector described can advantageously be developed in various ways. Thus, the detector can furthermore have at least one modulation device for modulating the illumination, in particular for periodic modulation, in particular a periodic beam interrupting device. A modulation of the illumination should be understood to mean a process in which a total power of the illumination is varied, preferably periodically, in particular with one or a plurality of modulation frequencies. In particular, a periodic modulation can be effected between a maximum value and a minimum value of the total power of the illumination. The minimum value can be 0, but can also be >0, such that, by way of example, complete modulation does not have to be effected. The modulation can be effected for example in a beam path between the object and the optical sensor, for example by the at least one modulation device being arranged in said beam path. Alternatively or additionally, however, the modulation can also be effected in a beam path between an optional illumination source—described in even greater detail below—for illuminating the object and the object, for example by the at least one modulation device being arranged in said beam path. A combination of these possibilities is also conceivable. The at least one modulation device can comprise for example a beam chopper or some other type of periodic beam interrupting device, for example comprising at least one interrupter blade or interrupter wheel, which preferably rotates at constant speed and which can thus periodically interrupt the illumination. Alternatively or additionally, however, it is also possible to use one or a plurality of different types of modulation devices, for example modulation devices based on an electro-optical effect and/or an acousto-optical effect. Once again alternatively or additionally, the at least one optional illumination source itself can also be designed to generate a modulated illumination, for example by said illumination source itself having a modulated intensity and/or total power, for example a periodically modulated total power, and/or by said illumination source being embodied as a pulsed illumination source, for example as a pulsed laser. Thus, by way of example, the at least one modulation device can also be wholly or partly integrated into the illumination source. Various possibilities are conceivable.

The detector can be designed in particular to detect at least two sensor signals in the case of different modulations, in particular at least two sensor signals at respectively different modulation frequencies. The evaluation device can be designed to generate the geometrical information from the at least two sensor signals. As described above, in this way, by way of example, it is possible to resolve ambiguities and/or it is possible to take account of the fact that, for example, a total power of the illumination is generally unknown.

Further possible embodiments of the detector relate to the embodiment of the at least one optional transfer device. As explained above, said at least one transfer device can have imaging properties or else can be embodied as a pure non-imaging transfer device, which has no influence on a focusing of the illumination. It is particularly preferred, however, if the transfer device has at least one imaging element, for example at least one lens and/or at least one curved mirror, since, in the case of such imaging elements, for example, a geometry of the illumination on the sensor region can be dependent on a relative positioning, for example a distance, between the transfer device and the object. Generally, it is particularly preferred if the transfer device is designed in such a way that the electromagnetic radiation which emerges from the object is transferred completely to the sensor region, for example is focused completely onto the sensor region, in particular the sensor area, in particular if the object is arranged in a visual range of the detector.

As explained above, the optical sensor can furthermore be designed in such a way that the sensor signal, given the same total power of the illumination, is dependent on a modulation frequency of a modulation of the illumination. The detector can be embodied, in particular, as explained above, in such a way that sensor signals at different modulation frequencies are picked up, for example in order to generate one or a plurality of further items of information about the object. As described above, by way of example, a sensor signal at at least two different modulation frequencies can, in each case, be picked up, wherein, by way of example, in this way, a lack of information about a total power of the illumination can be supplemented. By way of example, by comparing the at least two sensor signals picked up at different modulation frequencies with one or a plurality of calibration curves, which can be stored for example in a data storage device of the detector, even in the case of an unknown total power of the illumination, it is possible to deduce a geometry of the illumination, for example a diameter or an equivalent diameter of a light spot on the sensor area. For this purpose, by way of example, it is possible to use the at least one evaluation device described above, for example at least one data processing data, which can be designed to control such picking-up of sensor signals at different frequencies and which can be designed to compare said sensor signals with the at least one calibration curve in order to generate therefrom the geometrical information, for example information about a geometry of the illumination, for example information about a diameter or equivalent diameter of a light spot of the illumination on a sensor area of the optical sensor. Furthermore, as is explained in even greater detail below, the evaluation device can alternatively or additionally be designed to generate at least one item of geometrical information about the object, for example at least one item of location information. This generation of the at least one item of geometrical information, as explained above, can be effected for example taking account of at least one known relationship between a positioning of the object relative to the detector and/or the transfer device or a part thereof and a size of a light spot, for example empirically, semi-empirically or analytically using corresponding imaging equations.

In contrast to known detectors, in which a spatial resolution and/or imaging of objects is also generally tied to the fact that the smallest possible sensor areas are used, for example the smallest possible pixels in the case of CCD chips, the sensor region of the proposed detector can be embodied in a very large fashion, in principle, since for example the geometrical information, in particular the at least one item of location information, about the object can be generated from a known relationship for example between the geometry of the illumination and the sensor signal. Accordingly, the sensor region can have for example a sensor area, for example an optical sensor area, which is at least 0.001 $mm^2$, in particular at least 0.01 $mm^2$, preferably at least 0.1 $mm^2$, more preferably at least 1 $mm^2$, more preferably at least 5 $mm^2$, more preferably at least 10 $mm^2$, in particular at least 100 $mm^2$ or at least 1000 $mm^2$ or even at least 10 000 $mm^2$. In particular, sensor areas of 100 $cm^2$ or more can be used. The sensor area can generally be adapted to the application. In particular, the sensor area should be chosen in such a way that, at least if the object is situated within a visual range of the detector, preferably within a predefined viewing angle and/or a predefined distance from the detector, the light spot is always arranged within the sensor area. In this way, it can be ensured that the light spot is not trimmed by the limits of the sensor region, as a result of which signal corruption could occur.

As described above, the sensor region can be in particular a continuous sensor region, in particular a continuous sensor area, which can preferably generate a uniform, in particular a single, sensor signal. Consequently, the sensor signal can be in particular a uniform sensor signal for the entire sensor region, that is to say a sensor signal to which each partial region of the sensor region contributes, for example additively. The sensor signal can generally, as explained above, in particular be selected from the group consisting of a photocurrent and a photo voltage.

The optical sensor can comprise in particular at least one semiconductor detector and/or be at least one semiconductor detector. In particular, the optical sensor can comprise at least one organic semiconductor detector or be at least one organic semiconductor detector, that is to say a semiconductor detector comprising at least one organic semiconducting material and/or at least one organic sensor material, for example at least one organic dye. Preferably, the organic semiconductor detector can comprise at least one organic solar cell and particularly preferably a dye solar cell, in particular a solid dye solar cell. Exemplary embodiments of such preferred solid dye solar cells are explained in even greater detail below.

In particular, the optical sensor can comprise at least one first electrode, at least one n-semiconducting metal oxide, at least one dye, at least one p-semiconducting organic material, preferably at least one solid p-semiconducting organic material, and at least one second electrode. Generally, however, it is pointed out that the described effect in which the sensor signal, given a constant total power, is dependent on a geometry of the illumination of the sensor region is with high probability not restricted to organic solar cells and in particular not to dye solar cells. Without intending to restrict the scope of protection of the invention by this theory, and without the invention being bound to the correctness of this theory, it is supposed that generally photovoltaic elements are suitable as optical sensors in which at least one semiconducting material having trap states is used. Consequently, the optical sensor can comprise at least one n-semiconducting material and/or at least one p-semiconducting material which can have for example a conduction band and a valence band, wherein, in the case of organic materials, conduction band and valence band should correspondingly be replaced by LUMO (lowest unoccupied molecular orbital) and HOMO (highest occupied molecular orbital).

Trap states should be understood to mean energetically possible states which are disposed between the conduction band (or LUMO) and the valence band (or HOMO) and which can be occupied by charge carriers. By way of example, it is possible to provide trap states for hole conduction which are disposed at at least one distance $\Delta E_h$ above the valence band (or HOMO) and/or trap states for electron conduction which are disposed at at least one distance $\Delta E_e$ below the conduction band (or LUMO). Such traps can be achieved for example by impurities and/or defects, which can optionally also be introduced in a targeted manner, or can be present intrinsically. By way of example, in the case of a low intensity, that is to say for example in the case of a light spot having a large diameter, only a low current can flow, since firstly the trap states are occupied before holes in the conduction band or electrons in the valence band contribute to a photocurrent. It is only starting from a higher intensity, that is to say for example starting from a more intense focusing of the light spot in the sensor region, that a considerable photocurrent can then flow. The described frequency dependence can be explained for example by the fact that charge carriers leave the traps again after a residence duration $\tau$, such that the described effect occurs only in the case of modulated illumination with a high modulation frequency.

By way of example, the detector can be designed to bring about a modulation of the illumination of the object and/or at least one sensor region of the detector, such as at least one sensor region of the at least one longitudinal optical sensor, with a frequency of 0.05 Hz to 1 MHz, such as 0.1 Hz to 10 kHz. As outlined above, for this purpose, the detector may comprise at least one modulation device, which may be integrated into the at least one optional illumination source and/or may be independent from the illumination source. Thus, at least one illumination source might, by itself, be adapted to generate the above-mentioned modulation of the illumination, and/or at least one independent modulation device may be present, such as at least one chopper and/or at least one device having a modulated transmissibility, such as at least one electro-optical device and/or at least one acousto-optical device.

The above-mentioned trap states can be present for example with a density of $10^{-5}$ to $10^{-1}$, relative to the n-semiconducting material and/or the p-semiconducting material and/or the dye. The energy differences $\Delta E$ with respect to the conduction band and with respect to the valence band can be in particular 0.05-0.3 eV.

The detector has, as described above, at least one evaluation device. In particular, the at least one evaluation device can also be designed to completely or partly control or drive the detector, for example by the evaluation device being designed to control one or a plurality of modulation devices of the detector and/or to control at least one illumination source of the detector. The evaluation device can be designed, in particular, to carry out at least one measurement cycle in which one or a plurality of sensor signals, such as a plurality of longitudinal sensor signals, are picked up, for example a plurality of sensor signals of successively at different modulation frequencies of the illumination.

However, unlike in conventional semiconductor devices in which, e.g. the absorption of incident light may occur in a p-type conductor, the absorption of incident light in the present detector may be spatially separated from the movement of the charge carriers in dye sensitized solar cells (DSCs), where incident light may cause the light-absorbing organic dye to switch into an excited state such as Frenkel excitons, i.e. excited, strongly bound electron-hole pairs. As long as the energy levels of both the p-type conductor and the n-type conductor are well-matched to the energy states of the excited light-absorbing organic dye, the excitons may be separated and, thus, the electrons and the holes may travel through the n-type and the p-type conductor, respectively, to the appropriate contact electrodes. Hereby, the moving charge carriers may be majority charge carriers, i.e. in the n-type conductor electrons, in the p-type conductor holes are traveling. Since the light-absorbing organic dye itself is a non-conducting substance, an effective charge transport may depend on an extent to which molecules of the light-absorbing organic dye are in close contact with both the p-type conductor and the n-type conductor. For potential details of DSCs, reference may be made e.g. to U. Bach, M. Grätzel, D. Lupo, P. Comte, J. E. Moser, F. Weissörtel, J. Salbeck, and H. Spreitzer. "Solid-state dye-sensitized mesoporous TiO2 solar cells with high proton-to-electron conversion efficiencies". *Nature*, Vol. 395, no. 6702, pp. 583-585, 1998.

As described above, when light falls on the cell, it may be absorbed by the light-absorbing organic dye and an exciton may be created. If the energy of the absorbed photons is greater than an energy gap between the highest occupied molecular orbital (HOMO) and the lowest unoccupied molecular orbital (LUMO) of the light-absorbing organic dye, an electron of the HOMO may be raised to the LUMO of the photoexcited dye and charge separation may take place at the boundary between the dye and the semiconductor which nanoporous titanium dioxide. From there, the electron may travel within femtoseconds to picoseconds further into the conduction band of nanoporous titanium dioxide. Preferably, the energy level of the excited state is matched to the lower limit of the conduction band of the titanium dioxide in order to minimize energy losses during electron transition and the LUMO level should extend sufficiently beyond the lower limit of the conduction band of the titanium dioxide. The oxidation potential of the hole conductor should extend over the HOMO level of the dye allowing it to transport away the holes of the excited dye. If a load is connected in an external circuit, a current may flow across the titanium dioxide and the anode. The reduced dye may be regenerated through electron donation by the organic p-type conductor to the dye, which may prevent recombination of the electrons from the conduction band of the titanium dioxide with the oxidised dye. The p-type conductor, in turn, may be regenerated through the counter-electrode, which may ensure a constant conversion of energy from incident light into electrical energy without requiring a permanent chemical change.

The evaluation device is designed, as described above, to generate at least one item of information on a transversal position of the object by evaluating the transversal sensor signal and to generate at least one item of information on a longitudinal position of the object by evaluating the longitudinal sensor signal.

Said position of the object can be static or may even comprise at least one movement of the object, for example a relative movement between the detector or parts thereof and the object or parts thereof. In this case, a relative movement can generally comprise at least one linear movement and/or at least one rotational movement. Items of movement information can for example also be obtained by comparison of at least two items of information picked up at different times, such that for example at least one item of location information can also comprise at least one item of velocity information and/or at least one item of acceleration information, for example at least one item of information about at least one relative velocity between the object or parts thereof and the detector or parts thereof. In particular, the at least one item of location information can generally be selected from: an item of information about a distance between the object or parts thereof and the detector or parts thereof, in particular an optical path length; an item of information about a distance or an optical distance between the object or parts thereof and the optional transfer device or parts thereof, an item of information about a positioning of the object or parts thereof relative to the detector or parts thereof; an item of information about an orientation of the object and/or parts thereof relative to the detector or parts thereof; an item of information about a relative movement between the object or parts thereof and the detector or parts thereof; an item of information about a two-dimensional or three-dimensional spatial configuration of the object or of parts thereof, in particular a geometry or form of the object. Generally, the at least one item of location information can therefore be selected for example from the group consisting of: an item of information about at least one location of the object or at least one part thereof; information about at least one orientation of the object or a part thereof; an item of information about a geometry or form of the object or of a part thereof, an item of information about a velocity of the object or of a part thereof, an item of information about an acceleration of the object or of a part thereof, an item of information about a presence or absence of the object or of a part thereof in a visual range of the detector.

The at least one item of location information can be specified for example in at least one coordinate system, for example a coordinate system in which the detector or parts thereof rest. Alternatively or additionally, the location information can also simply comprise for example a distance between the detector or parts thereof and the object or parts thereof. Combinations of the possibilities mentioned are also conceivable.

As outlined above, the detector may comprise at least one illumination source. The illumination source can be embodied in various ways. Thus, the illumination source can be for example part of the detector in a detector housing. Alternatively or additionally, however, the at least one illumination source can also be arranged outside a detector housing, for example as a separate light source. The illumination source can be arranged separately from the object and illuminate the object from a distance. Alternatively or additionally, the illumination source can also be connected to the object or even be part of the object, such that, by way of example, the electromagnetic radiation emerging from the object can also be generated directly by the illumination source. By way of example, at least one illumination source can be arranged on and/or in the object and directly generate the electromagnetic radiation by means of which the sensor region is illuminated. By way of example, at least one infrared emitter and/or at least one emitter for visible light and/or at least one emitter for ultraviolet light can be arranged on the object. By way of example, at least one light emitting diode and/or at least one laser diode can be arranged on and/or in the object. The illumination source can comprise in particular one or a plurality of the following illumination sources: a laser, in particular a laser diode, although in principle, alternatively or additionally, other types of lasers can also be used; a light emitting diode; an incandescent lamp; an organic light source, in particular an organic light emitting diode. Alternatively or additionally, other illumination sources can also be used. It is particularly preferred if the illumination source is designed to generate one or more light beams having a Gaussian beam profile, as is at least approximately the case for example in many lasers. However, other embodiments are also possible, in principle.

As outlined above, a further aspect of the present invention proposes a human-machine interface for exchanging at least one item of information between a user and a machine. A human-machine interface should generally be understood to mean a device by means of which such information can be exchanged. The machine can comprise in particular a data processing device. The at least one item of information can generally comprise for example data and/or control commands. Thus, the human-machine interface can be designed in particular for the inputting of control commands by the user.

The human-machine interface has at least one detector in accordance with one or a plurality of the embodiments described above. The human-machine interface is designed to generate at least one item of geometrical information of the user by means of the detector wherein the human-machine interface is designed to assign to the geometrical information at least one item of information, in particular at least one control command. By way of example, said at least one item of geometrical information can be or comprise an item of location information and/or position information and/or orientation information about a body and/or at least one body part of the user, for example an item of location information about a hand posture and/or a posture of some other body part of the user.

In this case, the term user should be interpreted broadly and can for example also encompass one or a plurality of articles directly influenced by the user. Thus, the user can for example also wear one or a plurality of gloves and/or other garments, wherein the geometrical information is at least one item of geometrical information of this at least one garment. By way of example, such garments can be embodied as reflective to a primary radiation emerging from at least one illumination source, for example by the use of one or a plurality of reflectors. Once again alternatively or additionally, the user can for example spatially move one or a plurality of articles whose geometrical information can be detected, which is likewise also intended to be subsumable under generation of at least one item of geometrical information of the user. By way of example, the user can move at least one reflective rod and/or some other type of article, for example by means of said user's hand.

The at least one item of geometrical information can be static, that is to say can for example once again comprise a snapshot, but can also for example once again comprise a series of sequential items of geometrical information and/or at least one movement. By way of example, at least two items of geometrical information picked up at different times can be compared, such that, by way of example, the at least one item of geometrical information can also comprise at least one item of information about a velocity and/or an acceleration of a movement. Accordingly, the at least one item of geometrical information can for example comprise at least one item of information about at least one body posture and/or about at least one movement of the user.

The human-machine interface is designed to assign to the geometrical information at least one item of information, in particular at least one control command. As explained above, the term information should in this case be interpreted broadly and can comprise for example data and/or control commands. By way of example, the human-machine interface can be designed to assign the at least one item of information to the at least one item of geometrical information, for example by means of a corresponding assignment algorithm and/or a stored assignment specification. By way of example, a unique assignment between a set of items of geometrical information and corresponding items of information can be stored. In this way, for example by means of a corresponding body posture and/or movement of the user, an inputting of at least one item of information can be effected.

Such human-machine interfaces can generally be used in the machine control or else for example in virtual reality. By way of example, industrial controllers, manufacturing controllers, machine controllers in general, robot controllers, vehicle controllers or similar controllers can be made possible by means of the human-machine interface having the one or the plurality of detectors. However, the use of such a human-machine interface in consumer electronics is particularly preferred.

Accordingly, as outlined above, a further aspect of the present invention proposes an entertainment device for carrying out at least one entertainment function, in particular a game. The entertainment function can comprise in particular at least one game function. By way of example, one or a plurality of games can be stored which can be influencable by a user, who in this context is also called a player hereinafter. By way of example, the entertainment device can comprise at least one display device, for example at least one screen and/or at least one projector and/or at least one set of display spectacles.

The entertainment device furthermore comprises at least one human-machine interface in accordance with one or more of the embodiments described above. The entertainment device is designed to enable at least one item of information of a player to be input by means of the human-machine interface. By way of example, the player, as described above, can adopt or alter one or a plurality of body postures for this purpose. This includes the possibility of the player for example using corresponding articles for this purpose, for example garments such as e.g. gloves, for example garments which are equipped with one or a plurality of reflectors for reflecting the electromagnetic radiation of the detector. The at least one item of information can comprise for example, as explained above, one or a plurality of control commands. By way of example, in this way, changes in direction can be performed, inputs can be confirmed, a selection can be made from a menu, specific game options can be initiated, movements can be influenced in a virtual space or similar instances of influencing or altering the entertainment function can be performed.

The above-described detector, the method, the human-machine interface and the entertainment device and also the proposed uses have considerable advantages over the prior art. Thus, generally, a simple and, still, efficient detector for determining a position of at least one object in space may be provided. Therein, as an example, three-dimensional coordinates of an object or part of an object may be determined in a fast and efficient way. Specifically the combination of the at least one transversal optical sensor and the at least one longitudinal optical sensor, which each may be designed in a cost-efficient way, may lead to a compact, cost-efficient and, still, highly precise device. Both the at least one transversal optical sensor and the at least one longitudinal optical sensor preferably may fully or partially be designed as organic photovoltaic devices, such as by using dye-sensitized solar cells for each of these optical sensors, preferably sDSCs.

As compared to devices known in the art, which of them are based on complex triangulation methods, the detector as proposed provides a high degree of simplicity, specifically with regard to an optical setup of the detector. Thus, in principle, a simple combination of one, two or more sDSCs, preferably in combination with a suited transfer device, specifically a suited lens, and in conjunction with an appropriate evaluation device, is sufficient for high precision position detection.

This high degree of simplicity, in combination with the possibility of high precision measurements, is specifically suited for machine control, such as in human-machine interfaces and, more preferably, in gaming. Thus, cost-efficient entertainment devices may be provided which may be used for a large number of gaming purposes.

Thus, as for the optical detectors and devices disclosed in WO 2012/110924 A1 or in U.S. provisional applications 61/739,173, filed on Dec. 19, 2012, and 61/749,964, filed on Jan. 8, 2013, the optical detector, the detector system, the human-machine interface, the entertainment device, the tracking system or the camera according to the present invention (in the following simply referred to as "the devices according to the present invention" or "Fip-devices") may be used for a plurality of application purposes, such as one or more of the purposes disclosed in further detail in the following.

Thus, firstly, Fip-devices may be used in mobile phones, tablet computers, laptops, smart panels or other stationary or mobile computer or communication applications. Thus, Fip-devices may be combined with at least one active light source, such as a light source emitting light in the visible range or infrared spectral range, in order to enhance performance. Thus, as an example, Fip-devices may be used as cameras and/or sensors, such as in combination with mobile software for scanning environment, objects and living beings. Fip-devices may even be combined with 2D cameras, such as conventional cameras, in order to increase imaging effects. Fip-devices may further be used for surveillance and/or for recording purposes or as input devices to control mobile devices, especially in combination with gesture recognition. Thus, specifically, Fip-devices acting as human-machine interfaces, also referred to as FiP input devices, may be used in mobile applications, such as for controlling other electronic devices or components via the mobile device, such as the mobile phone. As an example, the mobile application including at least one Fip-device may be used for controlling a television set, a game console, a music player or music device or other entertainment devices.

Further, Fip-devices may be used in webcams or other peripheral devices for computing applications. Thus, as an example, Fip-devices may be used in combination with software for imaging, recording, surveillance, scanning or motion detection. As outlined in the context of the human-machine interface and/or the entertainment device, Fip-devices are particularly useful for giving commands by facial expressions and/or body expressions. Fip-devices can be combined with other input generating devices like e.g. mouse, keyboard, touchpad, etc. Further, Fip-devices may be used in applications for gaming, such as by using a webcam. Further, Fip-devices may be used in virtual training applications and/or video conferences.

Further, Fip-devices may be used in mobile audio devices, television devices and gaming devices, as partially explained above. Specifically, Fip-devices may be used as controls or control devices for electronic devices, entertainment devices or the like. Further, Fip-devices may be used for eye detection or eye tracking, such as in 2D- and 3D-display techniques, especially with transparent displays for augmented reality applications.

Further, Fip-devices may be used in or as digital cameras such as DSC cameras and/or in or as reflex cameras such as SLR cameras. For these applications, reference may be made to the use of Fip-devices in mobile applications such as mobile phones, as disclosed above.

Further, Fip-devices may be used for security and surveillance applications. Specifically, Fip-devices may be used for optical encryption. FiP-based detection can be combined with other detection devices to complement wavelengths, such as with IR, x-ray, UV-VIS, radar or ultrasound detectors. Fip-devices may further be combined with an active infrared light source to allow detection in low light surroundings. Fip-devices such as FIP-based sensors are generally advantageous as compared to active detector systems, specifically since Fip-devices avoid actively sending signals which may be detected by third parties, as is the case e.g. in radar applications, ultrasound applications, LIDAR or similar active detector device is. Thus, generally, Fip-devices may be used for an unrecognized and undetectable tracking of moving objects. Additionally, Fip-devices generally are less prone to manipulations and irritations as compared to conventional devices.

Further, given the ease and accuracy of 3D detection by using Fip-devices, Fip-devices generally may be used for facial, body and person recognition and identification. Therein, Fip-devices may be combined with other detection means for identification or personalization purposes such as passwords, finger prints, iris detection, voice recognition or other means. Thus, generally, Fip-devices may be used in security devices and other personalized applications.

Further, Fip-devices may be used as 3D-Barcode readers for product identification.

In addition to the security and surveillance applications mentioned above, Fip-devices generally can be used for surveillance and monitoring of spaces and areas. Thus, Fip-devices may be used for surveying and monitoring spaces and areas and, as an example, for triggering or executing alarms in case prohibited areas are violated. Thus, generally, Fip-devices may be used for surveillance purposes in building surveillance or museums, optionally in combination with other types of sensors, such as in combination with motion or heat sensors, in combination with image intensifiers or image enhancement devices and/or photomultipliers.

Further, Fip-devices may advantageously be applied in camera applications such as video and camcorder applications. Thus, Fip-devices may be used for motion capture and 3D-movie recording. Therein, Fip-devices generally provide a large number of advantages over conventional optical devices. Thus, Fip-devices generally require a lower complexity with regard to optical components. Thus, as an example, the number of lenses may be reduced as compared to conventional optical devices, such as by providing Fip-devices having one lens only. Due to the reduced complexity, very compact devices are possible, such as for mobile use. Conventional optical systems having two or more lenses with high quality generally are voluminous, such as due to the general need for voluminous beam-splitters. Further, Fip-devices generally may be used for focus/autofocus devices, such as autofocus cameras. Further, Fip-devices may also be used in optical microscopy, especially in confocal microscopy.

Further, Fip-devices generally are applicable in the technical field of automotive technology and transport technology. Thus, as an example, Fip-devices may be used as distance and surveillance sensors, such as for adaptive cruise control, emergency brake assist, lane departure warning, surround view, blind spot detection, rear cross traffic alert, and other automotive and traffic applications. Therein, Fip-devices may be used as standalone devices or in combination with other sensor devices, such as in combination with radar and/or ultrasonic devices. Specifically, Fip-devices may be used for autonomous driving and safety issues. Further, in these applications, Fip-devices may be used in combination with infrared sensors, radar sensors, which are sonic sensors, two-dimensional cameras or other types of sensors. Advantage, in these applications, the generally passive nature of typical Fip-devices is advantageous. Thus, since Fip-devices generally do not require emitting signals, the risk of interference of active sensor signals with other signal sources may be avoided. Fip-devices specifically may be used in combination with recognition software, such as standard image recognition software. Thus, signals and data as provide by Fip-devices typically are readily processable and, therefore, generally require lower calculation power than established stereovision systems such as LIDAR. Given the low space demand, Fip-devices such as cameras using the FiP-effect may be placed at virtually any place in a vehicle, such as on a window screen, on a front hood, on bumpers, on lights, on mirrors or other places the like. Various detectors based on the FiP-effect can be combined, such as in order to allow autonomously driving vehicles or in order to increase the performance of active safety concepts. Thus, various FiP-based sensors may be combined with other Fip-based sensors and/or conventional sensors, such as in the windows like rear window, side window or front window, on the bumpers or on the lights.

A combination of a FiP-sensor with one or more rain detection sensors is also possible. This is due to the fact that Fip-devices generally are advantageous over conventional sensor techniques such as radar, specifically during heavy rain. A combination of at least one Fip-device with at least one conventional sensing technique such as radar may allow for a software to pick the right combination of signals according to the weather conditions.

Further, Fip-devices generally may be used as break assist and/or parking assist and/or for speed measurements. Speed measurements can be integrated in the vehicle or may be used outside the vehicle, such as in order to measure the speed of other cars in traffic control. Further, Fip-devices may be used for detecting free parking spaces in parking lots.

Further, Fip-devices may be used is the fields of medical systems and sports. Thus, in the field of medical technology, surgery robotics, e.g. for use in endoscopes, may be named, since, as outlined above, Fip-devices may require a low volume only and may be integrated into other devices. Specifically, Fip-devices having one lens, at most, may be used for capturing 3D information in medical devices such as in endoscopes. Further, Fip-devices may be combined with an appropriate monitoring software, in order to enable tracking and analysis of movements. These applications are specifically valuable e.g. in medical treatments and long-distance diagnosis and tele-medicine.

Further, Fip-devices may be applied in the field of sports and exercising, such as for training, remote instructions or competition purposes. Specifically, Fip-devices may be applied in the field of dancing, aerobic, football, soccer, basketball, baseball, cricket, hockey, track and field, swimming, polo, handball, volleyball, rugby, sumo, judo, fencing, boxing etc. Fip-devices can be used to detect the position of a ball, a bat, a sword, motions, etc., both in sports and in games, such as to monitor the game, support the referee or for judgment, specifically automatic judgment, of specific situations in sports, such as for judging whether a point or a goal actually was made.

FiP devices may further be used to support a practice of musical instruments, in particular remote lessons, for example lessons of string instruments, such as fiddles, violins, violas, celli, basses, harps, guitars, banjos, or ukuleles, keyboard instruments, such as pianos, organs, keyboards, harpsichords, harmoniums, or accordions, and/or percussion instruments, such as drums, timpani, marimbas, xylophones, vibraphones, bongos, congas, timbales, djembes or tablas.

Fip-devices further may be used in rehabilitation and physiotherapy, in order to encourage training and/or in order to survey and correct movements. Therein, the Fip-devices may also be applied for distance diagnostics.

Further, Fip-devices may be applied in the field of machine vision. Thus, one or more Fip-devices may be used e.g. as a passive controlling unit for autonomous driving and or working of robots. In combination with moving robots, Fip-devices may allow for autonomous movement and/or autonomous detection of failures in parts. Fip-devices may also be used for manufacturing and safety surveillance, such as in order to avoid accidents including but not limited to collisions between robots, production parts and living beings. Given the passive nature of Fip-devices, Fip-devices may be advantageous over active devices and/or may be used complementary to existing solutions like radar, ultrasound, 2D cameras, IR detection etc. One particular advantage of Fip-devices is the low likelihood of signal interference. Therefore multiple sensors can work at the same time in the same environment, without the risk of signal interference. Thus, Fip-devices generally may be useful in highly automated production environments like e.g. but not limited to automotive, mining, steel, etc. Fip-devices can also be used for quality control in production, e.g. in combination with other sensors like 2-D imaging, radar, ultrasound, IR etc., such as for quality control or other purposes. Further, Fip-devices may be used for assessment of surface quality, such as for surveying the surface evenness of a product or the adherence to specified dimensions, from the range of micrometers to the range of meters. Other quality control applications are feasible.

Further, Fip-devices may be used in the polls, airplanes, ships, spacecrafts and other traffic applications. Thus, besides the applications mentioned above in the context of traffic applications, passive tracking systems for aircrafts, vehicles and the like may be named. Detection devices based on the FiP-effect for monitoring the speed and/or the direction of moving objects are feasible. Specifically, the tracking of fast moving objects on land, sea and in the air including space may be named. The at least one Fip-detector specifically may be mounted on a still-standing and/or on a moving device. An output signal of the at least one Fip-device can be combined e.g. with a guiding mechanism for autonomous or guided movement of another object. Thus, applications for avoiding collisions or for enabling collisions between the tracked and the steered object are feasible. Fip-devices generally are useful and advantageous due to the low calculation power required, the instant response and due to the passive nature of the detection system which generally is more difficult to detect and to disturb as compared to active systems, like e.g. radar. Fip-devices are particularly useful but not limited to e.g. speed control and air traffic control devices.

Fip-devices generally may be used in passive applications. Passive applications include guidance for ships in harbors or in dangerous areas, and for aircrafts at landing or starting. Wherein, fixed, known active targets may be used for precise guidance. The same can be used for vehicles driving in dangerous but well defined routes, such as mining vehicles.

Further, as outlined above, Fip-devices may be used in the field of gaming. Thus, Fip-devices can be passive for use with multiple objects of the same or of different size, color, shape, etc., such as for movement detection in combination with software that incorporates the movement into its content. In particular, applications are feasible in implementing movements into graphical output. Further, applications of Fip-devices for giving commands are feasible, such as by using one or more Fip-devices for gesture or facial recognition. Fip-devices may be combined with an active system in order to work under e.g. low light conditions or in other situations in which enhancement of the surrounding conditions is required. Additionally or alternatively, a combination of one or more Fip-devices with one or more IR or VIS light sources is possible, such as with a detection device based on the FiP effect. A combination of a FiP-based detector with special devices is also possible, which can be distinguished easily by the system and its software, e.g. and not limited to, a special color, shape, relative position to other devices, speed of movement, light, frequency used to modulate light sources on the device, surface properties, material used, reflection properties, transparency degree, absorption characteristics, etc. The device can, amongst other possibilities, resemble a stick, a racquet, a club, a gun, a knife, a wheel, a ring, a steering wheel, a bottle, a ball, a glass, a vase, a spoon, a fork, a cube, a dice, a figure, a puppet, a teddy, a beaker, a pedal, a switch, a glove, jewelry, a musical instrument or an auxiliary device for playing a musical instrument, such as a plectrum, a drumstick or the like. Other options are feasible.

Further, Fip-devices generally may be used in the field of building, construction and cartography. Thus, generally, FiP-based devices may be used in order to measure and/or monitor environmental areas, e.g. country side or buildings Therein, one or more Fip-devices may be combined with other methods and devices or can be used solely in order to monitor progress and accuracy of building projects, changing objects, houses, etc. FiP-devices can be used for generating three-dimensional models of scanned environments, in order to construct maps of rooms, streets, houses, communities or landscapes, both from ground or from air. Potential fields of application may be construction, cartography, real estate management, land surveying or the like.

FiP-devices may be used within an interconnecting network of home appliances such as CHAIN (Cedec Home Appliances Interoperating Network) to interconnect, automate, and control basic appliance-related services in a home, e.g. energy or load management, remote diagnostics, pet related appliances, child related appliances, child surveillance, appliances related surveillance, support or service to elderly or ill persons, home security and/or surveillance, remote control of appliance operation, and automatic maintenance support.

FiP devices may further be used in agriculture, for example to detect and sort out vermin, weeds, and/or infected crop plants, fully or in parts, wherein crop plants may be infected by fungus or insects. Further, for harvesting crops, FiP detectors may be used to detect animals, such as deer, which may otherwise be harmed by harvesting devices.

FiP-based devices can further be used for scanning of objects, such as in combination with CAD or similar software, such as for additive manufacturing and/or 3D printing. Therein, use may be made of the high dimensional accuracy of Fip-devices, e.g. in x-, y- or z-direction or in any arbitrary combination of these directions, such as simultaneously. Further, Fip-devices may be used in inspections and maintenance, such as pipeline inspection gauges.

As outlined above, Fip-devices may further be used in manufacturing, quality control or identification applications, such as in product identification or size identification (such as for finding an optimal place or package, for reducing waste etc.). Further, Fip-devices may be used in logisitics applications. Thus, Fip-devices may be used for optimized loading or packing containers or vehicles. Further, Fip-devices may be used for monitoring or controlling of surface damages in the field of manufacturing, for monitoring or controlling rental objects such as rental vehicles, and/or for insurance applications, such as for assessment of damages. Further, Fip-devices may be used for identifying a size of material, object or tools, such as for optimal material handling, especially in combination with robots. Further, Fip-devices may be used for process control in production, e.g. for observing filling level of tanks. Further, Fip-devices may be used for maintenance of production assets like, but not limited to, tanks, pipes, reactors, tools etc. Further, Fip-devices may be used for analyzing 3D-quality marks. Further, Fip-devices may be used in manufacturing tailor-made goods such as tooth inlays, dental braces, prosthesis, clothes or the like. Fip-devices may also be combined with one or more 3D-printers for rapid prototyping, 3D-copying or the like. Further, Fip-devices may be used for detecting the shape of one or more articles, such as for anti-product piracy and for anti-counterfeiting purposes.

As outlined above, preferably, the at least one transversal optical sensor and/or the at least one longitudinal optical sensor both may comprise at least one organic semiconductor detector, particularly preferably at least one dye solar cell, DSC or sDSC. In particular, the transversal optical sensor and/or the longitudinal optical sensor each may comprise at least one first electrode, at least one n-semiconducting metal oxide, at least one dye, at least one p-semiconducting organic material and at least one second electrode, preferably in the stated order. The stated elements can be present as layers in a layer construction, for example. The layer construction can be applied for example to a substrate, preferably a transparent substrate, for example a glass substrate.

Preferred embodiments of the above-mentioned elements of the preferred optical sensor are described below by way of example, wherein these embodiments can be used in any desired combination. However, numerous other configurations are also possible, in principle, wherein reference can be made for example to WO 2012/110924 A1, US 2007/0176165 A1, U.S. Pat. No. 6,995,445 B2, DE 2501124 A1, DE 3225372 A1 and WO 2009/013282 A1 cited above.

As outlined above, the at least one transversal optical sensor may be designed as a dye-sensitized solar cell (DSC), preferably a solid dye-sensitized solar cell (sDSC). Similarly, the at least one longitudinal optical sensor may be designed as at least one dye-sensitized solar cell (DSC) or may comprise at least one dye-sensitized solar cell (DSC), preferably a solid dye-sensitized solar cell (sDSC). More preferably, the at least one longitudinal optical sensor comprises a stack of DSCs, preferably a stack of sDSCs. Preferred components of the DSCs or sDSCs will be disclosed in the following. However, it shall be understood that other embodiments are feasible.

First Electrode and n-Semiconductive Metal Oxide

Generally, for preferred embodiments of the first electrode and the n-semiconductive metal oxide, which may be used in a layer setup of the transversal optical sensor and/or the longitudinal optical sensor, reference may be made to WO 2012/110924 A1. The n-semiconductive metal oxide used in the dye solar cell of the transversal optical sensor and/or the longitudinal optical sensor may be a single metal oxide or a mixture of different oxides. It is also possible to use mixed oxides. The n-semiconductive metal oxide may especially be porous and/or be used in the form of a nanoparticulate oxide, nanoparticles in this context being understood to mean particles which have an average particle size of less than 0.1 micrometer. A nanoparticulate oxide is typically applied to a conductive substrate (i.e. a carrier with a conductive layer as the first electrode) by a sintering process as a thin porous film with large surface area.

Preferably, the at least one transversal optical sensor uses at least one transparent substrate. Similarly, preferably, the at least one longitudinal optical sensor uses at least one transparent substrate. In case a plurality of longitudinal optical sensors is used, such as a stack of longitudinal optical sensors, preferably, at least one of these longitudinal optical sensors uses a transparent substrate. Thus, as an example, all longitudinal optical sensors but the last longitudinal optical sensor facing away from the object, each may use a transparent substrate. The last longitudinal optical sensor may either use a transparent or an intransparent substrate.

Similarly, the at least one transversal optical sensor uses at least one transparent first electrode. Further, the at least one longitudinal optical sensor may use at least one transparent first electrode. In case a plurality of longitudinal optical sensors is used, such as a stack of longitudinal optical sensors, preferably, at least one of these longitudinal optical sensors uses a transparent first electrode. Thus, as an example, all longitudinal optical sensors but the last longitudinal optical sensor facing away from the object each may use a transparent first electrode. The last longitudinal optical sensor may either use a transparent or an intransparent first electrode.

The substrate may be rigid or else flexible. Suitable substrates (also referred to hereinafter as carriers) are, as well as metal foils, in particular plastic sheets or films and especially glass sheets or glass films. Particularly suitable electrode materials, especially for the first electrode according to the above-described, preferred structure, are conductive materials, for example transparent conductive oxides (TCOs), for example fluorine- and/or indium-doped tin oxide (FTO or ITO) and/or aluminum-doped zinc oxide (AZO), carbon nanotubes or metal films. Alternatively or additionally, it would, however, also be possible to use thin metal films which still have a sufficient transparency. In case an intransparent first electrode is desired and used, thick metal films may be used.

The substrate can be covered or coated with these conductive materials. Since generally, only a single substrate is required in the structure proposed, the formation of flexible cells is also possible. This enables a multitude of end uses which would be achievable only with difficulty, if at all, with rigid substrates, for example use in bank cards, garments, etc.

The first electrode, especially the TCO layer, may additionally be covered or coated with a solid metal oxide buffer layer (for example of thickness 10 to 200 nm), in order to prevent direct contact of the p-type semiconductor with the TCO layer (see Peng et al., Coord. Chem. Rev. 248, 1479 (2004)). The inventive use of solid p-semiconductive electrolytes, in the case of which contact of the electrolyte with the first electrode is greatly reduced compared to liquid or gel-form electrolytes, however, makes this buffer layer unnecessary in many cases, such that it is possible in many cases to dispense with this layer, which also has a current-limiting effect and can also worsen the contact of the n-semiconducting metal oxide with the first electrode. This enhances the efficiency of the components. On the other hand, such a buffer layer can in turn be utilized in a controlled manner in order to match the current component of the dye solar cell to the current component of the organic solar cell. In addition, in the case of cells in which the buffer layer has been dispensed with, especially in solid cells, problems frequently occur with unwanted recombinations of charge carriers. In this respect, buffer layers are advantageous in many cases specifically in solid cells.

As is well known, thin layers or films of metal oxides are generally inexpensive solid semiconductor materials (n-type semiconductors), but the absorption thereof, due to large band gaps, is typically not within the visible region of the electromagnetic spectrum, but rather usually in the ultraviolet spectral region. For use in solar cells, the metal oxides therefore generally, as is the case in the dye solar cells, have to be combined with a dye as a photosensitizer, which absorbs in the wavelength range of sunlight, i.e. at 300 to 2000 nm, and, in the electronically excited state, injects electrons into the conduction band of the semiconductor. With the aid of a solid p-type semiconductor used additionally in the cell as an electrolyte, which is in turn reduced at the counter electrode, electrons can be recycled to the sensitizer, such that it is regenerated.

Of particular interest for use in organic solar cells are semiconductors zinc oxide, tin dioxide, titanium dioxide or mixtures of these metal oxides. The metal oxides can be used in the form of nanocrystalline porous layers. These layers have a large surface area which is coated with the dye as a sensitizer, such that a high absorption of sunlight is achieved. Metal oxide layers which are structured, for example nanorods, give advantages such as higher electron mobilities or improved pore filling by the dye.

The metal oxide semiconductors can be used alone or in the form of mixtures. It is also possible to coat a metal oxide with one or more other metal oxides. In addition, the metal oxides may also be applied as a coating to another semiconductor, for example GaP, ZnP or ZnS.

Particularly preferred semiconductors are zinc oxide and titanium dioxide in the anatase polymorph, which is preferably used in nanocrystalline form.

In addition, the sensitizers can advantageously be combined with all n-type semiconductors which typically find use in these solar cells. Preferred examples include metal oxides used in ceramics, such as titanium dioxide, zinc oxide, tin(IV) oxide, tungsten(VI) oxide, tantalum(V) oxide, niobium(V) oxide, cesium oxide, strontium titanate, zinc stannate, complex oxides of the perovskite type, for example barium titanate, and binary and ternary iron oxides, which may also be present in nanocrystalline or amorphous form.

Due to the strong absorption that customary organic dyes and phthalocyanines and porphyrins have, even thin layers or films of the n-semiconducting metal oxide are sufficient to absorb the required amount of dye. Thin metal oxide films in turn have the advantage that the probability of unwanted recombination processes falls and that the internal resistance of the dye subcell is reduced. For the n-semiconducting metal oxide, it is possible with preference to use layer thicknesses of 100 nm up to 20 micrometers, more preferably in the range between 500 nm and approx. 3 micrometers.

Dye

In the context of the present invention, as usual in particular for DSCs, the terms "dye", "sensitizer dye" and "sensitizer" are used essentially synonymously without any restriction of possible configurations. Numerous dyes which are usable in the context of the present invention are known from the prior art, and so, for possible material examples, reference may also be made to the above description of the prior art regarding dye solar cells. As a preferred example, one or more of the dyes disclosed in WO 2012/110924 A1 may be used.

Additionally or alternatively, one or more quinolinium dyes with fluorinated counter anion may be used in the detector according to the present invention, such as one or more of the dyes as disclosed in WO 2013/144177 A1. Specifically, one or more of the dyes disclosed in the following may be used in the at least one longitudinal optical sensor and/or in the at least one transversal optical sensor. Details of these dyes and details of the disclosure of these unpublished applications will be given below. Specifically, dye D-5, which will be described below in more detail, may be used. However, one or more other dyes may be used in addition or alternatively.

All dyes listed and claimed may in principle also be present as pigments. Dye-sensitized solar cells based on titanium dioxide as a semiconductor material are described, for example, in U.S. Pat. No. 4,927,721 A, Nature 353, p. 737-740 (1991) and U.S. Pat. No. 5,350,644 A, and also Nature 395, p. 583-585 (1998) and EP 1 176 646 A1. The dyes described in these documents can in principle also be used advantageously in the context of the present invention. These dye solar cells preferably comprise monomolecular films of transition metal complexes, especially ruthenium complexes, which are bonded to the titanium dioxide layer via acid groups as sensitizers.

Dyes for use in dye-sensitized solar cells which may comprise ruthenium complexes have been rather of academic interest so far, particularly due to the high costs of ruthenium. However, a dye-sensitized solar cell which may be used in the detector according to the present invention would only require such a small amount of ruthenium that the cost argument may easily be overruled by its attractive features for use within the present method for determining a position of at least one object, particularly in a case where at least one light beam which travels from the object might involve a spectral range which may at least partially include a part of the infrared (IR) region, i.e. a part of the electromagnetic spectrum ranging from approximately 750 nm to 1000 µm, preferentially a part thereof generally denoted as near infrared (NIR) region, which is usually considered to range from approximately 750 nm to 1.5 µm. Examples of known ruthenium complexes which might be suitable for an application within the detector according to the present invention are:

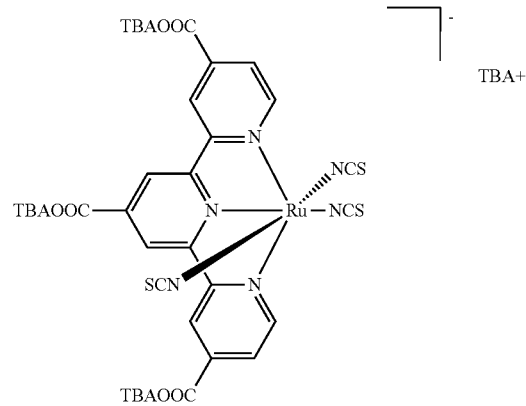

-continued

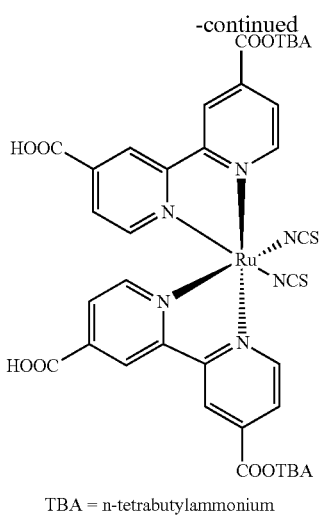

TBA = n-tetrabutylammonium

Another example may be found in T. Kinoshita, J. T. Dy, S. Uchida, T. Kubo, and H. Segawa, *Wideband dye-sensitized solar cells employing a phosphine-coordinated ruthenium sensitizer*, Nature Photonics, 7, 535-539 (2013), wherein a phosphine-coordinated ruthenium complex is described, which exhibits a strong absorption in the NIR, particularly within the range from 750 nm to 950 nm, which may thus, yield a dye-sensitized solar cell with a promising efficiency:

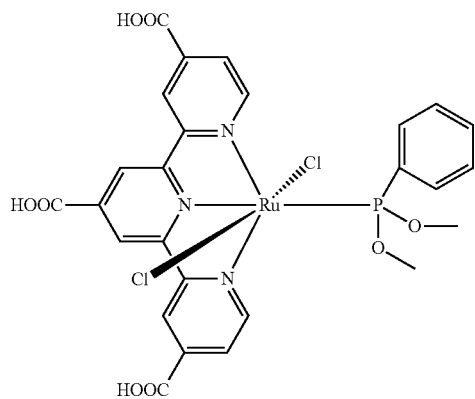

Owing to weak absorption properties of most known dyes within the IR region, including the NIR region, dyes comprising ruthenium complexes may, thus, be able to extend the scope of the detector according to the present invention into the IR region, in particular into the NIR region, e.g. as being used as active depth sensors, particularly in applications related to computer vision, wherein IR light may play an important role, as described elsewhere in this application.

Many sensitizers which have been proposed include metal-free organic dyes, which are likewise also usable in the context of the present invention. High efficiencies of more than 4%, especially in solid dye solar cells, can be achieved, for example, with indoline dyes (see, for example, Schmidt-Mende et al., Adv. Mater. 2005, 17, 813). U.S. Pat. No. 6,359,211 describes the use, also implementable in the context of the present invention, of cyanine, oxazine, thiazine and acridine dyes which have carboxyl groups bonded via an alkylene radical for fixing to the titanium dioxide semiconductor.

Organic dyes now achieve efficiencies of almost 12.1% in liquid cells (see, for example, P. Wang et al., ACS. Nano 2010). Pyridinium-containing dyes have also been reported, can be used in the context of the present invention and exhibit promising efficiencies.

Particularly preferred sensitizer dyes in the dye solar cell proposed are the perylene derivatives, terrylene derivatives and quaterrylene derivatives described in DE 10 2005 053 995 A1 or WO 2007/054470 A1. The use of these dyes, which is also possible in the context of the present invention, leads to photovoltaic elements with high efficiencies and simultaneously high stabilities.

The rylenes exhibit strong absorption in the wavelength range of sunlight and can, depending on the length of the conjugated system, cover a range from about 400 nm (perylene derivatives I from DE 10 2005 053 995 A1) up to about 900 nm (quaterrylene derivatives I from DE 10 2005 053 995 A1).

Rylene derivatives I based on terrylene absorb, according to the composition thereof, in the solid state adsorbed onto titanium dioxide, within a range from about 400 to 800 nm. In order to achieve very substantial utilization of the incident sunlight from the visible into the near infrared region, it is advantageous to use mixtures of different rylene derivatives I. Occasionally, it may also be advisable also to use different rylene homologs.

The rylene derivatives I can be fixed easily and in a permanent manner to the n-semiconducting metal oxide film. The bonding is effected via the anhydride function (x1) or the carboxyl groups —COOH or —COO— formed in situ, or via the acid groups A present in the imide or condensate radicals ((x2) or (x3)). The rylene derivatives I described in DE 10 2005 053 995 A1 have good suitability for use in dye-sensitized solar cells in the context of the present invention.

It is particularly preferred when the dyes, at one end of the molecule, have an anchor group which enables the fixing thereof to the n-type semiconductor film. At the other end of the molecule, the dyes preferably comprise electron donors Y which facilitate the regeneration of the dye after the electron release to the n-type semiconductor, and also prevent recombination with electrons already released to the semiconductor.

For further details regarding the possible selection of a suitable dye, it is possible, for example, again to refer to DE 10 2005 053 995 A1. By way of example, it is possible especially to use ruthenium complexes, porphyrins, other organic sensitizers, and preferably rylenes.

The dyes can be fixed onto or into the n-semiconducting metal oxide films in a simple manner. For example, the n-semiconducting metal oxide films can be contacted in the freshly sintered (still warm) state over a sufficient period (for example about 0.5 to 24 h) with a solution or suspension of the dye in a suitable organic solvent. This can be accomplished, for example, by immersing the metal oxide-coated substrate into the solution of the dye.

If combinations of different dyes are to be used, they may, for example, be applied successively from one or more solutions or suspensions which comprise one or more of the dyes. It is also possible to use two dyes which are separated by a layer of, for example, CuSCN (on this subject see, for example, Tennakone, K. J., Phys. Chem. B. 2003, 107, 13758). The most convenient method can be determined comparatively easily in the individual case.

In the selection of the dye and of the size of the oxide particles of the n-semiconducting metal oxide, the organic solar cell should be configured such that a maximum amount of light is absorbed. The oxide layers should be structured such that the solid p-type semiconductor can efficiently fill the pores. For instance, smaller particles may have greater surface areas and are therefore capable of adsorbing a greater amount of dyes. On the other hand, larger particles generally have larger pores which enable better penetration through the p-conductor.

p-Semiconducting Organic Material

As described above, the at least one DSC or sDSC of the at least one transversal optical sensor and/or the at least one longitudinal optical sensor can comprise in particular at least one p-semiconducting organic material, preferably at least one solid p-semiconducting material, which is also designated hereinafter as p-type semiconductor or p-type conductor. Hereinafter, a description is given of a series of preferred examples of such organic p-type semiconductors which can be used individually or else in any desired combination, for example in a combination of a plurality of layers with a respective p-type semiconductor, and/or in a combination of a plurality of p-type semiconductors in one layer.

In order to prevent recombination of the electrons in the n-semiconducting metal oxide with the solid p-conductor, it is possible to use, between the n-semiconducting metal oxide and the p-type semiconductor, at least one passivating layer which has a passivating material. This layer should be very thin and should as far as possible cover only the as yet uncovered sites of the n-semiconducting metal oxide. The passivation material may, under some circumstances, also be applied to the metal oxide before the dye. Preferred passivation materials are especially one or more of the following substances: $Al_2O_3$; silanes, for example $CH_3SiCl_3$; $Al^{3+}$; 4-tert-butylpyridine (TBP); MgO; GBA (4-guanidinobutyric acid) and similar derivatives; alkyl acids; hexadecylmalonic acid (HDMA).

As described above, in the context of the organic solar cell, preferably one or more solid organic p-type semiconductors are used—alone or else in combination with one or more further p-type semiconductors which are organic or inorganic in nature. In the context of the present invention, a p-type semiconductor is generally understood to mean a material, especially an organic material, which is capable of conducting holes, that is to say positive charge carriers. More particularly, it may be an organic material with an extensive π-electron system which can be oxidized stably at least once, for example to form what is called a free-radical cation. For example, the p-type semiconductor may comprise at least one organic matrix material which has the properties mentioned. Furthermore, the p-type semiconductor can optionally comprise one or a plurality of dopants which intensify the p-semiconducting properties. A significant parameter influencing the selection of the p-type semiconductor is the hole mobility, since this partly determines the hole diffusion length (cf. Kumara, G., Langmuir, 2002, 18, 10493-10495). A comparison of charge carrier mobilities in different spiro compounds can be found, for example, in T. Saragi, Adv. Funct. Mater. 2006, 16, 966-974.

Preferably, in the context of the present invention, organic semiconductors are used (i.e. low molecular weight, oligomeric or polymeric semiconductors or mixtures of such semiconductors). Particular preference is given to p-type semiconductors which can be processed from a liquid phase. Examples here are p-type semiconductors based on polymers such as polythiophene and polyarylamines, or on amorphous, reversibly oxidizable, nonpolymeric organic compounds, such as the spirobifluorenes mentioned at the outset (cf., for example, US 2006/0049397 and the spiro compounds disclosed therein as p-type semiconductors, which are also usable in the context of the present invention). Preference is given to using low molecular weight organic semiconductors, such as the low molecular weight p-type semiconducting materials as disclosed in WO 2012/110924 A1, preferably spiro-MeOTAD, and/or one or more of the p-type semiconducting materials disclosed in Leijtens et al., ACS Nano, VOL. 6, NO. 2, 1455-1462 (2012). Additionally or alternatively, one or more of the p-type semiconducting materials as disclosed in WO 2010/094636 A1 may be used, the full content of which is herewith included by reference. In addition, reference may also be made to the remarks regarding the p-semiconducting materials and dopants from the above description of the prior art.

The p-type semiconductor is preferably producible or produced by applying at least one p-conducting organic material to at least one carrier element, wherein the application is effected for example by deposition from a liquid phase comprising the at least one p-conducting organic material. The deposition can in this case once again be effected, in principle, by any desired deposition process, for example by spin-coating, knife-coating, printing or combinations of the stated and/or other deposition methods.

The organic p-type semiconductor may especially comprise at least one spiro compound and/or especially be selected from: a spiro compound, especially spiro-MeO-TAD; a compound with the structural formula:

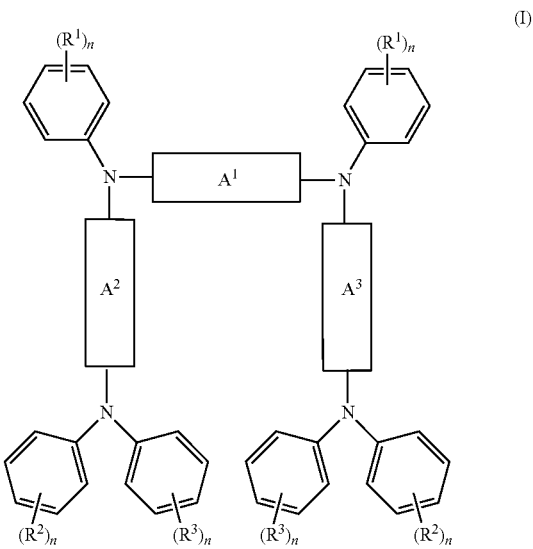

(I)

in which $A^1$, $A^2$, $A^3$ are each independently optionally substituted aryl groups or heteroaryl groups, $R^1$, $R^2$, $R^3$ are each independently selected from the group consisting of the substituents —R, —OR, —$NR_2$, -$A^4$-OR and -$A^4$-$NR_2$, where R is selected from the group consisting of alkyl, awl and heteroaryl, and where $A^4$ is an aryl group or heteroaryl group, and where n at each instance in formula I is independently a value of 0, 1, 2 or 3, with the proviso that the sum of the individual n values is at least 2 and at least two of the $R^1$, $R^2$ and $R^3$ radicals are —OR and/or —$NR_2$.

Preferably, $A^2$ and $A^3$ are the same; accordingly, the compound of the formula (I) preferably has the following structure (Ia)

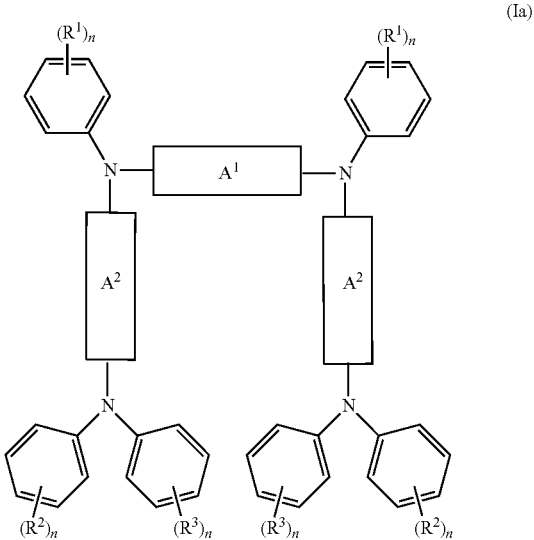
(Ia)

More particularly, as explained above, the p-type semiconductor may thus have at least one low molecular weight organic p-type semiconductor. A low molecular weight material is generally understood to mean a material which is present in monomeric, nonpolymerized or nonoligomerized form. The term "low molecular weight" as used in the present context preferably means that the p-type semiconductor has molecular weights in the range from 100 to 25 000 g/mol. Preferably, the low molecular weight substances have molecular weights of 500 to 2000 g/mol.

In general, in the context of the present invention, p-semiconducting properties are understood to mean the property of materials, especially of organic molecules, to form holes and to transport these holes and/or to pass them on to adjacent molecules. More particularly, stable oxidation of these molecules should be possible. In addition, the low molecular weight organic p-type semiconductors mentioned may especially have an extensive π-electron system. More particularly, the at least one low molecular weight p-type semiconductor may be processable from a solution. The low molecular weight p-type semiconductor may especially comprise at least one triphenylamine. It is particularly preferred when the low molecular weight organic p-type semiconductor comprises at least one spiro compound. A spiro compound is understood to mean polycyclic organic compounds whose rings are joined only at one atom, which is also referred to as the spiro atom. More particularly, the spiro atom may be $sp^3$-hybridized, such that the constituents of the spiro compound connected to one another via the spiro atom are, for example, arranged in different planes with respect to one another.

More preferably, the spiro compound has a structure of the following formula:

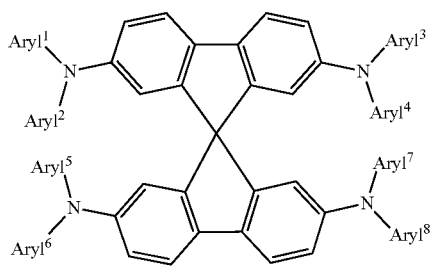

where the aryl$^1$, aryl$^2$, aryl$^3$, aryl$^4$, aryl$^5$, aryl$^6$, aryl$^7$ and aryl$^8$ radicals are each independently selected from substituted awl radicals and heteroaryl radicals, especially from substituted phenyl radicals, where the aryl radicals and heteroaryl radicals, preferably the phenyl radicals, are each independently substituted, preferably in each case by one or more substituents selected from the group consisting of —O-alkyl, —OH, —F, —Cl, —Br and —I, where alkyl is preferably methyl, ethyl, propyl or isopropyl. More preferably, the phenyl radicals are each independently substituted, in each case by one or more substituents selected from the group consisting of —O-Me, —OH, —F, —Cl, —Br and —I.

Further preferably, the spiro compound is a compound of the following formula:

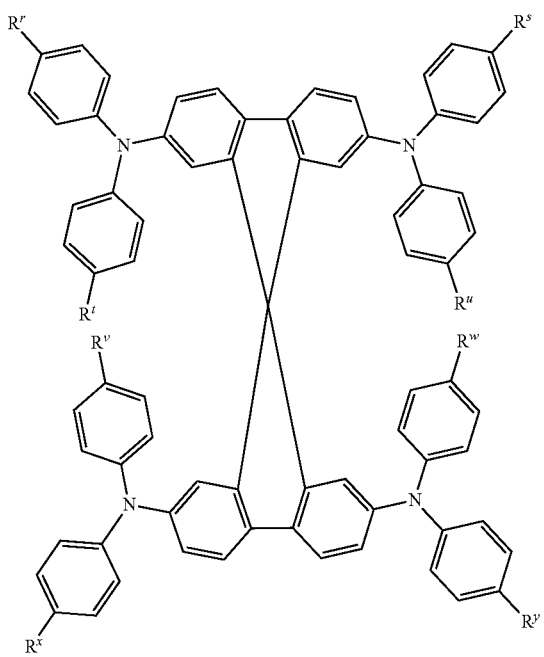

where $R^r$, $R^s$, $R^t$, $R^u$, $R^v$, $R^w$, $R^x$ and $R^y$ are each independently selected from the group consisting of —O-alkyl, —OH, —F, —Cl, —Br and —I, where alkyl is preferably methyl, ethyl, propyl or isopropyl. More preferably, $R^r$, $R^s$, $R^t$, $R^u$, $R^v$, $R^x$ and $R^y$ are each independently selected from the group consisting of —O-Me, —OH, —F, —Cl, —Br and —I.

More particularly, the p-type semiconductor may comprise spiro-MeOTAD or consist of spiro-MeOTAD, i.e. a compound of the formula below, commercially available, for example, from Merck KGaA, Darmstadt, Germany:

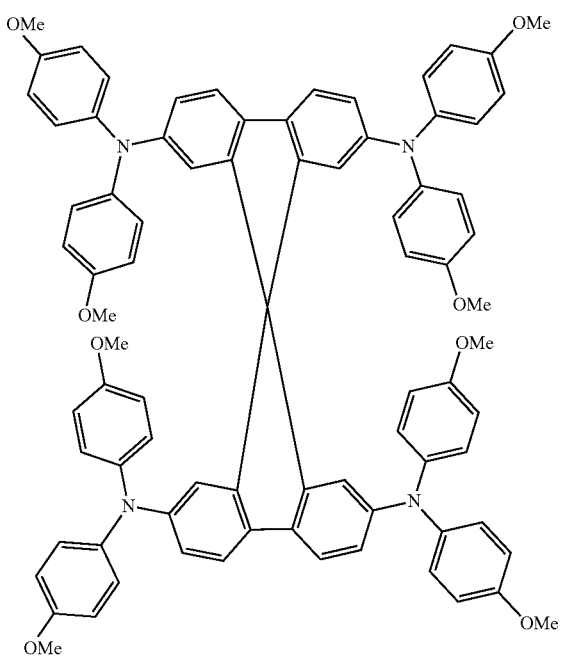 [SMILES: COc1ccc(N(c2ccc(OC)cc2)c2ccc3c(c2)C2(c4cc(N(c5ccc(OC)cc5)c5ccc(OC)cc5)ccc4-3)c3cc(N(c4ccc(OC)cc4)c4ccc(OC)cc4)ccc3-c3ccc(N(c4ccc(OC)cc4)c4ccc(OC)cc4)cc32)cc1]

Alternatively or additionally, it is also possible to use other p-semiconducting compounds, especially low molecular weight and/or oligomeric and/or polymeric p-semiconducting compounds.

In an alternative embodiment, the low molecular weight organic p-type semiconductor comprises one or more compounds of the above-mentioned general formula I, for which reference may be made, for example, to PCT application number PCT/EP2010/051826, which will be published after the priority date of the present application. The p-type semiconductor may comprise the at least one compound of the above-mentioned general formula I additionally or alternatively to the spiro compound described above.

The term "alkyl" or "alkyl group" or "alkyl radical" as used in the context of the present invention is understood to mean substituted or unsubstituted $C_1$-$C_{20}$-alkyl radicals in general. Preference is given to $C_1$- to $C_{10}$-alkyl radicals, particular preference to $C_1$- to $C_8$-alkyl radicals. The alkyl radicals may be either straight-chain or branched. In addition, the alkyl radicals may be substituted by one or more substituents selected from the group consisting of $C_1$-$C_{20}$-alkoxy, halogen, preferably F, and $C_6$-$C_{30}$-aryl which may in turn be substituted or unsubstituted. Examples of suitable alkyl groups are methyl, ethyl, propyl, butyl, pentyl, hexyl, heptyl and octyl, and also isopropyl, isobutyl, isopentyl, sec-butyl, tert-butyl, neopentyl, 3,3-dimethylbutyl, 2-ethylhexyl, and also derivatives of the alkyl groups mentioned substituted by $C_6$-$C_{30}$-aryl, $C_1$-$C_{20}$-alkoxy and/or halogen, especially F, for example $CF_3$.

The term "aryl" or "aryl group" or "aryl radical" as used in the context of the present invention is understood to mean optionally substituted $C_6$-$C_{30}$-aryl radicals which are derived from monocyclic, bicyclic, tricyclic or else multicyclic aromatic rings, where the aromatic rings do not comprise any ring heteroatoms. The aryl radical preferably comprises 5- and/or 6-membered aromatic rings. When the aryls are not monocyclic systems, in the case of the term "aryl" for the second ring, the saturated form (perhydro form) or the partly unsaturated form (for example the dihydro form or tetrahydro form), provided the particular forms are known and stable, is also possible. The term "aryl" in the context of the present invention thus comprises, for example, also bicyclic or tricyclic radicals in which either both or all three radicals are aromatic, and also bicyclic or tricyclic radicals in which only one ring is aromatic, and also tricyclic radicals in which two rings are aromatic. Examples of aryl are: phenyl, naphthyl, indanyl, 1,2-dihydronaphthenyl, 1,4-dihydronaphthenyl, fluorenyl, indenyl, anthracenyl, phenanthrenyl or 1,2,3,4-tetrahydronaphthyl. Particular preference is given to $C_6$-$C_{10}$-aryl radicals, for example phenyl or naphthyl, very particular preference to $C_6$-aryl radicals, for example phenyl. In addition, the term "aryl" also comprises ring systems comprising at least two monocyclic, bicyclic or multicyclic aromatic rings joined to one another via single or double bonds. One example is that of biphenyl groups.

The term "heteroaryl" or "heteroaryl group" or "heteroaryl radical" as used in the context of the present invention is understood to mean optionally substituted 5- or 6-membered aromatic rings and multicyclic rings, for example bicyclic and tricyclic compounds having at least one heteroatom in at least one ring. The heteroaryls in the context of the invention preferably comprise 5 to 30 ring atoms. They may be monocyclic, bicyclic or tricyclic, and some can be derived from the afore-mentioned aryl by replacing at least one carbon atom in the aryl base skeleton with a heteroatom. Preferred heteroatoms are N, O and S. The hetaryl radicals more preferably have 5 to 13 ring atoms. The base skeleton of the heteroaryl radicals is especially preferably selected from systems such as pyridine and five-membered heteroaromatics such as thiophene, pyrrole, imidazole or furan. These base skeletons may optionally be fused to one or two six-membered aromatic radicals. In addition, the term "heteroaryl" also comprises ring systems comprising at least two monocyclic, bicyclic or multicyclic aromatic rings joined to one another via single or double bonds, where at least one ring comprises a heteroatom. When the heteroaryls are not monocyclic systems, in the case of the term "heteroaryl" for at least one ring, the saturated form (perhydro form) or the partly unsaturated form (for example the dihydro form or tetrahydro form), provided the particular forms are known and stable, is also possible. The term "heteroaryl" in the context of the present invention thus comprises, for example, also bicyclic or tricyclic radicals in which either both or all three radicals are aromatic, and also bicyclic or tricyclic radicals in which only one ring is aromatic, and also tricyclic radicals in which two rings are aromatic, where at least one of the rings, i.e. at least one aromatic or one nonaromatic ring has a heteroatom. Suitable fused heteroaromatics are, for example, carbazolyl, benzimidazolyl, benzofuryl, dibenzofuryl or dibenzothiophenyl. The base skeleton may be substituted at one, more than one or all substitutable positions, suitable substituents being the same as have already been specified under the definition of $C_6$-$C_{30}$-aryl. However, the hetaryl radicals are preferably unsubstituted. Suitable hetaryl radicals are, for example, pyridin-2-yl, pyridin-3-yl, pyridin-4-yl, thiophen-2-yl, thiophen-3-yl, pyrrol-2-yl, pyrrol-3-yl, furan-2-yl, furan-3-yl and imidazol-2-yl and the corresponding benzo-fused radicals, especially carbazolyl, benzimidazolyl, benzofuryl, dibenzofuryl or dibenzothiophenyl.

In the context of the invention the term "optionally substituted" refers to radicals in which at least one hydrogen radical of an alkyl group, aryl group or heteroaryl group has been replaced by a substituent. With regard to the type of this substituent, preference is given to alkyl radicals, for example methyl, ethyl, propyl, butyl, pentyl, hexyl, heptyl and octyl, and also isopropyl, isobutyl, isopentyl, sec-butyl, tert-butyl, neopentyl, 3,3-dimethylbutyl and 2-ethylhexyl, aryl radicals, for example $C_6$-$C_{10}$-aryl radicals, especially phenyl or naphthyl, most preferably $C_6$-aryl radicals, for example phenyl, and hetaryl radicals, for example pyridin-2-yl, pyridin-3-yl, pyridin-4-yl, thiophen-2-yl, thiophen-3-yl, pyrrol-2-yl, pyrrol-3-yl, furan-2-yl, furan-3-yl and imidazol-2-yl, and also the corresponding benzofused radicals, especially carbazolyl, benzimidazolyl, benzofuryl, dibenzofuryl or dibenzothiophenyl. Further examples include the following substituents: alkenyl, alkynyl, halogen, hydroxyl.

The degree of substitution here may vary from monosubstitution up to the maximum number of possible substituents.

Preferred compounds of the formula I for use in accordance with the invention are notable in that at least two of the $R^1$, $R^2$ and $R^3$ radicals are para-OR and/or —$NR_2$ substituents. The at least two radicals here may be only —OR radicals, only —$NR_2$ radicals, or at least one —OR and at least one —$NR_2$ radical.

Particularly preferred compounds of the formula I for use in accordance with the invention are notable in that at least four of the $R^1$, $R^2$ and $R^3$ radicals are para-OR and/or —$NR_2$ substituents. The at least four radicals here may be only —OR radicals, only —$NR_2$ radicals or a mixture of —OR and —$NR_2$ radicals.

Very particularly preferred compounds of the formula I for use in accordance with the invention are notable in that all of the $R^1$, $R^2$ and $R^3$ radicals are para-OR and/or —$NR_2$ substituents. They may be only —OR radicals, only —$NR_2$ radicals or a mixture of —OR and —$NR_2$ radicals.

In all cases, the two R in the —$NR_2$ radicals may be different from one another, but they are preferably the same.

Preferably, $A^1$, $A^2$ and $A^3$ are each independently selected from the group consisting of

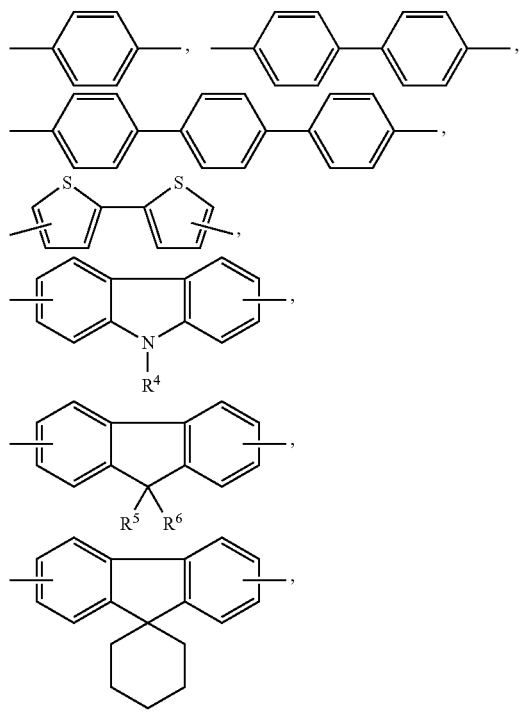

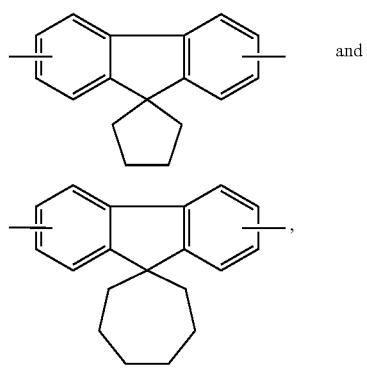

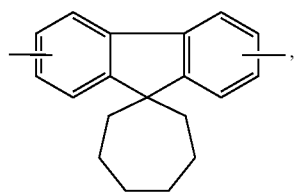

in which m is an integer from 1 to 18, $R^4$ is alkyl, aryl or heteroaryl, where $R^4$ is preferably an aryl radical, more preferably a phenyl radical, $R^5$, $R^6$ are each independently H, alkyl, aryl or heteroaryl, where the aromatic and heteroaromatic rings of the structures shown may optionally have further substitution. The degree of substitution of the aromatic and heteroaromatic rings here may vary from monosubstitution up to the maximum number of possible substituents.

Preferred substituents in the case of further substitution of the aromatic and heteroaromatic rings include the substituents already mentioned above for the one, two or three optionally substituted aromatic or heteroaromatic groups.

Preferably, the aromatic and heteroaromatic rings of the structures shown do not have further substitution.

More preferably, $A^1$, $A^2$ and $A^3$ are each independently

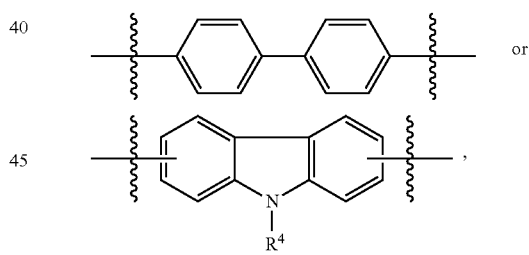

more preferably

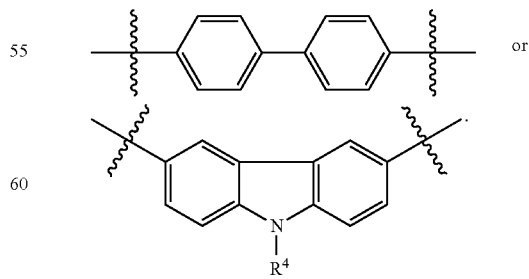

More preferably, the at least one compound of the formula (I) has one of the following structures:

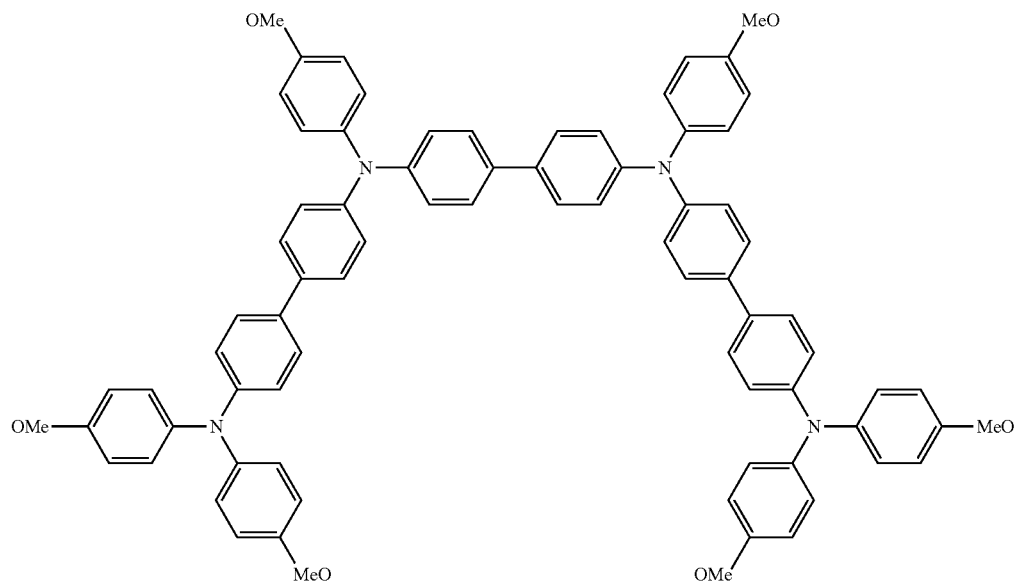
ID367
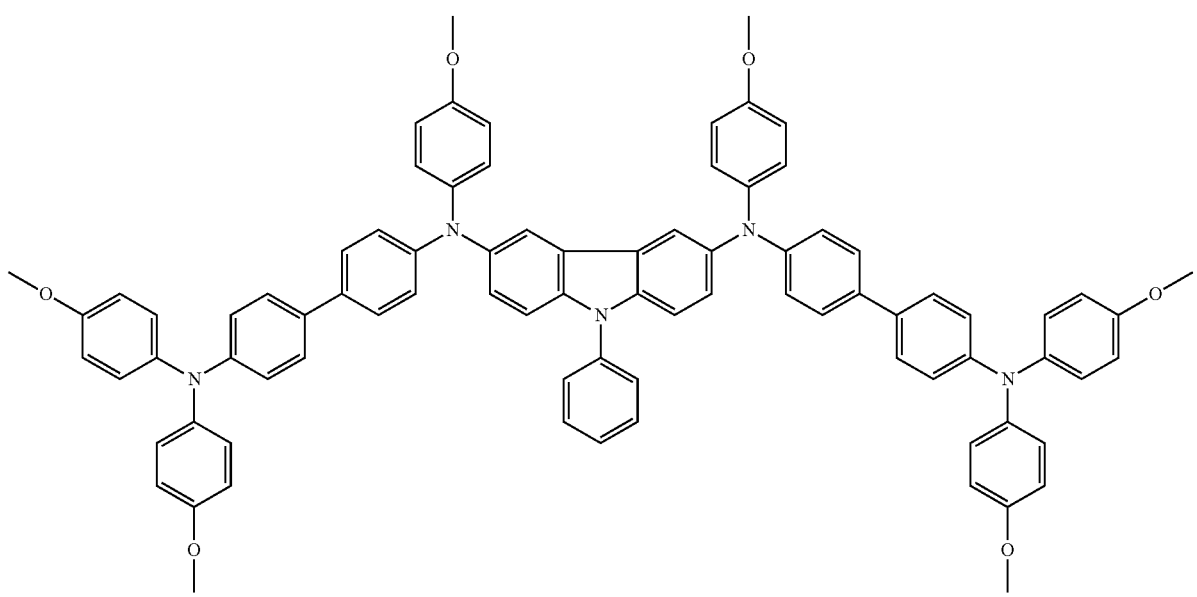
ID522

In an alternative embodiment, the organic p-type semiconductor comprises a compound of the type ID322 having the following structure:

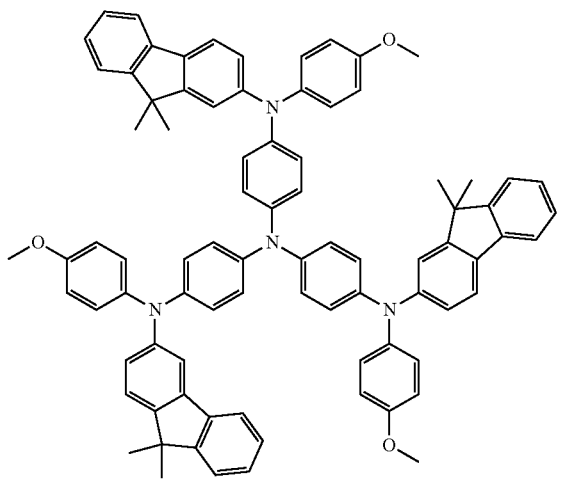 [SMILES: COc1ccc(N(c2ccc(N(c3ccc(N(c4ccc(OC)cc4)c4ccc5c(c4)C(C)(C)c4ccccc4-5)cc3)c3ccc(N(c4ccc(OC)cc4)c4ccc5c(c4)C(C)(C)c4ccccc4-5)cc3)cc2)c2ccc3c(c2)-c2ccccc2C3(C)C)cc1]

The compounds for use in accordance with the invention can be prepared by customary methods of organic synthesis known to those skilled in the art. References to relevant (patent) literature can additionally be found in the synthesis examples adduced below.

Second Electrode a) General Remarks

The second electrode may be a bottom electrode facing the substrate or else a top electrode facing away from the substrate. As outlined above, the second electrode may be fully or partially transparent or, else, may be intransparent. As used herein, the term partially transparent refers to the fact that the second electrode may comprise transparent regions and intransparent regions.

In case the second electrode is fully or partially transparent, the second electrode may comprise at least one transparent conductive electrode material, which may be selected from the group consisting of: an inorganic transparent conductive material; an organic transparent conductive material. As an example of an inorganic conductive transparent material, a metal oxide may be used, such as ITO and/or FTO. As an example of an organic transparent conductive material, one or more electrically conductive polymer materials may be used. As used herein, the term "transparent" refers to the actual layer or layer setup of the second electrode. Thus, the transparency may be generated by using thin layers, such as layers having a thickness of less than 100 nm, more preferably less than 50 nm.

One or more materials of the following group of materials may be used: at least one metallic material, preferably a metallic material selected from the group consisting of aluminum, silver, platinum, gold; at least one nonmetallic inorganic material, preferably LiF; at least one organic conductive material, preferably at least one electrically conductive polymer and, more preferably, at least one transparent electrically conductive polymer.

The second electrode may comprise one or more metals in a pure form and/or may comprise one or more metal alloys. The second electrode may further comprise a single layer and/or may comprise a layer setup of two or more layers, wherein, preferably at least one layer is a metal layer comprising one or more metals or metal alloys. As an example, the second electrode may comprise at least one metal selected from the group listed in the preceding paragraph in a pure form and/or as a component of an alloy. As an example, the second electrode may comprise at least one alloy selected from the group consisting of: a molybdenum alloy; a niobium alloy; a neodymium alloy; an aluminum alloy. Most preferably, the second electrode may comprise at least one alloy selected from the group consisting of: MoNb; AlNd; MoNb. As an example, a layer setup comprising two or more layers of two or more of the named alloys may be used, such as a layer setup comprising the following layers: MoNb/AlNd/MoNb. As an example, the following layer thicknesses may be used: MoNb 30 nm/AlNd 100 nm/MoNb 30 nm. Additionally or alternatively, however, other setups and/or other layer thicknesses may be used.

The second electrode may comprise at least one metal electrode, wherein one or more metals in pure form or as a mixture/alloy, such as especially aluminum or silver may be used.

Additionally or alternatively, nonmetallic materials may be used, such as inorganic materials and/or organic materials, both alone and in combination with metal electrodes. As an example, the use of inorganic/organic mixed electrodes or multilayer electrodes is possible, for example the use of LiF/Al electrodes. Additionally or alternatively, conductive polymers may be used. Thus, the second electrode of the at least one transversal optical sensor and/or the second electrode of the at least one longitudinal optical sensor preferably may comprise one or more conductive polymers.

As an example, one or more electrically conductive polymers may be used, selected from the group consisting of: polyanaline (PANI) and/or its chemical relatives; a polythiophene and/or its chemical relatives, such as poly(3-hexylthiophene) (P3HT) and/or PEDOT:PSS (poly(3,4-ethylenedioxythiophene) poly(styrenesulfonate)). Additionally or alternatively, one or more of the conductive polymers as disclosed in EP2507286 A2, EP2205657 A1 or EP2220141 A1

In addition or alternatively, inorganic conductive materials may be used, such as inorganic conductive carbon materials, such as carbon materials selected from the group consisting of: graphite, graphene, carbon nano-tubes, carbon nano-wires.

In addition, it is also possible to use electrode designs in which the quantum efficiency of the components is increased by virtue of the photons being forced, by means of appropriate reflections, to pass through the absorbing layers at least twice. Such layer structures are also referred to as "concentrators" and are likewise described, for example, in WO 02/101838 (especially pages 23-24).

The second electrode may be identical for the at least one transversal optical sensor and the at least one longitudinal optical sensor. Still, different setups of the second electrode for the transversal optical sensor and the longitudinal optical sensor may be used.

b) Second Electrode of the Transversal Sensor Device

Preferably, the second electrode for the at least one transversal sensor device is at least partially transparent. As an example, the second electrode of the transversal sensor device may comprise at least one transparent electrode layer which covers a sensor region, preferably a sensor area, of the transversal optical sensor. As outlined above, the at least one transparent electrode layer preferably may comprise at least one layer of an electrically conductive polymer, preferably a transparent electrically conductive polymer.

Additionally, the second electrode of the transversal sensor device may comprise two or more partial electrodes, which, preferably, may be made of one or more metals, such as one or more of the metals and/or metal alloys listed above. As an example, the two or more partial electrodes may form a frame which surrounds the sensor region, preferably the sensor area, of the transversal optical sensor. The frame may have a polygonal shape, such as a rectangular or, preferably, a square shape. Preferably, on each side of the polygon, preferably the rectangle or square, one partial electrodes is provided, such as a partial electrode being formed as a bar fully or partially extending along the side.

The at least one electrically conductive polymer may have an electrical conductivity of at least one order of magnitude below electrical conductivity of the material of the partial electrodes, preferably of at least two orders of magnitude below. The at least one electrically conductive polymer may electrically interconnect the partial electrodes. Thus, as outlined above, the partial electrodes may form a frame surrounding a sensor region, preferably a sensor area, of the transversal optical sensor. The at least one layer of the electrically conductive polymer may form a transparent, electrically conductive layer which fully or partially covers the sensor region and which electrically contacts the partial electrodes. As an example, the partial electrodes may comprise metal strips or metal bars along the sides of a rectangle, wherein an inner region of the rectangle forms the sensor region, wherein the at least one layer of the electrically conductive polymer forms one or more transparent electrode layers fully or partially covering the inner region of the rectangle and electrically contacting the metal strips or bars.

In case two or more partial electrodes are used which, preferably, are electrically interconnected by at least one layer of an electrically conductive polymer, each of the partial electrodes may be contacted individually, such as by one or more electrical leads or contact pads. Thus, by electrically contacting the partial electrodes, an electrical current through each of the partial electrodes may be measured individually, such as by using an individual current measurement device and/or by using a sequential measurement scheme for individually detecting the currents through the partial electrodes. The detector, for the purpose of measuring the currents through the partial electrodes, may provide an appropriate measurement setup comprising one or more current measurement devices.

c) Second Electrode of the Longitudinal Sensor Device

Generally, with regard to the at least one second electrode of the at least one longitudinal sensor device, the above-mentioned details regarding the transversal sensor device may apply mutatis mutandis. Again, the second electrode of the at least one longitudinal sensor device preferably is transparent. In case a plurality of longitudinal sensor devices is provided, such as in a stack, preferably all second electrodes of the longitudinal sensor devices are transparent but the second electrode of the last longitudinal sensor device facing away from the object. The second electrode of the last longitudinal sensor device may be transparent or intransparent.

With regard to materials which may be used for the second electrode of the longitudinal sensor device, reference may be made to the above-mentioned materials, which may be selected from metallic materials, nonmetallic inorganic materials and electrically conductive organic materials.

Again, the second electrode of the longitudinal optical sensor or, in case a plurality of longitudinal optical sensors is provided, of at least one of the longitudinal optical sensors may optionally be subdivided into partial electrodes which may be contacted individually. However, since for the purpose of the at least one longitudinal optical sensor generally only one individual longitudinal sensor signal is required per longitudinal optical sensor, the second electrode of the at least one longitudinal optical sensor may as well be designed to provide a single sensor signal and, thus, may provide a single electrode contact only.

The second electrode of the longitudinal optical sensor, again, preferably may comprise one or more layers of an electrically conductive polymer, such as one or more of the polymers mentioned above. The at least one layer of the electrically conductive polymer, which preferably is transparent, may fully or partially cover the sensor region, preferably a sensor area, of the longitudinal optical sensor. In addition, one or more contact pads may be provided which electrically contact the at least one electrically conductive polymer layer. This at least one contact pad for the second electrode of the longitudinal optical sensor preferably may be made of at least one metal, such as at least one of the methods mentioned above, and/or may fully or partially be made of at least one inorganic conductive material, such as one or more transparent conductive oxides, such as one or more of the conductive oxides mentioned above with regard to the first electrode.

Encapsulation

The at least one transversal optical sensor and/or the at least one longitudinal optical sensor may further be encapsulated and/or packaged, in order to provide protection against environmental influences, such as oxygen and/or humidity. Thereby, an increased long-term stability may be provided.

Therein, each of the optical sensors may be encapsulated individually. Thus, an individual encapsulation may be provided for each of the optical sensors, such as an encapsulation for the transversal optical sensor or each of the transversal optical sensors, and an individual encapsulation for the longitudinal optical sensor or for each of the longitudinal optical sensors. Additionally or alternatively, a plurality of optical sensors may be encapsulated as a group. Thus, an encapsulation may be provided which encapsulates more than one optical sensor, such as a plurality of transversal optical sensors, a plurality of longitudinal optical sensors, or at least one transversal optical sensor and at least one longitudinal optical sensor.

For the purpose of encapsulation, various techniques may be used. Thus, the detector may comprise an airtight housing which protects the optical sensors. Additionally or alternatively, specifically in case organic photodetectors and, more preferably, DSCs or sDSCs are used, an encapsulation by one or more lids interacting with a substrate of the optical sensors may be used. Thus, a lid made of a metal, a ceramic material or a glass material may be glued to a substrate of the optical sensors, wherein a layer setup is located in inner space of the lid. Two or more contact leads for contacting the at least one first electrode and the at least one second electrode may be provided which may be contacted from the outside of the lid.

Various other encapsulation techniques may be used alternatively or in addition. Thus, encapsulation by one or more encapsulation layers may be provided. The at least one encapsulation layer may be deposited on top of a layer setup of the devices. Thus, one or more organic and/or inorganic encapsulation materials such as one or more barrier materials may be used.

SYNTHESIS EXAMPLES

Syntheses of various compounds which can be used in dye solar cells in the context of the present invention, in particular as p-type semiconductors, are listed by way of example in WO 2012/110924 A1, the content of which is herewith included by reference.

Overall, in the context of the present invention, the following embodiments are regarded as particularly preferred:

Embodiment 1

A detector for determining a position of at least one object, comprising:
- at least one transversal optical sensor, the transversal optical sensor being adapted to determine a transversal position of at least one light beam traveling from the object to the detector, the transversal position being a position in at least one dimension perpendicular to an optical axis of the detector, the transversal optical sensor being adapted to generate at least one transversal sensor signal;
- at least one longitudinal optical sensor, wherein the longitudinal optical sensor has at least one sensor region, wherein the longitudinal optical sensor is designed to generate at least one longitudinal sensor signal in a manner dependent on an illumination of the sensor region by the light beam, wherein the longitudinal sensor signal, given the same total power of the illumination, is dependent on a beam cross-section of the light beam in the sensor region;
- at least one evaluation device, wherein the evaluation device is designed to generate at least one item of information on a transversal position of the object by evaluating the transversal sensor signal and to generate at least one item of information on a longitudinal position of the object by evaluating the longitudinal sensor signal.

Embodiment 2

The detector according to the preceding embodiment, wherein the transversal optical sensor is a photo detector having at least one first electrode, at least one second electrode and at least one photovoltaic material, wherein the photovoltaic material is embedded in between the first electrode and the second electrode, wherein the photovoltaic material is adapted to generate electric charges in response to an illumination of the photovoltaic material with light, wherein the second electrode is a split electrode having at least two partial electrodes, wherein the transversal optical sensor has a sensor region, wherein the at least one transversal sensor signal indicates a position of the light beam in the sensor region, preferably a sensor area.

Embodiment 3

The detector according to the preceding embodiment, wherein electrical currents through the partial electrodes are dependent on a position of the light beam in the sensor region.

Embodiment 4

The detector according to the preceding embodiment, wherein the transversal optical sensor is adapted to generate the transversal sensor signal in accordance with the electrical currents through the partial electrodes.

Embodiment 5

The detector according to any of the two preceding embodiments, wherein the detector, preferably the transversal optical sensor and/or the evaluation device, is adapted to derive the information on the transversal position of the object from at least one ratio of the currents through the partial electrodes.

Embodiment 6

The detector according to any of the four preceding embodiments, wherein at least four partial electrodes are provided.

Embodiment 7

The detector according to any of the five preceding embodiments, wherein the photovoltaic material comprises at least one organic photovoltaic material and wherein the transversal optical sensor is an organic photo detector.

Embodiment 8

The detector according to any of the six preceding embodiments, wherein the organic photo detector is a dye-sensitized solar cell.

Embodiment 9

The detector according to the preceding embodiment, wherein the dye-sensitized solar cell is a solid dye-sensitized solar cell, comprising a layer setup embedded in between the first electrode and the second electrode, the layer setup comprising at least one n-semiconducting metal oxide, at least one dye, and at least one solid p-semiconducting organic material.

Embodiment 10

The detector according to any of the eight preceding embodiments, wherein the first electrode at least partially is made of at least one transparent conductive oxide, wherein the second electrode at least partially is made of an electrically conductive polymer, preferably a transparent electrically conductive polymer.

Embodiment 11

The detector according to the preceding embodiment, wherein the conductive polymer is selected from the group consisting of: a poly-3,4-ethylenedioxythiophene (PEDOT), preferably PEDOT being electrically doped with at least one counter ion, more preferably PEDOT doped with sodium polystyrene sulfonate (PEDOT:PSS); a polyaniline (PANI); a polythiophene.

Embodiment 12

The detector according to any of the two preceding embodiments, wherein the conductive polymer provides an electric resistivity of 0.1-20 kΩ between the partial electrodes, preferably an electric resistivity of 0.5-5.0 kΩ and, more preferably, an electric resistivity of 1.0-3.0 kΩ.

Embodiment 13

The detector according to any of the preceding embodiments, wherein at least one of the transversal optical sensor and the longitudinal optical sensor is a transparent optical sensor.

Embodiment 14

The detector according to the preceding embodiment, wherein the light beam passes through the transparent optical sensor before impinging on the other one of the transversal optical sensor and the longitudinal optical sensor.

Embodiment 15

The detector according to any one of the preceding embodiments, wherein the detector further comprises at least one imaging device.

Embodiment 16

The detector according to the preceding claim, wherein the detector comprises a stack of optical sensors, the optical sensors comprising the at least one transversal optical sensor and the at least one longitudinal optical sensor, the stack further comprising the imaging device.

Embodiment 17

The detector according to the preceding claim, wherein the imaging device is located in a position of the stack furthest away from the object.

Embodiment 18

The detector according to any of the three preceding embodiments, wherein the light beam passes through the at least one longitudinal optical sensor before illuminating the imaging device.

Embodiment 19

The detector according to any of the four preceding embodiments, wherein the imaging device comprises a camera.

Embodiment 20

The detector according to any of the five preceding embodiments, wherein the imaging device comprises at least one of: an inorganic camera; a monochrome camera; a multichrome camera; a full-color camera; a pixelated inorganic chip; a pixelated organic camera; a CCD chip, preferably a multicolor CCD chip or a full-color CCD chip; a CMOS chip; an IR camera; an RGB camera.

Embodiment 21

The detector according to any of the preceding embodiments, wherein the transversal optical sensor and the longitudinal optical sensor at least partially are identical.

Embodiment 22

The detector according to any of the preceding embodiments, wherein the transversal optical sensor and the longitudinal optical sensor at least partially are independent optical sensors.

Embodiment 23

The detector according to any of the preceding embodiments, wherein the transversal optical sensor and the longitudinal optical sensor are stacked along the optical axis such that a light beam travelling along the optical axis both impinges on the transversal optical sensor and on the longitudinal optical sensor.

Embodiment 24

The detector according to the preceding embodiment, wherein the light beam subsequently passes through the transversal optical sensor and the longitudinal optical sensor or vice versa.

Embodiment 25

The detector according to any of the preceding embodiments, wherein the detector furthermore has at least one modulation device for modulating the illumination.

Embodiment 26

The detector according to the preceding embodiment, wherein the detector is designed to detect at least two longitudinal sensor signals in the case of different modulations, in particular at least two sensor signals at respectively different modulation frequencies, wherein the evaluation device is designed to generate the at least one item of information on the longitudinal position of the object by evaluating the at least two longitudinal sensor signals.

Embodiment 27

The detector according to any of the preceding embodiments, wherein the longitudinal optical sensor is furthermore designed in such a way that the longitudinal sensor signal, given the same total power of the illumination, is dependent on a modulation frequency of a modulation of the illumination.

Embodiment 28

The detector according to any of the preceding embodiments, wherein the sensor region of the longitudinal optical sensor is exactly one continuous sensor region, wherein the longitudinal sensor signal is a uniform sensor signal for the entire sensor region.

Embodiment 29

The detector according to any of the preceding embodiments, wherein the sensor region of the transversal optical sensor and/or the sensor region of the longitudinal optical sensor is or comprises a sensor area, the sensor area being formed by a surface of the respective device, wherein the surface faces towards the object or faces away from the object.

Embodiment 30

The detector according to any of the preceding embodiments, wherein the longitudinal sensor signal is selected from the group consisting of a current and a voltage.

Embodiment 31

The detector according to any of the preceding embodiments, wherein the transversal sensor signal is selected from the group consisting of a current and a voltage or any signal derived thereof.

Embodiment 32

The detector according to any of the preceding embodiments, wherein the longitudinal optical sensor comprises at least one semiconductor detector, in particular an organic semiconductor detector comprising at least one organic material, preferably an organic solar cell and particularly preferably a dye solar cell or dye-sensitized solar cell, in particular a solid dye solar cell or a solid dye-sensitized solar cell.

Embodiment 33

The detector according to the preceding embodiment, wherein the longitudinal optical sensor comprises at least one first electrode, at least one n-semiconducting metal oxide, at least one dye, at least one p-semiconducting organic material, preferably a solid p-semiconducting organic material, and at least one second electrode.

Embodiment 34

The detector according to the preceding embodiment, wherein both the first electrode and the second electrode are transparent.

Embodiment 35

The detector according to any of the preceding embodiments, wherein the evaluation device is designed to generate the at least one item of information on the longitudinal position of the object from at least one predefined relationship between the geometry of the illumination and a relative positioning of the object with respect to the detector, preferably taking account of a known power of the illumination and optionally taking account of a modulation frequency with which the illumination is modulated.

Embodiment 36

The detector according to any of the preceding embodiments, furthermore comprising at least one transfer device, wherein the transfer device is designed to feed light emerging from the object to the transversal optical sensor and the longitudinal optical sensor.

Embodiment 37

The detector according to any of the preceding embodiments, furthermore comprising at least one illumination source.

Embodiment 38

The detector according to the preceding embodiment, wherein the illumination source is selected from: an illumination source, which is at least partly connected to the object and/or is at least partly identical to the object; an illumination source which is designed to at least partly illuminate the object with a primary radiation, wherein the light beam preferably is generated by a reflection of the primary radiation on the object and/or by light emission by the object itself, stimulated by the primary radiation.

Embodiment 39

The detector according to any of the preceding embodiments, wherein the detector has a plurality of longitudinal optical sensors, wherein the longitudinal optical sensors are stacked.

Embodiment 40

The detector according to the preceding embodiment, wherein the longitudinal optical sensors are stacked along the optical axis.

Embodiment 41

The detector according to any of the two preceding embodiments, wherein the longitudinal optical sensors form a longitudinal optical sensor stack, wherein the sensor regions of the longitudinal optical sensors are oriented perpendicular to the optical axis.

Embodiment 42

The detector according to any of the three preceding embodiments, wherein the transversal optical sensor is located on a side of the stacked longitudinal optical sensors facing the object.

Embodiment 43

The detector according to any of the four preceding embodiments, wherein the longitudinal optical sensors are arranged such that a light beam from the object illuminates all longitudinal optical sensors, preferably sequentially, wherein at least one longitudinal sensor signal is generated by each longitudinal optical sensor.

Embodiment 44

The detector according to any of the five preceding embodiments, wherein a last longitudinal optical sensor is arranged in a manner that the light beam first illuminates all other longitudinal optical sensors apart from the last longitudinal optical sensor, until the light beam finally illuminates the last longitudinal optical sensor.

Embodiment 45

The detector according to the preceding embodiment, wherein the last longitudinal optical sensor is intransparent with respect to the light beam.

Embodiment 46

The detector according to any of the seven preceding embodiments, wherein at least two of the longitudinal optical sensors have a differing spectral sensitivities.

Embodiment 47

The detector according to the preceding embodiment, wherein the differing spectral sensitivities are arranged over a spectral range allowing each of the at least two of the longitudinal optical sensors to be sensitive to a specific color.

Embodiment 48

The detector according to the preceding embodiment, wherein the longitudinal optical sensors comprise at least one first longitudinal optical sensor absorbing light in a first spectral range, wherein the longitudinal optical sensors further comprise at least one second longitudinal optical sensor absorbing light in a second spectral range being different from the first spectral range, wherein the longitudinal optical sensors further comprise at least one third longitudinal optical sensor absorbing light in a third spectral range which includes both the first spectral range and the second spectral range.

Embodiment 49

The detector according to any of the six preceding embodiments, wherein the evaluation device is adapted to normalize the longitudinal sensor signals and to generate the information on the longitudinal position of the object independent from an intensity of the light beam.

Embodiment 50

The detector according to any of the seven preceding embodiments, wherein the evaluation device is adapted to recognize whether the light beam widens or narrows, by comparing the longitudinal sensor signals of different longitudinal sensors.

Embodiment 51

The detector according to any of the preceding embodiments, wherein the stack of at least two optical sensors is partially or fully be immersed in an oil, in a liquid and/or in a solid material.

Embodiment 52

The detector according to the preceding embodiment, wherein the oil, the liquid, and/or the solid material are transparent at least over a part of the ultraviolet, visible, and/or infrared spectral range.

Embodiment 53

The detector according to any of the two preceding embodiments, wherein the solid material is generable by using at least one curable substance and treating the curable substance with a treatment, by which treatment the curable substance is cured into the solid material.

Embodiment 54

The detector according to any of the three preceding embodiments, wherein a region between the at least two optical sensors is partially or fully filled with a substance.

Embodiment 55

The detector according to the preceding embodiment, wherein the substance exhibits a refractive index differing from that of the optical sensors adjoining to the substance on one or both sides of the region.

Embodiment 56

The detector according to any of the preceding embodiments, wherein the at least one transversal optical sensor and/or the at least one longitudinal optical sensor uses at least two transparent substrates.

Embodiment 57

The detector according to the preceding embodiment, wherein the substrates exhibit identical properties.

Embodiment 58

The detector according to any of the two preceding embodiments, wherein the substrates differ from each other with regard to a geometrical quantity and/or to a material quantity related to the substrates.

Embodiment 59

The detector according to the preceding embodiment, wherein the substrates differ from each other by the thickness.

Embodiment 60

The detector according to any of the two preceding embodiments, wherein the substrates differ from each other by shape.

Embodiment 61

The detector according to the preceding embodiment, wherein the shape is selected from the group comprising a planar, a planar-convex, a planar-concave, a biconvex, a biconcave or any other form employed for optical purposes.

Embodiment 62

The detector according to any of the six preceding embodiments, wherein the substrates are rigid or flexible.

Embodiment 63

The detector according to any of the seven preceding embodiments, wherein the substrates are covered or coated.

Embodiment 63

The detector according to any of the eight preceding embodiments, wherein the substrate is shaped in a manner that it exhibits a mirror effect.

Embodiment 64

The detector according to the preceding embodiment, wherein the substrate is shaped in a manner that it exhibits the effect of a dichroic mirror.

Embodiment 65

The detector according to any of the preceding embodiments, wherein the evaluation device is adapted to generate the at least one item of information on the longitudinal position of the object by determining a diameter of the light beam from the at least one longitudinal sensor signal.

Embodiment 66

The detector according to the preceding embodiment, wherein the evaluation device is adapted to compare the diameter of the light beam with known beam properties of the light beam in order to determine the at least one item of information on the longitudinal position of the object, preferably from a known dependency of a beam diameter of the light beam on at least one propagation coordinate in a direction of propagation of the light beam and/or from a known Gaussian profile of the light beam.

Embodiment 67

The detector according to any of the preceding embodiments, wherein the detector comprises an optically sensitive element.

Embodiment 68

The detector according to the preceding embodiment, wherein the optically sensitive element is located between the transfer device and the optical sensor.

Embodiment 69

The detector according to any of the two preceding embodiments, wherein the optically sensitive element comprises a wavelength-sensitive element, a phase-sensitive element, and/or a polarization-sensitive element.

Embodiment 70

The detector according to the preceding embodiment, wherein the wavelength-sensitive element comprises one or more of a prism, a grating, a dichroitic mirror, a color wheel, or a color drum.

Embodiment 71

The detector according to the preceding embodiment, wherein the color wheel comprises a sequential color recapture wheel.

Embodiment 72

The detector according to any of the two preceding embodiments, wherein the color wheel or the color drum comprises two or more of at least one red, green, blue, white, cyan, yellow, or magenta segment.

Embodiment 73

The detector according to embodiment 54, wherein the polarization-sensitive element comprises a filter wheel using an elliptically polarizing filter.

Embodiment 74

The detector according to the preceding embodiment, wherein the polarization-sensitive element comprises a filter wheel using a circular polarizing filter.

Embodiment 75

The detector according to any of the two preceding embodiments, wherein the optically sensitive element comprises at least two wheels, at least one first wheel and at least one second wheel, wherein the first wheel constitutes a color wheel and wherein the second wheel constitutes an elliptically polarizing filter.

Embodiment 76

An arrangement comprising at least two detectors according to any of the preceding embodiments.

Embodiment 77

An arrangement according to the preceding embodiment, wherein the at least two detectors have identical optical properties.

Embodiment 78

The arrangement according to any of the two preceding embodiments, wherein the arrangement further comprises at least one illumination source.

Embodiment 79

A human-machine interface for exchanging at least one item of information between a user and a machine, in particular for inputting control commands, wherein the human-machine interface comprises at least one detector according to any of the preceding embodiments relating to a detector, wherein the human-machine interface is designed to generate at least one item of geometrical information of the user by means of the detector wherein the human-machine interface is designed to assign to the geometrical information at least one item of information, in particular at least one control command.

Embodiment 80

The human-machine interface according to the preceding embodiment, wherein the at least one item of geometrical information of the user is selected from the group consisting of: a position of a body of the user; a position of at least one body part of the user; an orientation of a body of the user; an orientation of at least one body part of the user.

Embodiment 81

The human-machine interface according to any of the two preceding embodiments, wherein the human-machine interface further comprises at least one beacon device connectable to the user, wherein the human-machine interface is adapted such that the detector may generate an information on the position of the at least one beacon device.

Embodiment 82

The human-machine interface according to the preceding embodiment, wherein the beacon device is one of a beacon device attachable to a body or a body part of the user and a beacon device which may be held by the user.

Embodiment 83

The human-machine interface according to the preceding embodiment, wherein the beacon device comprises at least one illumination source adapted to generate at least one light beam to be transmitted to the detector.

Embodiment 84

The human-machine interface according to any of the two preceding embodiments, wherein the beacon device comprises at least one reflector adapted to reflect light generated by an illumination source, thereby generating a reflected light beam to be transmitted to the detector.

Embodiment 85

The human-machine interface according to any of the three preceding embodiments, wherein the beacon device comprises at least one of: a garment to be worn by the user, preferably a garment selected from the group consisting of a glove, a jacket, a hat, shoes, trousers and a suit; a stick that may be held by hand; a bat; a club; a racket; a cane; a toy, such as a toy gun.

Embodiment 86

An entertainment device for carrying out at least one entertainment function, in particular a game, wherein the entertainment device comprises at least one human-machine interface according to any of the preceding embodiments referring to a human-machine interface, wherein the entertainment device is designed to enable at least one item of information to be input by a player by means of the human-machine interface, wherein the entertainment device is designed to vary the entertainment function in accordance with the information.

Embodiment 87

A tracking system for tracking the position of at least one movable object, the tracking system comprising at least one detector according to any of the preceding embodiments referring to a detector, the tracking system further comprising at least one track controller, wherein the track controller is adapted to track a series of positions of the object, each position comprising at least one item of information on a transversal position of the object at a specific point in time and at least one item of information on a longitudinal position of the object at a specific point in time.

Embodiment 88

The tracking system according to the preceding embodiment, wherein the tracking system further comprises at least one beacon device connectable to the object, wherein the tracking system is adapted such that the detector may generate an information on the position of the object of the at least one beacon device.

Embodiment 89

The tracking system according to the preceding embodiment, wherein the beacon device comprises at least one illumination source adapted to generate at least one light beam to be transmitted to the detector.

Embodiment 90

The tracking system according to any of the two preceding embodiments, wherein the beacon device comprises at least one reflector adapted to reflect light generated by an illumination source, thereby generating a reflected light beam to be transmitted to the detector.

Embodiment 91

The tracking system according to any of the preceding embodiments referring to a tracking system, wherein the track controller is adapted to initiate at least one action in accordance with an actual position of the object.

Embodiment 92

The tracking system according to the preceding embodiment, wherein the action is selected from the group consisting of: a prediction of a future position of the object; pointing at least one device towards the object; pointing at least one device towards the detector; illuminating the object; illuminating the detector.

Embodiment 93

A camera for imaging at least one object, the camera comprising at least one detector according to any one of the preceding embodiments referring to a detector.

Embodiment 94

A method for determining a position of at least one object, in particular using a detector according to any of the preceding embodiments relating to a detector,
wherein at least one transversal optical sensor of a detector is used, wherein the transversal optical sensor determines a transversal position of at least one light beam traveling from the object to the detector, the transversal position being a position in at least one dimension perpendicular to an optical axis of the detector, wherein the transversal optical sensor generates at least one transversal sensor signal;
wherein at least one longitudinal optical sensor of the detector is used, wherein the longitudinal optical sensor has at least one sensor region, wherein the longitudinal optical sensor generates at least one longitudinal sensor signal in a manner dependent on an illumination of the sensor region by the light beam, wherein the longitudinal sensor signal, given the same total power of the illumination, is dependent on a beam cross-section of the light beam in the sensor region;
wherein at least one evaluation device is used, wherein the evaluation device generates at least one item of information on a transversal position of the object by evaluating the transversal sensor signal and wherein the evaluation device further generates at least one item of information on a longitudinal position of the object by evaluating the longitudinal sensor signal.

Embodiment 95

The use of a detector according to any of the preceding embodiments relating to a detector, for a purpose of use, selected from the group consisting of: a distance measurement, in particular in traffic technology; a position measurement, in particular in traffic technology; an entertainment application; a security application; a human-machine interface application; a tracking application; a photography application; an imaging application or camera application; a mapping application for generating maps of at least one space.

BRIEF DESCRIPTION OF THE FIGURES

Further optional details and features of the invention are evident from the description of preferred exemplary embodiments which follows in conjunction with the dependent claims. In this context, the particular features may be implemented alone or with several in combination. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures:

FIGS. 5A to 5E show the principle of generating longitudinal sensor signals and deriving information on a longitudinal position of an object.

EXEMPLARY EMBODIMENTS

Detector

Figure 1A:
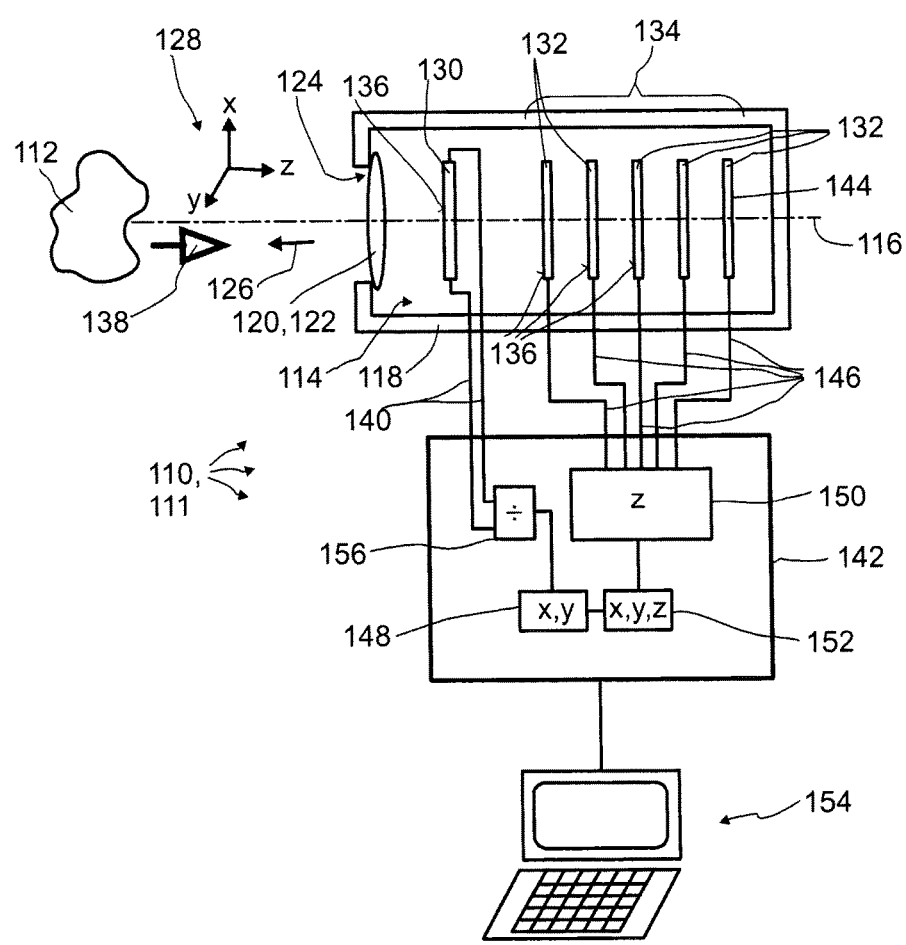
FIG. 1A shows an exemplary embodiment of a detector according to the present invention.

FIG. 1A illustrates, in a highly schematic illustration, an exemplary embodiment of a detector 110 according to the invention, for determining a position of at least one object 112. The detector 110 preferably may form a camera 111 or may be part of a camera 111. Other embodiments are feasible.

The detector 110 comprises a plurality of optical sensors 114, which, in the specific embodiment, are all stacked along an optical axis 116 of the detector 110. Specifically, the optical axis 116 may be an axis of symmetry and/or rotation of the setup of the optical sensors 114. The optical sensors 114 may be located inside a of the detector 110. Further, at least one transfer device 120 may be comprised, such as one or more optical systems, preferably comprising one or more lenses 122. An opening 124 in the housing 118, which, preferably, is located concentrically with regard to the optical axis 116, preferably defines a direction of view 126 of the detector 110. A coordinate system 128 may be defined, in which a direction parallel or antiparallel to the optical axis 116 is defined as a longitudinal direction, whereas directions perpendicular to the optical axis 116 may be defined as transversal directions. In the coordinate system 128, symbolically depicted in FIG. 1A, a longitudinal direction is denoted by z and transversal directions are denoted by x and y, respectively. Other types of coordinate systems 128 are feasible.

The optical sensors 114 comprise at least one transversal optical sensor 130 and, in this embodiment, a plurality of longitudinal optical sensors 132. The longitudinal optical sensors 132 form a longitudinal optical sensor stack 134. In the embodiment shown in FIG. 1A, five longitudinal sensors 132 are depicted. It shall be noted, however, that embodiments having a different number of longitudinal optical sensors 132 are feasible.

The transversal optical sensor 132 comprises a sensor region 136, which, preferably, is transparent to a light beam 138 travelling from the object 112 to the detector 110. The transversal optical sensor 130 is adapted to determine a transversal position of the light beam 138 in one or more transversal directions, such as in direction x and/or in direction y. Therein, embodiments are feasible in which a transversal position in only one transversal direction is determined, embodiments in which transversal positions in more than one transversal direction are determined by one and the same transversal optical sensor 130, and embodiments in which a transversal position in a first transversal direction is determined by a first transversal optical sensor and wherein at least one further transversal position in at least one further transversal direction is determined by at least one further transversal optical sensor.

The at least one transversal optical sensor 130 is adapted to generate at least one transversal sensor signal. This transversal sensor signal may be transmitted by one or more transversal signal leads 140 to at least one evaluation device 142 of the detector 110, which will be explained in further detail below.

The longitudinal optical sensors 132 each comprise at least one sensor region 136, too. Preferably, one, more or all of the longitudinal optical sensors 132 are transparent, but the last longitudinal optical sensor 144 of the longitudinal optical sensor stack 134, i.e. the longitudinal optical sensor 132 on the side of the stack 134 facing away from the object 112. This last longitudinal sensor 144 may fully or partially be intransparent.

Each of the longitudinal optical sensors 132 is designed to generate at least one longitudinal sensor signal in a manner dependent on an illumination of the respective sensor region 136 by the light beam 138. The longitudinal sensor signals, given the same total power of the illumination, is dependent on a beam cross-section of the light beam 138 in the respective sensor region 136, as will be outlined in further detail below. Via one or more longitudinal signal leads 146, the longitudinal sensor signals may be transmitted to the evaluation device 142. As will be outlined in further detail below, the evaluation device may be designed to generate at least one item of information on at least one transversal position of the object 112 by evaluating the at least one transversal sensor signal and to generate at least one item of information on at least one longitudinal position of the object 112 by evaluating the longitudinal sensor signal. For this purpose, the evaluation device 142 may comprise one or more electronic devices and/or one or more software components, in order to evaluate the sensor signals, which is symbolically denoted by transversal evaluation unit 148 (denoted by "xy") and longitudinal evaluation unit 150 (denoted by "z"). By combining results derived by these evolution units 148, 150, a position information 152, preferably a three-dimensional position information, may be generated (denoted by "x, y, z").

The evaluation device 142 may be part of a data processing device 154 and/or may comprise one or more data processing devices 154. The evaluation device 142 may be fully or partially integrated into the housing 118 and/or may fully or partially be embodied as a separate device which is electrically connected in a wireless or wire-bound fashion to the optical sensors 114. The evaluation device 142 may further comprise one or more additional components, such as one or more electronic hardware components and/or one or more software components, such as one or more measurement units (not depicted in FIG. 1A) and/or one or more transformation units 156. Symbolically, in FIG. 1A, one optional transformation unit 156 is depicted which may be adapted to transform at least two transversal sensor signals into a common signal or common information.

In the following, embodiments of the transversal optical sensor 130 and the at least one longitudinal optical sensor 132 are disclosed. It shall be noted, however, that other embodiments are feasible. Thus, in the embodiments disclosed hereinafter, the optical sensors 114 are all designed as solid dye-sensitized solar cells (sDSCs). It shall be noted, however, that other embodiments are feasible.

Figure 1B:
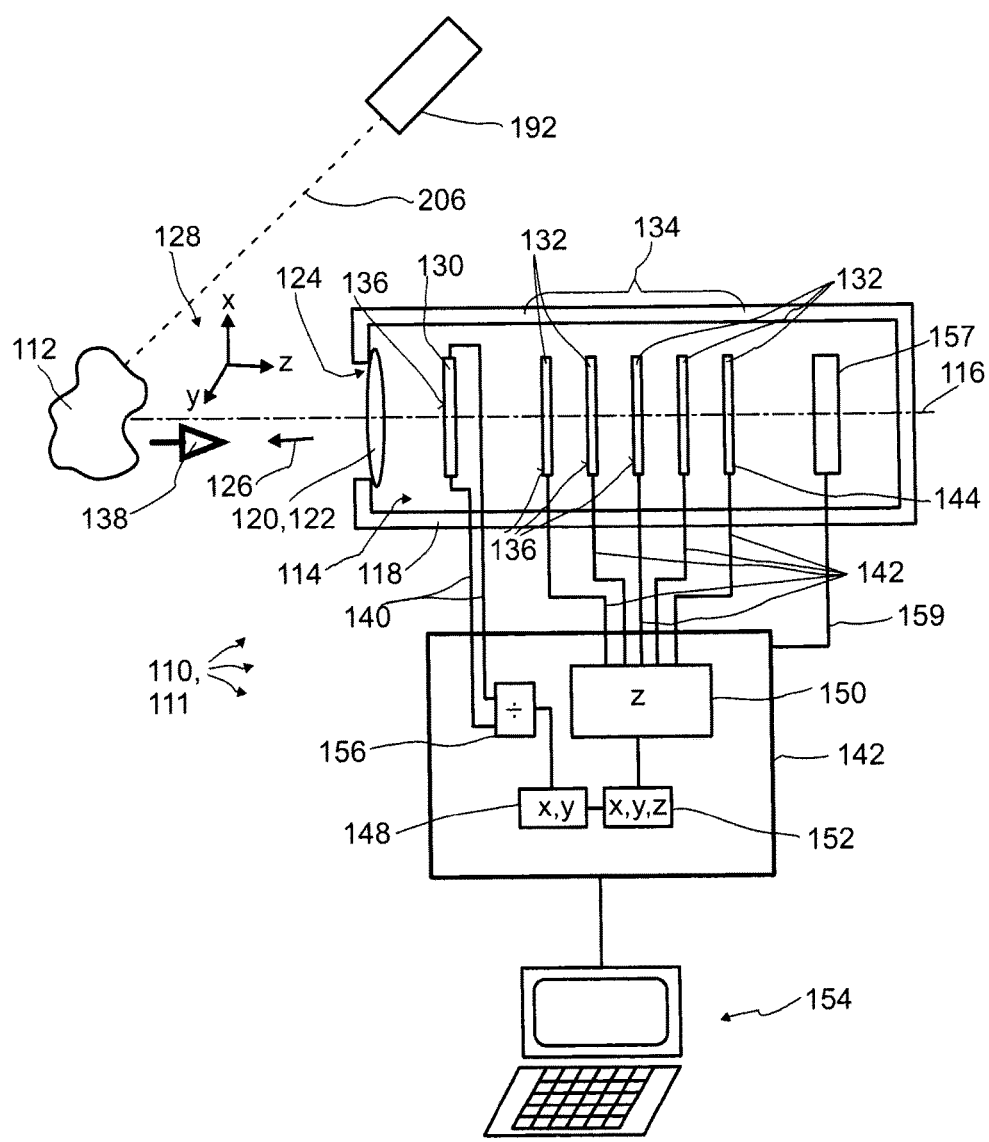
FIG. 1B shows a further exemplary embodiment of a detector according to the present invention.

FIG. 1B illustrates, in a highly schematic illustration, a further exemplary embodiment of the detector 110 according to the present invention, for determining a position of the at least one object 112. In this particular embodiment, the detector 110 may comprise one or more illumination sources 192, which may include an ambient light source and/or an artificial light source, and/or may comprise one or more reflective elements which may, for example, be connected to the object 112 for reflecting one or more primary light beams 206, as indicated in FIG. 1B. In addition or alternatively, the light beam 138 which emerges from the object 112 can fully or partially be generated by the object 112 itself, for example in the form of a luminescent radiation.

The optical sensors 114 comprise at least one transversal optical sensor 130 and, in this embodiment, a plurality of longitudinal optical sensors 132. The longitudinal optical sensors 132 form a longitudinal optical sensor stack 134. In the embodiment shown in FIG. 1B, five longitudinal optical sensors 132 are depicted, wherein the last longitudinal optical sensor 144 comprises a single longitudinal optical sensor 132 out of the plurality of the longitudinal optical sensors 132 within the longitudinal optical sensor stack 134 which faces away from the object 112. In this embodiment, it is particularly preferred to arrange the last longitudinal optical sensor 144 in the longitudinal optical sensor stack 134 in a manner that a light beam 138 first travels through the plurality of the longitudinal optical sensors 132 within the longitudinal optical sensor stack 134 until it impinges the last longitudinal optical sensor 144.

The last longitudinal optical sensor 144 may be configured in various ways. Thus, the last longitudinal optical sensor 144 can for example be part of the detector 110 within the detector housing 118. Alternatively, the last longitudinal optical sensor 144 may be arranged outside the detector housing 118. It shall be emphasized that embodiments having a different number of longitudinal optical sensors 132 within the longitudinal optical sensor stack 134 are feasible.

Whereas the plurality of the longitudinal optical sensors 132 within the longitudinal optical sensor stack 134 with the exception of the last longitudinal optical sensor 144 preferably are at least partially are transparent, particularly to enabling a high relative intensity at each of these longitudinal optical sensors 132, the last longitudinal optical sensor 144 may either be transparent or intransparent. In case the last longitudinal optical sensor 144 is transparent, it may be feasible to further place an additional optical sensor behind the longitudinal optical sensor stack 134, such as a separate imaging device 157 in a manner that a light beam 138 first travels through the plurality of the longitudinal optical sensors 132 including the last longitudinal optical sensor 144 until it impinges on the imaging device 157.

The imaging device 157 may be configured in various ways. Thus, the imaging device 157 can for example be part of the detector 110 within the detector housing 118. Alternatively, the imaging device 157 may be separately located outside the detector housing 118. The imaging device 157 may be fully or partially transparent or intransparent. The imaging device 157 may be or may comprise an organic imaging device or an inorganic imaging device. Preferably, the imaging device 157 may comprise at least one matrix of pixels, wherein the matrix of pixels is particularly selected from the group consisting of: an inorganic semiconductor sensor device such as a CCD chip and/or a CMOS chip; an organic semiconductor sensor device. The imaging device signal may be transmitted by one or more imaging device signal leads 159 to at least one evaluation device 142 of the detector 110, which will be explained in further detail below.

In a further preferred embodiment, at least two of the longitudinal optical sensors 132 exhibit a differing spectral sensitivity. Preferably, a last longitudinal optical sensor 144, which preferably is intransparent, is configured to absorb all over the spectral ranges of the at least two of the longitudinal optical sensors have the differing spectral sensitivity. By way of example, the differing spectral sensitivity of at least two of the longitudinal optical sensors 132 varies over spectral range in a manner that the at least two of the longitudinal optical sensors 132 are sensitive to a specific color whereas the intransparent last longitudinal optical sensor 144 is adapted to be sensitive to all colors of the visible spectra range. In a specific embodiment, the longitudinal optical sensors 132 with the exception of the last longitudinal optical sensor 144 are each sensitive to a different specific color with little overlap. This feature particularly allows reliably acquiring depth information for a colored object 112 irrespective of the specific color of the object 112, for which information at least two of the longitudinal optical sensors 132 are required, as described above. This feature is realized by the fact that for each color, absorption of the light beam 118 always occurs at least in two of the longitudinal optical sensors 132, i.e. in the one of the longitudinal optical sensor 132 which is sensitive to the specific color of the object 112, as well as in the last longitudinal optical sensor 144 being sensitive to all colors.

With respect to the other features as presented in an exemplary fashion in FIG. 1B, reference is made to the above description of FIG. 1A.

Figure 1C:
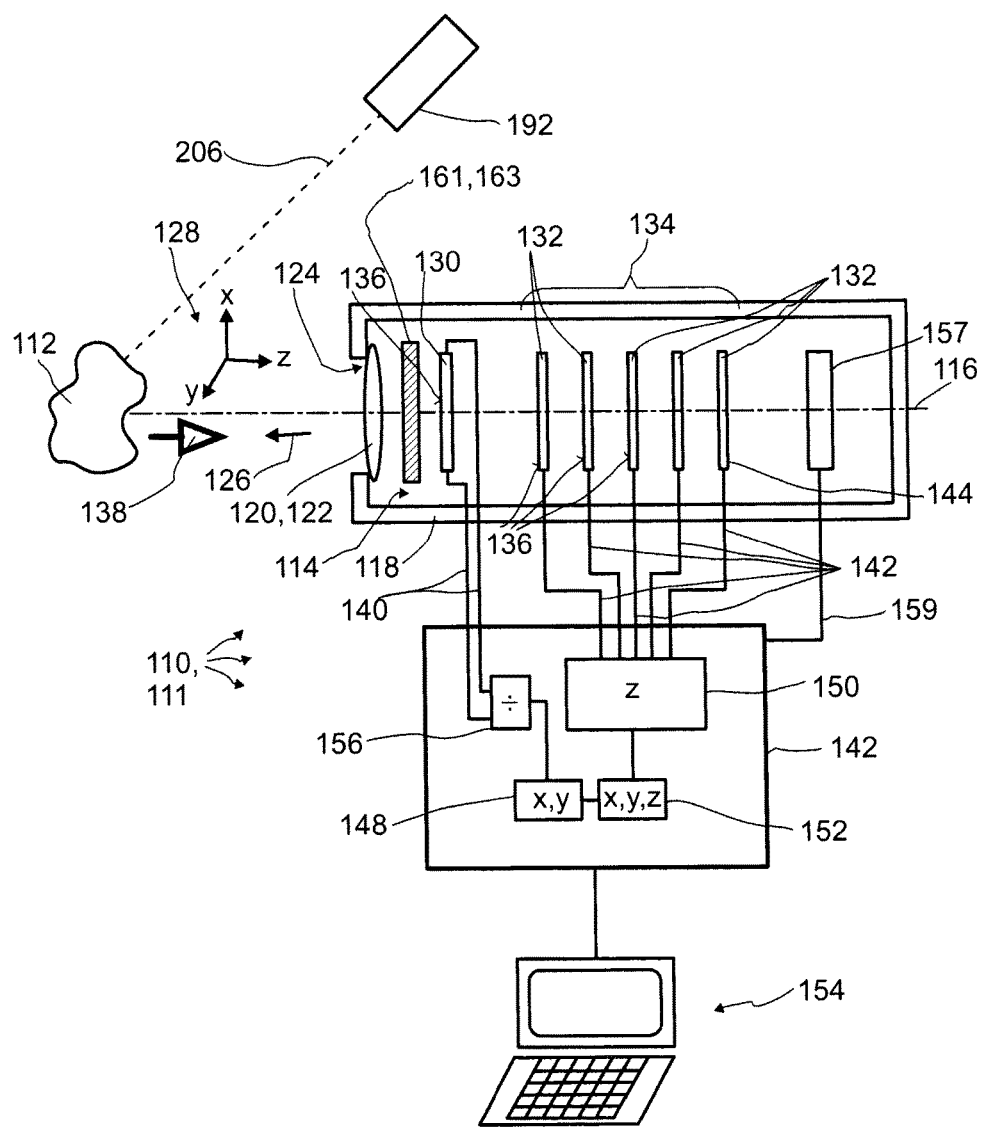
FIG. 1C shows a further exemplary embodiment of a detector according to the present invention.

A further exemplary embodiment of the detector 110 according to the present invention is shown in FIG. 1C in a highly schematic manner. In this particular embodiment, the detector 110 may comprise one or more optically sensitive elements 161 which may particularly be placed along the optical axis 116 of the detector 110. As depicted herein, the optically sensitive element 161 may preferably be located between the transfer device 120, which here comprises one lens 122, and the optical sensor 114, which, in this embodiment, comprises at least one transversal optical sensor 130 and a plurality of longitudinal optical sensors 132 forming a longitudinal optical sensor stack 134. The optically sensitive element 161 may be configured in a number of ways, such as a wavelength-sensitive element, a phase-sensitive element, or a polarization-sensitive element.

As a non-limiting example, a wavelength-sensitive element comprising a color wheel 163 may be employed here as the optically sensitive element 161. Alternative wavelength-sensitive elements may comprise one or more of a prism, a grating, and/or a dichroitic mirror. The color-wheel 163 may especially comprise a circle around which at least two, preferably two to eight, separate segments are arranged which may differ from each other by their optical effect, particularly a grade of transmission, to the impinging light beam 138. Herein, the separate segments may each act as a filter which may allow determining a contribution of the colors red (R), green (G), and blue (B), also designated as "RGB color wheel". Alternatively, the color wheel 163 commonly designated as a "RGB-W color wheel" and additionally comprising a white (W) segment may be employed. As a further alternative, the color wheel 163 may comprise clear or transparent segments which may be used to increase luminous efficiency. Furthermore, the color wheel 163 may, alternatively or additionally, comprise one or more of the colors cyan, yellow, and magenta. A further alternative may comprise a so-called "color drum", wherein the segments are arranged on the inner surface of a drum where the incident light beam may be directed through in order to impinge an optical sensor.

Moreover, a sequential color recapture wheel (SCR wheel) may be generated from RGB dichroic coatings arranged in an Archimedes spiral pattern. Herein, the Archimedes spiral may exhibit the property that the boundaries between two segments may move at a constant speed in radial direction. Furthermore, it may be possible to include also here white or clear segments. Further examples for rotating color wheels, such as known from video beamer devices, and for color drums may be found under the address www.hcinema.de/farbrad.htm.

With respect to the other features as presented in an exemplary fashion in FIG. 1C, reference is made to the above descriptions concerning FIGS. 1A and/or 1B.

Figure 2A:
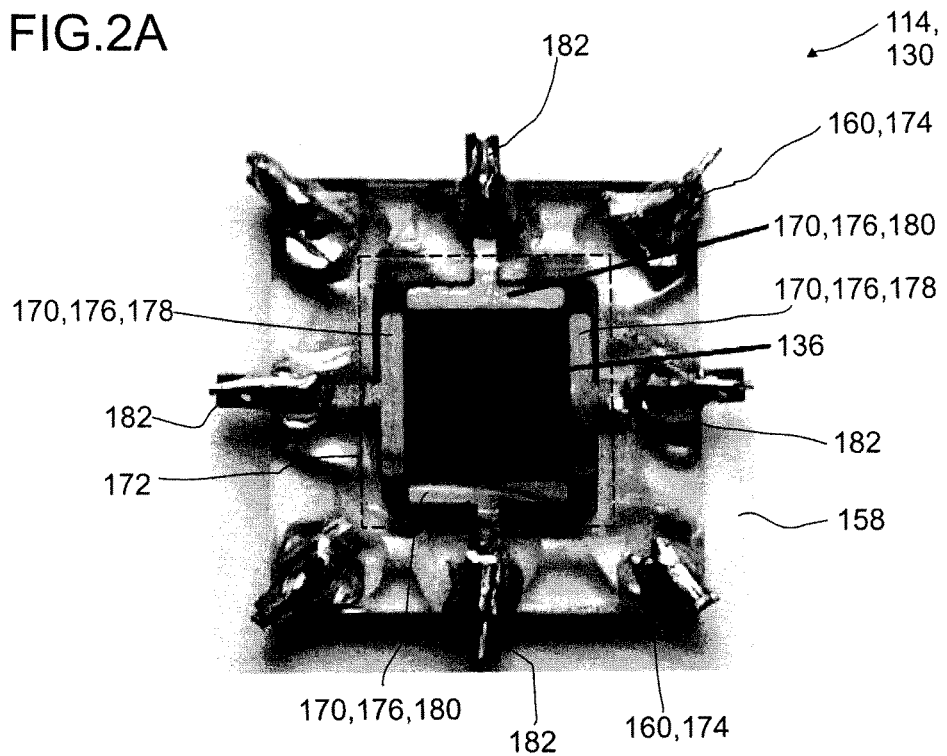
FIGS. 2A and 2B show different views of an embodiment of a transversal detector which may be used in the detector of the present invention.
Figure 2B:
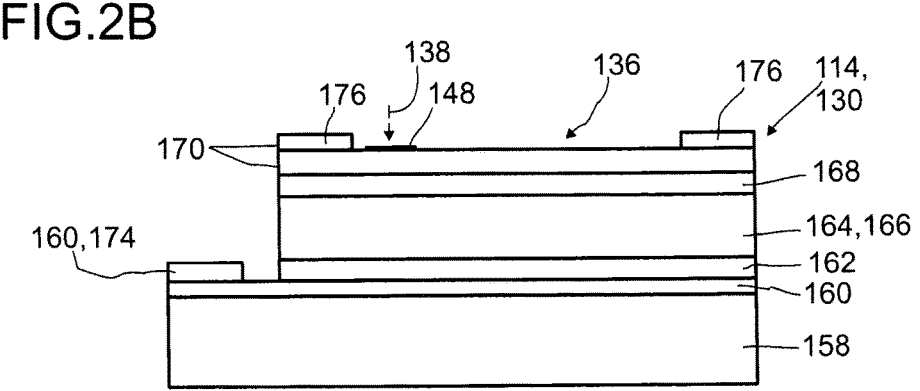

In FIGS. 2A and 2B, different views of a potential embodiment of a transversal optical sensor 130 are depicted. Therein, FIG. 2A shows a top-view on a layer setup of the transversal optical sensor 130, whereas FIG. 2B shows a partial cross-sectional view of the layer setup in a schematic setup. For alternative embodiments of the layer setup, reference may be made to the disclosure above.

The transversal optical sensor 130 comprises a transparent substrate 158, such as a substrate made of glass and/or a transparent plastic material. The setup further comprises a first electrode 160, an optical blocking layer 162, at least one n-semiconducting metal oxide 164, sensitized with at least one dye 166, at least one p-semiconducting organic material 168 and at least one second electrode 170. These elements are depicted in FIG. 2B. The setup may further comprise at least one encapsulation 172 which is not depicted in FIG. 2B and which is symbolically depicted in the top-view of FIG. 2A, which may cover a sensor region 136 of the transversal optical sensor 130.

As an exemplary embodiment, the substrate 158 may be made of glass, the first electrode 160 may fully or partially be made of fluorine-doped tin oxide (FTO), the blocking layer 162 may be made of dense titanium dioxide (TIO2), the n-semiconducting metal oxide 164 may be made of nonporous titanium dioxide, the p-semiconducting organic material 168 may be made of spiro-MiOTAD, and the second electrode 170 may comprise PEDOT:PSS. Further, dye ID504-, as e.g. disclosed in WO 2012/110924 A1, may be used. Other embodiments are feasible.

As depicted in FIGS. 2A and 2B, the first electrode 160 may be a large-area electrode, which may be contacted by a single electrode contact 174. As depicted in the top-view in FIG. 2A, the electrode contacts 174 of the first electrode 160 may be located in corners of the transversal optical sensor 130. By providing more than one electrode contact 174, a redundancy may be generated, and resistive losses over the first electrode 160 might be eliminated, thereby generating a common signal for the first electrode 160.

Contrarily, the second electrode 170 comprises at least two partial electrodes 176. As can be seen in the top-view in FIG. 2A, the second electrode 170 may comprise at least two partial electrodes 178 for an x-direction, and at least two partial electrodes 180 for a y-direction via contact leads 182, these partial electrodes 176 may be contacted electrically through the encapsulation 172.

The partial electrodes 176, in this specific embodiment, form a frame which surrounds the sensor region 136. As an example, a rectangular or, more preferably, a square frame may be formed. By using appropriate current measurement devices, electrode currents through the partial electrodes 176 may be determined individually, such as by current measurement devices implemented into the evaluation device 142. By comparing e.g. electrode currents through the two single x-partial electrodes 178, and by comparing the electrode currents through the individual y-partial electrodes 180, x- and y-coordinates of a light spot 184 generated by the light beam 138 in the sensor region 136 may be determined, as for the outlined with respect to FIGS. 3A to 3D below.

Figure 3A:
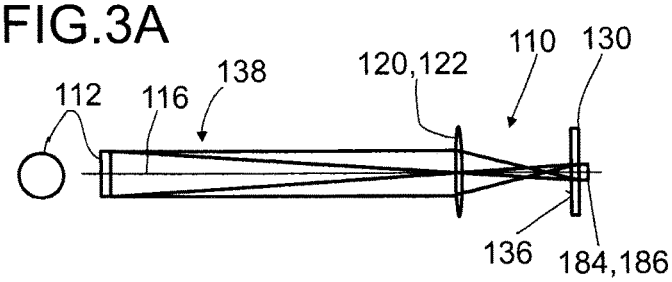
FIGS. 3A to 3D show principles of generating transversal sensor signals and deriving information on a transversal position of an object.
Figure 3B:
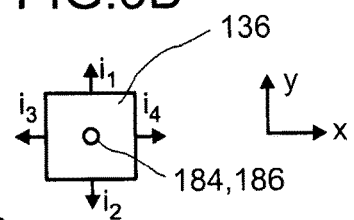

In FIGS. 3A to 3D, two different situations of a positioning of the object 112 are depicted. Thus, FIG. 3A and FIG. 3B show a situation in which the object 112 is located on the optical axis 116 of the detector 110. Therein, FIG. 3A shows a side-view and FIG. 3B shows a top-view onto the sensor region 136 of the transversal optical sensor 130. The longitudinal optical sensors 132 are not depicted in this setup.

Figure 3C:
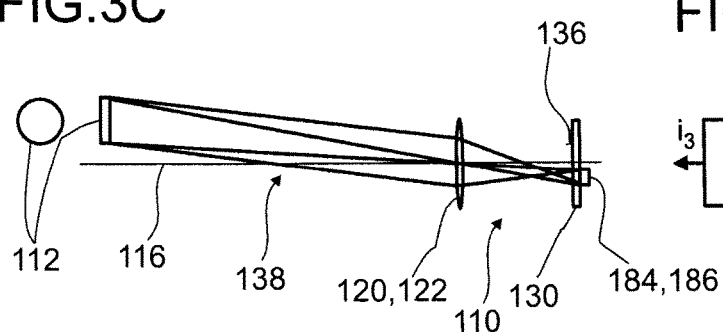
Figure 3D:
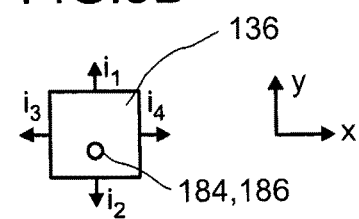

In FIGS. 3C and 3D, the setup of FIGS. 3A and 3B is depicted in analogous views with the object 112 shifted in a transversal direction, to an off-axis position.

It shall be noted that, in FIGS. 3A and 3C, the object 112 is depicted as the source of one or more light beams 138. As will be outlined in further detail below, specifically with respect the embodiment in FIG. 6, the detector 110 may as well comprise one or more illumination sources which may be connected to the object 112 and, thus, which may emit the light beams 138, and/or which might be adapted to illuminate the object 112 and, by the object 112 reflecting primary light beams, generate the light beams 138 by reflection and/or diffusion.

According to well-known imaging equations, the object 112 is imaged onto the sensor region 136 of the transversal optical sensor 130, thereby generating an image 186 of the object 112 on the sensor region 136, which, in the following, will be considered a light spot 184 and/or a plurality of light spots 184.

As can be seen in the partial images 3B and 3D, the light spot 184 on the sensor region 136 will lead, by generating charges in the layer setup of the sDSC, electrode currents, which, in each case, are denoted by $i_1$ to $i_4$. Therein, electrode currents $i_1$, $i_2$ denote electrode currents through partial electrodes 180 in y-direction and electrode currents $i_3$, $i_4$ denote electrode currents through partial electrodes 178 in x-direction. These electrode currents may be measured by one or more appropriate electrode measurement devices simultaneously or sequentially. By evaluating these electrode currents, x- and y-coordinates may be determined. Thus, the following equations may be used:

$$x_0 = f\left(\frac{i_3 - i_4}{i_3 + i_4}\right)$$

and $$y_0 = f\left(\frac{i_1 - i_2}{i_1 + i_2}\right).$$

Therein, f might be an arbitrary known function, such as a simple multiplication of the quotient of the currents with a known stretch factor and/or an addition of an offset. Thus, generally, the electrode currents $i_1$ to $i_4$ might form transversal sensor signals generated by the transversal optical sensor 130, whereas the evaluation device 142 might be adapted to generate information on a transversal position, such as at least one x-coordinate and/or at least one y-coordinate, by transforming the transversal sensor signals by using a predetermined or determinable transformation algorithm and/or a known relationship.

Figure 4A:
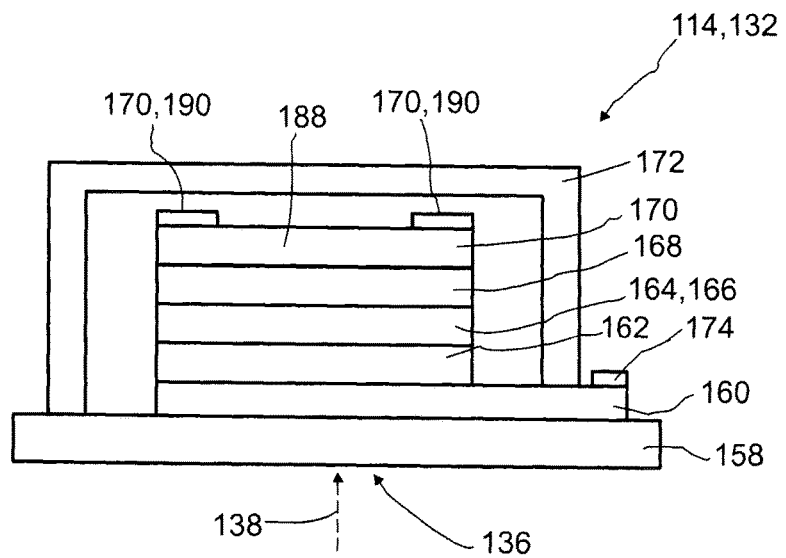
FIGS. 4A to 4C show different views of embodiments of a longitudinal optical sensor which may be used in the detector according to the present invention.
Figures 4B, 4C:
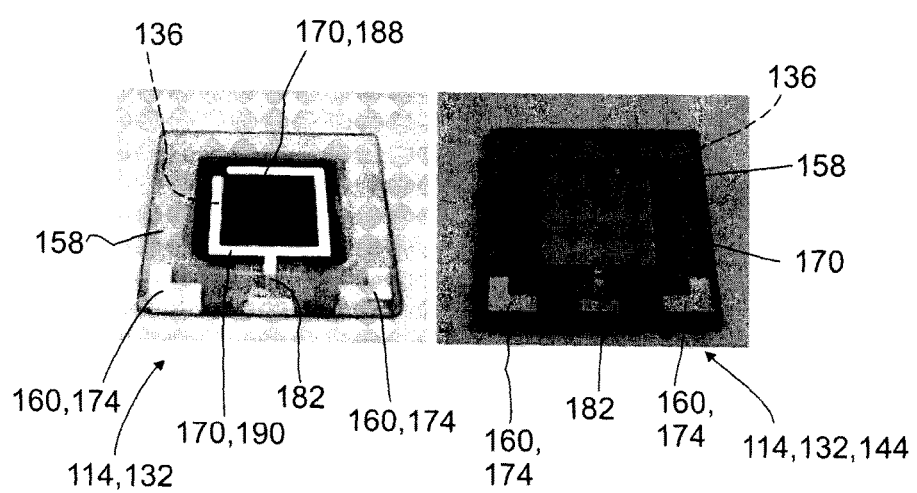

In FIGS. 4A to 4C, various views of longitudinal optical sensors 132 are shown. Therein, FIG. 4A shows a cross-sectional view of a potential layer setup, and FIGS. 4B and 4C show top-view of two embodiments of potential longitudinal optical sensors 132. Therein, FIG. 4C shows a potential embodiment of the last longitudinal optical sensor 144, wherein FIG. 4B shows potential embodiments of the remaining longitudinal optical sensors 132 of the longitudinal optical sensor stack 134. Thus, the embodiment in FIG. 4B may form a transparent longitudinal optical sensor 132, whereas the embodiment in FIG. 4C may be an intransparent longitudinal optical sensor 132. Other embodiments are feasible. Thus, the last longitudinal optical sensor 144, alternatively, might also be embodied as a transparent longitudinal optical sensor 132.

As can be seen in the schematic cross-sectional view in FIG. 4A, the longitudinal optical sensor 132 again, might be embodied as an organic photo-detector, preferably as an sDSC. Thus, similarly to the setup of FIG. 2B, a layer setup using a substrate 158, a first electrode 160, a blocking layer 162, an n-semiconducting metal oxide 164 being sensitized with a dye 166, a p-semiconducting organic material 168 and a second electrode 170 may be used. Additionally, an encapsulation 172 may be provided. For potential materials of the layers, reference may be made to FIG. 2B above. Additionally or alternatively, other types of materials may be used.

It shall be noted that, in FIG. 2B, an illumination from the top is symbolically depicted, i.e. an illumination by the light beam 138 from the side of the second electrode 170. Alternatively, an illumination from the bottom, i.e. from the side of the substrate 158 and through the substrate 158, may be used. The same holds true for the setup of FIG. 4A.

However, as depicted in FIG. 4A, in a preferred orientation of the longitudinal optical sensor 132, an illumination by the light beam 138 preferably takes place from the bottom, i.e. through the transparent substrate 158. This is due to the fact that the first electrode 160 may easily be embodied as a transparent electrode, such as by using a transparent conductive oxide, such as FTO. The second electrode 170, as will be outlined in further detail below may either be transparent or, specifically, for the last longitudinal optical sensor 144, intransparent.

In FIG. 4B and FIG. 4C, different setups of the second electrode 170 are depicted. Therein, in FIG. 4B, corresponding to the cross-sectional view of FIG. 4A, the first electrode 160 may be contacted by one or more electrode contacts 174, which, as an example, may comprise one or more metal pads, similar to the setup in FIG. 2B. These electrode contacts 174 may be located in the corners of the substrate 158. Other embodiments are feasible.

The second electrode 170, however, in the setup of FIG. 4B may comprise one or more layers of a transparent electrically conductive polymer 188. As an example, similar to the setup of FIGS. 2A and 2B, PEDOT:PSS may be used. Further, one or more top contacts 190 may be provided, which may be made of a metallic material, such as aluminum and/or silver. By using one or more contact leads 182, leading through the encapsulation 172, this top contact 190 may be electrically contacted.

In the exemplary embodiment shown in FIG. 4B, the top contact 190 forms a closed opened frame surrounding the sensor region 136. Thus, as opposed to the partial electrodes 176 in FIGS. 2A and 2B, only one top contact 190 is required. However, the longitudinal optical sensor 132 and the transversal optical sensor 130 may be combined in one single device, such as by providing partial electrodes in the setup of FIGS. 4A to 4C. Thus, in addition to the FiP effect which will be outlined in further detail below, transversal sensor signals may be generated with the longitudinal optical sensor 132. Thereby, a combined transversal and longitudinal optical sensor may be provided.

The use of the transparent electrically conductive polymer 188 allows for an embodiment of the longitudinal optical sensor 132 in which both the first electrode 160 and the second electrode 170 are at least partially transparent. The same, preferably, holds true for the transversal optical sensor 130. In FIG. 4C, however, a setup of the longitudinal optical sensor 132 is disclosed which uses an intransparent second electrode 170. Thus, as an example, the second electrode 170 may be embodied by using one or more metal layers, such as aluminum and/or silver, instead of or in addition to the at least one electrically conductive polymer 188. Thus, as an example, the electrically conductive polymer 188 may be replaced or may be reinforced by one or more metal layers which, preferably, may cover the full sensor region 136.

In FIGS. 5A to 5E, the above-mentioned FiP effect shall be explained. Therein, FIG. 5A shows a side-view of a part of a detector 110, in a plain parallel to the optical axis 116, similar to the setup in FIGS. 1, 3A and 3C. Of the detector 110, only the longitudinal optical sensors 132 and the transfer device 120 are depicted. Not shown is at least one transversal optical sensor 130. This transversal optical sensor 130 may be embodied as a separate optical sensor 114 and/or may be combined with one or more of the longitudinal optical sensors 132.

Again, the measurement starts with an emission and/or reflection of one or more light beams 138 by at least one object 112. The object 112 may comprise an illumination source 192, which may be considered as a part of the detector 110. Additionally or alternatively, a separate illumination source 192 may be used.

Due to a characteristic of the light beam 138 itself and/or due to beam shaping characteristics of the transfer device 120, preferably of the at least one lens 122, the beam properties of the light beam 138 in the region of the longitudinal optical sensors 132 at least partially are known. Thus, as depicted in FIG. 5A, one or more focal points 194 might occur. In the focal point 194, a beam waist or a cross-section of the light beam 138 may assume a minimum value.

In FIG. 5B, in a top-view onto the sensor regions 136 of the longitudinal optical sensors 132 in FIG. 5A, a development of the light spots 184 generated by the light beam 138 impinging on the sensor regions 136 is depicted. As can be seen, close to the focal point 194, the cross-section of the light spot 184 assumes a minimum value.

In FIG. 5C, a photo current I of the longitudinal optical sensors 132 is given for the five cross-sections of the light spot 184 in FIG. 5B, in case longitudinal optical sensors 132 exhibiting the above-mentioned FiP effect are used. Thus, as an exemplary embodiment, five different photo currents I for the spot cross-sections as shown in FIG. 5B are shown for typical DSC devices preferably sDSC devices. The photo current I is depicted as a function of the area A of the light spot 184, which is a measure of the cross-section of the light spots 184.

As can be seen in FIG. 5C, the photo current I, even if all longitudinal optical sensors 132 are illuminated with the same total power of the illumination, the photo current I is dependent on the cross-section of the light beam 138, such as by providing a strong dependency on the cross-sectional area A and/or the beam waist of the light spot 184. Thus, the photo current is a function both of the power of the light beam 138 and of the cross-section of the light beam 138:

$$I=f(n,a).$$

Therein, I denotes the photo current provided by each longitudinal optical sensor 132, such as a photo current measured in arbitrary units, as a voltage over at least one measurement resistor and/or in amps. n denotes the overall number of photons impinging on the sensor region 136 and/or the overall power of the light beam in the sensor region 136. A denotes the beam cross-section of the light beam 138, provided in arbitrary units, as a beam waist, as a beam diameter of beam radius or as an area of the light spot 134. As an example, the beam cross-section may be calculated by the $1/e^2$ diameter of the light spot 184, i.e. a cross-sectional distance from a first point on a first side of a maximum intensity having an intensity of $1/e^2$ as compared to the maximum intensity of the light spot 184, to a point on the other side of the maximum having the same intensity. Other options of quantifying the beam cross-section are feasible.

The setup in FIG. 5C shows the photo current of a longitudinal optical sensor 132 according to the present invention which may be used in the detector 110 according to the present invention, showing the above-mentioned FiP effect. Contrarily, FIG. 5D in a diagram corresponding to the diagram of FIG. 5C, photo currents of traditional optical sensors are shown, for the same setup as depicted in FIG. 5A. As an example, silicon photo detectors may be used for this measurement. As can be seen, in these traditional measurements, the photo current or photo signal of the detectors is independent from the beam cross-section A.

Thus, by evaluating the photo currents and/or other types of longitudinal sensor signals of the longitudinal optical sensors 132 of the detector 110, the light beam 138 may be characterized. Since the optical characteristics of the light beam 138 depend on the distance of the object 112 from the detector 110, by evaluating these longitudinal sensor signals, a position of the object 112 along the optical axis 116, i.e. a z-position, may be determined. For this purpose, the photo currents of the longitudinal optical sensors 132 may be transformed, such as by using one or more known relationships between the photo current I and the position of the object 112, into at least one item of information on a longitudinal position of the object 112, i.e. a z-position. Thus, as an example, the position of the focal point 194 may be determined by evaluating the sensor signals, and a correlation between the focal point 194 and a position of the object 112 in the z-direction may be used for generating the above-mentioned information. Additionally or alternatively, a widening and/or narrowing of the light beam 138 may be evaluated by comparing the sensor signals of the longitudinal sensors 132. As an example, known beam properties may be assumed, such as a beam propagation of the light beam 138 according to Gaussian laws, using one or more Gaussian beam parameters.

Further, the use of a plurality of longitudinal optical sensors 132 provides additional advantages as opposed to the use of a single longitudinal optical sensor 132. Thus, as outlined above, the overall power of the light beam 138 generally might be unknown. By normalizing the longitudinal sensor signals, such as to a maximum value, the longitudinal sensor signals might be rendered independent from the overall power of the light beam 138, and a relationship $$I_n=g(A)$$

may be used by using normalized photo currents and/or normalized longitudinal sensor signals, which is independent from the overall power of the light beam 138.

Additionally, by using the plurality of longitudinal optical sensors 132, an ambiguity of the longitudinal sensor signals may be resolved. Thus, as can be seen by comparing the first and the last image in FIG. 5B and/or by comparing the second and the fourth image in FIG. 5B, and/or by comparing the corresponding photo currents in FIG. 5C, longitudinal optical sensors 132 being positioned at a specific distance before or behind the focal point 194 may lead to the same longitudinal sensor signals. A similar ambiguity might arise in case the light beam 138 weakens during propagations along the optical axis 116, which might generally be corrected empirically and/or by calculation. In order to resolve this ambiguity in the z-position, the plurality of longitudinal sensor signals clearly shows the position of the focal point and of the maximum. Thus, by e.g. comparing with one or more neighboring longitudinal sensor signals, it may be determined whether a specific longitudinal optical sensor 132 is located before or beyond a focal point on the longitudinal axis.

In FIG. 5E, a longitudinal sensor signal for a typical example of an sDSC is depicted, in order to demonstrate the possibility of the longitudinal sensor signal and the above-mentioned FiP effect being dependent on a modulation frequency. In this figure, a short-circuit current Isc is given as the longitudinal sensor signal on the vertical axis, in arbitrary units, for a variety of modulation frequencies f. On the horizontal axis, a longitudinal coordinate z is depicted. The longitudinal coordinate z, given in micrometers, is chosen such that a position of a focus of the light beam on the z-axis is denoted by position 0, such that all longitudinal coordinates z on the horizontal axis are given as a distance to the focal point of the light beam. Consequently, since the beam cross-section of the light beam depends on the distance from the focal point, the longitudinal coordinate in FIG. 5E denotes the beam cross-section in arbitrary units. As an example, a Gaussian light beam may be assumed, with known or determinable beam parameters, in order to transform the longitudinal coordinate into a specific beam waist or beam cross-section.

In this experiment, longitudinal sensor signals are provided for a variety of modulation frequencies of the light beam, for 0 Hz (no modulation), 7 Hz, 377 Hz and 777 Hz. As can be seen in the figure, for modulation frequency 0 Hz, no FiP effect or only a very small FiP effect, which may not easily be distinguished from the noise of the longitudinal sensor signal, may be detected. For higher modulation frequencies, a pronounced dependency of the longitudinal sensor signal on the cross section of the light beam may be observed. Typically, modulation frequencies in the range of 0.1 Hz to 10 kHz may be used for the detector according to the present invention, such as modulation frequencies of 0.3 Hz.

Figure 6:
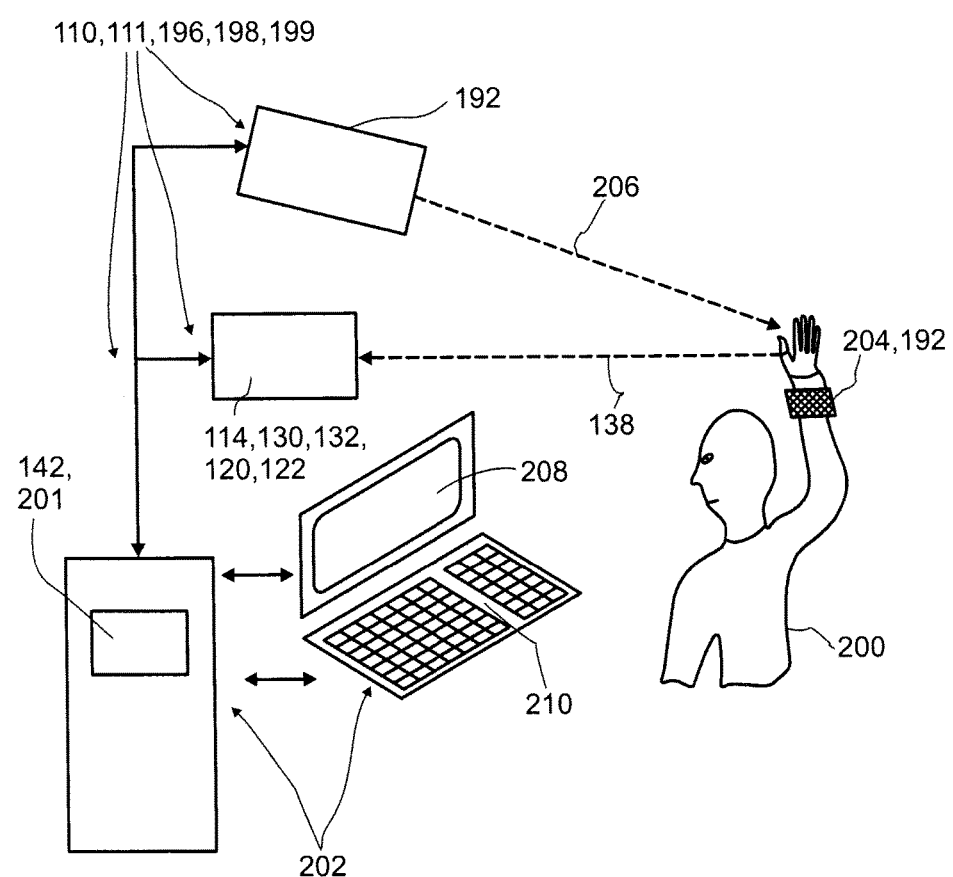
FIG. 6 shows a schematic embodiment of a human-machine interface and of an entertainment device according to the present invention.

Human-Machine Interface, Entertainment Device and Tracking System:

In FIG. 6, an exemplary embodiment of a human-machine interface 196 according to the invention, which can simultaneously also be embodied as an exemplary embodiment of an entertainment device 198 according to the invention or which can be a constituent part of such an entertainment device 198, is depicted. Further, the human-machine interface 196 and/or the entertainment device 198 may also form an exemplary embodiment of a tracking system 199 adapted for tracking a user 200 and/or one or more body parts of the user 200. Thus, a motion of one or more of the body parts of the user 200 may be tracked.

By way of example, at least one detector 110, according to the present invention can once again be provided, for example, in accordance with one or more of the embodiments described above, with one or a plurality of optical sensors 114, which may comprise one or more transversal optical sensors 130 and one or more longitudinal optical sensors 132. Further elements of the detector 110 can be provided, which are not illustrated in FIG. 6, such as, for example, elements of an optional transfer device 120. For a potential embodiment, reference may be made to FIGS. 1A and/or B. Furthermore, one or a plurality of illumination sources 192 may be provided. Generally, with regard to these possible embodiments of the detector 110, reference can be made for example to the description above.

The human-machine interface 196 can be designed to enable an exchange of at least one item of information between a user 200 and a machine 202, which is merely indicated in FIG. 6. For example, in exchange of control commands, and/or information may be performed by using the human-machine interface 196. The machine 202 can comprise, in principle, any desired device having at least one function which can be controlled and/or influenced in some way. At least one evaluation device 142 of the at least one detector 110 and/or a part thereof can, as indicated in FIG. 6, be wholly or partially integrated into said machine 201, but can, in principle, also be formed fully or partially separately from the machine 202.

The human-machine interface 196 can be designed for example to generate, by means of the detector 110, at least one item of geometrical information of the user 200 by means of the detector 110 and can assign the geometrical information at least to one item of information, in particular at least one control command. For this purpose, by way of examples, by means of the detector 110, a movement and/or a change in posture of the user 200 can be identified. For example, as indicated in FIG. 6, a hand movement and/or a specific hand posture of the user 200 may be detected. Additionally or alternatively, other types of geometrical information of the user 200 may be detected by the one or more detectors 110. For this purpose, one or more positions and/or one or more position information regarding the user 200 and/or one or more body parts of the user 200 may be identified by the at least one detector 110. It is then possible to recognize, for example by comparison with a corresponding command list, that the user 200 would like to effect a specific input, for example would like to give the machine 202 a control command. As an alternative or an addition to direct diametrical information about the actual user 200, it is also possible, for example, to generate at least one item of geometrical information about at least one beacon device 204 attached to the user 200, such as at least one item of geometrical information about a garment of the user 200 and/or a glove and/or an article moved by the user 200, such as a stick, a bat, a club, a racket, a cane, a toy, such as a toy gun. One or more beacon devices 204 may be used. The beacon device 204 may be embodied as an active beacon device and/or as a passive beacon device. Thus, the beacon device 204 may comprise one or more illumination sources 192 and/or may comprise one or more reflective elements for reflecting one or more primary light beams 206, as indicated in FIG. 6.

The machine 202 can furthermore comprise one or a plurality of further human-machine interfaces, which need not necessarily be embodied according to the invention, for example, as indicated in FIG. 6, at least one display 208 and/or at least one keyboard 210. Additionally or alternatively, other types of human-machine interfaces may be provided. The machine 202 can, in principle, be any desired type of machine or combination of machines, such as a personal computer.

The at least one evaluation device 142 and/or parts thereof may further function as a track controller 201 of the tracking system 199. Additionally or alternatively, one or more additional track controllers 201 may be provided, such as one or more additional data evaluation devices. The track controller 201 may be or may comprise one or more data memories, such as one or more volatile and/or non-volatile memories. In this at least one data memory, a plurality of subsequent positions and/or orientation of one or more objects of parts of an object may be stored, in order to allow for storing a past trajectory. Additionally or alternatively, a future trajectory of the object and/or parts thereof may be predicted, such as by calculation, extrapolation or any other suitable algorithm. As an example, a past trajectory of an object or a part thereof may be extrapolated to future values, in order to predict at least one of a future position, a future orientation and a future trajectory of the object or a part thereof.

In the context of an entertainment device 198, said machine 202 can be designed for example to carry out at least one entertainment function, for example at least one game, in particular with at least one graphical display on the display 208 and, optionally, a corresponding audio output. The user 200 can input at least one item of information, for example via the human-machine interface 196 and/or one or more other interfaces, wherein the entertainment device 198 is designed to alter the entertainment function in accordance with the information. By way of example, specific movements or one or more virtual articles, for example of virtual persons in a game and/or movements of virtual vehicles in a game, may be controlled by means of corresponding movements of the user 200 and/or one or more body parts of the user 200, which, in turn, may be recognized by the detector 110. Other types of control of at least one entertainment function by the user 200, by means of the at least one detector 110, are also possible.

Exemplary Embodiments of sDSCs for a 3-D Position Sensor:

The practical implementation of the FiP-effect of the sDSCs in the form of a 3-D sensor, and achieving good spatial resolution both in the x,y- and in the z-direction, typically may require the cells to have an active area of approximately 1 cm×1 cm and meet certain requirements. Therefore, in the following, preferred requirements for the individual cells of the at least one transversal optical sensor and/or the at least one longitudinal optical sensor are given. It shall be noted, however, that other embodiments are feasible.

Optical Properties of the at Least One Transversal Optical Sensor and/or the at Least One Longitudinal Optical Sensor:

As can be seen in FIGS. 5A to 5C, one particular current signal can imply two different spatial points (in front and behind the focus). In order to obtain unambiguous depth information on the z-axis, therefore, preferably at least two cells need to be arranged one behind the other. Unambiguous information is then derived from the ratio between the current signals of the two cells. For the sake of precise z-information, this sensor should have six cells stacked behind each other. This requires the cells to be transparent, i.e. the back electrode that normally consists of vapor-deposited silver across its entire area needs to be replaced by a transparent conducting material.

To ensure that sufficient illumination reaches the last cell and it supplies a useful current signal, the front five cells may have only low absorption at the excitation wavelength. The wavelength used for excitation should be around 700 nm.

Cross-Resistance of the Transversal Optical Sensors:

To achieve precise x,y resolution, there has to be a sufficient potential difference between each pair of opposite sides in this square cell. FIG. 2A shows such a transparent cell with which the x,y resolution is possible.

Even without a silver back electrode, sufficiently good electron transport from the p-type conductor into the oxidized dye has to be ensured across the entire surface area of the cells so that the dye is regenerated rapidly by a supply of electrons. Since the p-type conductor itself has very low conductance ($10^{-5}$ S/cm), a conducting layer needs to be coated onto the p-type conductor. Thanks to this additional layer, a defined cross-resistance R is to be achieved between the opposite sides of this square cell.

Transparency of the Transversal Optical Sensors:

Due to their good conductance, normal solar cells have back electrodes (second electrodes) made of silver. The cells being developed here, however, have to be transparent, which is why the 1 $cm^2$ cell area typically requires a transparent back electrode. The material preferably used for this purpose is the conducting polymer poly(3,4-ethylene-dioxythiophene)-poly(styrenesulfonate) (PEDOT:PSS) in aqueous dispersion. The conjugated polymer PEDOT:PSS is highly transparent; it absorbs in the blue-green region (450-550 nm) only at considerable layer thicknesses, and only minimally in the red spectral range.

The additional PEDOT layer makes possible good electron transport in the p-type conductor. To improve the conductance of this layer and provide contacts, four silver electrodes 1 cm in length are vapor-deposited around the square cell. The arrangement of the silver electrodes is shown in FIG. 3.3a. FIG. 3.3b shows a cell with a transparent PEDOT back electrode.

Extinction of the Cells of the at Least One Transversal Optical Sensor and/or the at Least One Longitudinal Optical Sensor:

It is not only the back electrode that has to be transparent, but the entire cell. To ensure that a sufficient amount of light still reaches the last cell in the stack, the extinction of the front five cells should be as low as possible. This is determined first and foremost by the dye's absorption. The extinction of a solar cell, i.e. the absorption of light by the dye, has a decisive effect on the cell's output current. Typically, the wavelength-dependent absorption spectrum has a maximum—the wavelength of maximum absorption is characteristic of the particular dye used. The more dye has been adsorbed in the np TiO2 layer, the higher the cell's absorption. The more dye molecules are adsorbed, the more electrons can reach the cb of the TiO2 through optical excitation and the higher the current. A cell with higher extinction will, therefore, have a higher output current than one with low extinction.

The objective here is to obtain the maximum total current from the complete cell arrangement—which in the ideal case is divided equally among all the cells. Since the intensity of the light is attenuated by absorption in the cells, the ones located further back in the stack receive less and less light. In order, nonetheless, to obtain similar output currents from all six cells, it would make sense for the front cells to have lower extinction than the ones at the back. As a result, they will stop less of the light reaching the following cells, which in turn will absorb a larger proportion of the already weakened light. Through optimal adjustment of the extinctions at the positions of the cells in the stack, in this way theoretically one could obtain the same current from all the cells.

The extinction of a solar cell can be adjusted by staining with a dye and by controlling the thickness of the np TiO2 layer.

Optimizing the Extinction and the Output Current of the Cells of the Longitudinal Optical Sensor Stack:

The last cell in the stack preferably should absorb almost all the incident light. For this reason, this cell should have maximum extinction. Starting with the current obtained under maximum extinction at the last cell, the extinctions of the front cells need to be so adjusted that all cells together supply a maximum total current, one that is distributed as uniformly as possible across all the cells.

Optimizing the stack's output currents is carried out as follows:

The choice of dye

Maximum extinction/maximum output current of the last cell

Dye concentration for staining the last cell

Staining time of the last cell

Optimum thickness of the last cell's np $TiO_2$ layer

Maximum output current of the complete stack

Optimum thickness of the np $TiO_2$ layers of the front five cells

The extinction was measured with a Zeiss spectrometer MCS 501 UV-NIR using Zeiss lamp MCS 500. The results were evaluated with an Aspect Plus software program.

Choice of Dye:

To begin with, a dye should to be found that absorbs sufficiently at the excitation wavelength of approximately 700 nm. The ideal dye for solar cells typically has a broad absorption spectrum and should absorb completely the incident light below a wavelength of ca. 920 nm. In actual fact, most dyes have an absorption maximum in the wavelength range between 450-600 nm; above 650 nm they usually absorb weakly or not at all.

The dye with which the first experiments were performed was ID504, as e.g. disclosed in WO 2012/110924 A1. This dye, however, turned out to exhibit only a low absorption in the range of 700 nm. Therefore, for the stack, the dye D-5 (also referred to as ID 1338) was used:

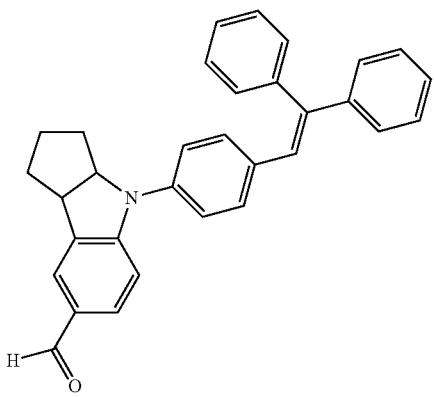 [SMILES: O=Cc1ccc2c(c1)C1CCCC1N2c1ccc(C=C(c2ccccc2)c2ccccc2)cc1]

Preparation and properties of the Dye D-5 are disclosed in WO 2013/144177 A1.

Additionally or alternatively, however, other dyes may be used. The staining time, i.e. the duration of staining of the $TiO_2$-layer with the respective dye, turned out to have an influence on the absorption properties. The tests were performed with cells having np $TiO_2$ layers having a thickness of 1.3 microns. The absorption maximum of D-5 is around 550-560 nm which exhibits an extinction $\varepsilon \approx 59000$ at this maximum.

In this experimental series, the dye concentration was 0.3 mM and the staining time was increased so as to be 10 to 30 minutes. A pronounced increase in extinction at longer staining times was observed, so finally staining times of 30 min. were used for D-5.

Still, even after optimizing the staining time, the absorption was determined to be rather very low. Therefore, generally, the absorption will have to be maximized by increasing the dye concentration, the staining time and the thickness of the np $TiO_2$ layer.

Dye Concentration and Staining Time of the Last Cell in the Longitudinal Optical Sensor Stack:

Several experiments regarding the staining time and the dye concentration were performed. The standard concentration of the dye solution for a layer thickness of the $TiO_2$-layers of 1-2 microns was 0.5 mM. At these concentrations, the dye should already be present in excess. Here the dye concentration was increased to 0.7 mM. In order to prevent inhomogeneities across the cell's area, the dye solution was cleaned by removing undissolved dye particles and other impurities, using a 0.2 micron syringe filter, before placing the cells in it.

If the dye is present in excess, then after a 1 hour staining time a dye monolayer dye should have been adsorbed to the surface of the np $TiO_2$ layer, which leads to maximum absorption by the dye being used. The maximum staining time tested here was 75 minutes, which was finally used for the cells.

Finally, cells having a layer thickness of the $TiO_2$-layer of 1.3 microns, a dye concentration of 0.7 mM and a staining time of 75 min was used. The cell's extinction turned out to be 0.4 at 700 nm.

The np $TiO_2$ Layer Thickness of the Last Cell of the Longitudinal Optical Sensor Stack:

Ultimately, the thickness of the nanoporous (np) layer and thus the $TiO_2$ surface area available for dye adsorption may be an important factor influencing the absorption behavior and therefore the cells' output current. So far, maximizing the extinction was done in cells with np $TiO_2$ layers whose thickness was 1.3 microns. Since more dye can be adsorbed in thicker np $TiO_2$ layers, the thickness of the $TiO_2$ layer was increased in steps to 3 microns, and the thickness at which the greatest output current occurred was determined.

The nanoporous $TiO_2$ layers were applied by spin coating. Spin coating is suitable for applying low-volatility substances dissolved in a high-volatility solvent (here: terpineol). As a starting product, $TiO_2$ paste made by Dyesol (DSL 18 NR-T) was used. This paste was mixed with terpineol, which decreases the viscosity of the paste. Depending on the composition ratio of the paste:terpineol mixture, and at a constant spin velocity of 4500 l/min, np $TiO_2$ layers of varying thicknesses are obtained. The higher the terpineol proportion, the lower the viscosity of the diluted paste and the thinner the cells will be.

The diluted $TiO_2$ paste was also cleaned using a 1.2 micron syringe filter to remove larger particles, before applying the paste the next day by spin coating on the cells coated with blocking layer.

When varying the np $TiO_2$ layer thickness, it should be noted that the concentration of the p-type conductor dissolved in chlorobenzene needs to be adjusted. Thicker np layers have a larger cavity volume that has to be filled with p-type conductor. For this reason, in the case of thicker np layers the amount of supernatant p-type conductor solution on top of the np layer is smaller. To ensure that the solid p-type conductor layer remaining on the np $TiO_2$ layer after spin coating has a constant thickness (the solvent evaporates during spin coating), higher p-type conductor concentrations are needed for thick np $TiO_2$ layers than for thin ones. The optimal p-type conductor concentrations are not known for all the $TiO_2$ layer thicknesses tested here. For this reason, the p-type conductor concentration is varied for the unknown layer thicknesses and the output currents compared for equal layer thicknesses but different p-type conductor concentrations.

The chosen starting value for the layer thickness variation was a 1.3 microns for the np $TiO_2$ layer. 1.3 microns corresponds to a $TiO_2$ paste:terpineol mass composition of 5 g:5 g. A test series with cells whose np $TiO_2$ layers are thicker than 1.3 microns will show at which layer thickness the largest output current is obtained from the last cell in the stack.

These cells were stained with the aforementioned optimized parameters for maximum extinction (D-5; c=0.7 mM; staining time: 75 minutes). The extinction of these cells was found to be approximately 0.6 at 700 nm.

Since the last cell generally does not have to be transparent, the back electrode was vapor-deposited on the whole 1 cm² area directly onto the p-type conductor—without PEDOT.

The measurement results indicated that, as expected, the output currents of the cells with a whole-area back electrode (second electrode) are much higher. Highest output currents were obtained with a $TiO_2$:terpineol mass ratio of 5:3. This corresponds to a $TiO_2$ layer thickness of 2-3 microns.

Therefore, in subsequent experiments, a $TiO_2$ paste:terpineol composition of 5:3 was used for the last cell in the stack. The back electrode was vapor-deposited across the entire 1 cm² cell area.

The np $TiO_2$ Layer Thickness of the Front Cells of the Longitudinal Optical Sensor Stack:

Starting from the maximum output current obtained with the last cell, the thicknesses of the front cells' np $TiO_2$ layers are to be so adjusted that every cell in the stack generates the maximum possible output current. This requires low extinction values in the front cells.

During the experiments, it turned out that, in practical terms, it is rather difficult to obtain reproducible low extinctions through the dye concentration and staining time parameters. In order to make cells with low, reproducible extinction, therefore, it makes sense to fabricate cells with thin np $TiO_2$ layers and to keep them in the dye solution for the time needed to ensure dye saturation of the np $TiO_2$ surface. The terpineol proportion in the $TiO_2$ layers was increased in a stepwise fashion. All the cells were stained under the same conditions. Since their extinction is intended to be decreased significantly, the dye concentration here was 0.5 mM, and the staining time was 60 minutes.

Surprisingly, in this series, the cell's output voltages turned out to begin with an increase in output current with decreasing lip $TiO_2$ layer thickness. The optimum out of the tested $TiO_2$ paste dilutions turned out to be 5:6. At higher dilutions and therefore thinner np $TiO_2$ layers, the output current tends to decrease. The reason for the exception to this trend at a dilution of 5:9 is likely to be optimal adjustment of the p-type conductor concentration of 100 mg/ml for this layer thickness.

If, however, one considers the decrease in extinction relative to that of the output current, it makes sense to accept the lower output current in order to ensure that the following cells receive very much more light than would be the case with 5:6 dilution. Photographs of cells with TiO2:terpineol mixtures of 5:4.1, 5:6 and 5:10 were taken, which illustrated this effect. Effects of inhomogeneity were observed. In order to achieve a homogeneous layer within a 1 cm² cell, the $TiO_2$ area was increased for later cells such that the region in which the $TiO_2$ banks up during spin coating lies outside the silver electrodes and thus outside the cell.

The construction of the cell stack with regard to the $TiO_2$ layer's thickness in the cells and their positioning in the stack, was carried out by testing various arrangements of cells with np $TiO_2$ layers of various thicknesses.

Preparation and the Properties of a Dye Sensitized Solar Cell (DSC) Prepared with the Dye D-5

FTO (tin oxide doped with fluorine) glass substrates (<12 ohms/sq, A11DU80, supplied by AGC Fabritech Co., Ltd.) were used as the base material, which were successively treated with glass cleaner, Semico Clean (Furuuchi Chemical Corporation), fully deionized water and acetone, in each case for 5 min in an ultrasonic bath, then baked for 10 minutes in isopropanol and dried in a nitrogen flow.

A spray pyrolysis method was used to produce the solid $TiO_2$ buffer layer. Titanium oxide paste (PST-18NR, supplied by Catalysts & Chemicals Ind. Co., Ltd.) was applied onto the FTO glass substrate by screen printing method. After being dried for 5 minutes at 120° C., a working electrode layer having a thickness of 1.6 μm was obtained by applying heat treatment in air at 450° C. for 30 minutes and 500° C. for 30 minutes. Obtained working electrode is then treated with $TiCl_4$, as described by M. Grazel et al., for example, in Grätzel M. et al., Adv. Mater. 2006, 18, 1202. After sintering the sample was cooled to 60 to 80° C. The sample was then treated with an additive as disclosed in WO 2012/001628 A1. 5 mM of the additive in ethanol was prepared and the intermediate was immersed for 17 hours, washed in a bath of pure ethanol, briefly dried in a nitrogen stream and subsequently immersed in a 0.5 mM solution of dye D-5 in a mixture solvent of acetonitrile+t-butyl alcohol (1:1) for 2 hours so as to adsorb the dye. After removal from the solution, the specimen was subsequently washed in acetonitrile and dried in a nitrogen flow.

A p-type semiconductor solution was spin-coated on next. To this end a 0.165M 2,2',7,7'-tetrakis(N,N-di-p-methoxy-phenyl-amine)-9,9'-spirobifluorene (spiro-MeOTAD) and 20 mM $LiN(SO_2CF_3)_2$ (Wako Pure Chemical Industries, Ltd.) solution in chlorobenzene was employed. 20 μll/cm² of this solution was applied onto the specimen and allowed to act for 60 s. The supernatant solution was then spun off for 30 s at 2000 revolutions per minute. The substrate was stored overnight under ambient conditions. Thus, the HTM was oxidized and for this reason the conductivity increased.

As the metal back electrode, Ag was evaporated by thermal metal evaporation in a vacuum at a rate of 0.5 nm/s in a pressure of $1\times10^{-5}$ mbar, so that an approximately 100 nm thick Ag layer was obtained.

In order to determine the photo-electric power conversion efficiency η of the above photoelectric conversion device, the respective current/voltage characteristic such as short-circuit current density $J_{sc}$, open-circuit voltage $V_{oc}$ and fill factor FF was obtained with a Source Meter Model 2400 (Keithley Instruments Inc.) under the illumination of an artificial sunlight (AM 1.5, 100 mW/cm² intensity) generated by a solar simulator (Peccell Technologies, Inc). As a result, the DSC prepared with the Dye D-5 exhibited the following parameters:

| $J_{sc}$ [mA/cm²] | $V_{oc}$ [mV] | FF [%] | η [%] |
|---|---|---|---|
| 10.5 | 721 | 59 | 4.5 |

Results of the Optimized Output Currents for the Longitudinal Optical Sensor Stack:

The best result in terms of the cell stack's output currents were obtained when all five transparent cells of the longitudinal optical sensors step have an np $TiO_2$ layer thickness of 0.45 micrometers (i.e. a $TiO_2$ paste dilution of 5:10). These cells with a 0.45 micrometers np $TiO_2$ layer were stained for 60 minutes in a 0.5 mM dye solution. Only the last cell had a np $TiO_2$ layer just under 3 micrometers and was stained for 75 minutes (0.7 mM). Since the last cell does not have to be transparent, the back electrode (second electrode) of the last cell was a vapor-deposited silver layer across the whole 1 cm² area so as to be able to pick up the maximum possible current. The following photo currents were observed with this stack, in order from the first cell to the last cell of the stack:

| Current [μA]: | 37 | 9.7 | 7.6 | 4.0 | 1.6 | 1.9 |
|---|---|---|---|---|---|---|

The first five cells were made identically. The last cell had a thicker np $TiO_2$ layer and a silver back electrode vapor-deposited across the whole cell area. One can see that the current of the second cell has already dropped to ¼ of the first cell's. Even in these five highly transparent cells, the last cell's current is only a fraction of the current in the first cell. The cells were excited with a red laser (690 nm, 1 mW) directed at the centre of the cell area.

The current obtained with cells with a $TiO_2$:terpineol dilution of 5:9, 5:8 or 5:7 (i.e. thicker cells) was at most 10 microamps larger than the current of a cell with 5:10 dilution of the $TiO_2$ paste. These cells, however, exhibited a significantly higher extinction, as a result of which the output current of the following cells decreases considerably.

The cells with a TiO2 dilution of 5:6, in which—compared with the $TiO_2$ dilutions of 5:9; 5:8 and 5:7—a significantly higher current was obtained, nevertheless absorbed so much light that no more light reaches the last cell of the stack. Even when placing just one of these cells in position 5 with four preceding 450 nm thin cells, the output current of the last cell decreased considerably, such that the last cell supplies practically no more current.

It needs mentioning that each of these cells in the test stack was sealed with an additional glass plate for protection against ambient effects. This, however, created many additional interfaces at which the light beam of the 690 nm laser (1 mW) can be reflected and scattered, as a result of which the extinction of such a sealed cell is higher. In the later device the cell stack was kept in nitrogen, which is why the sealing becomes unnecessary and the cells lie directly on top of each other. This decreased the stack's extinction, since the losses resulting from scattering at the cover glasses no longer occur.

Cross-Resistance of the Transversal Optical Sensors:

A defined cross-resistance between the opposite sides of the square cell makes precise x,y resolution possible. The principle of x,y resolution is illustrated in FIGS. 3A to 3D. The cross-resistance across the area of the cell is determined by the PEDOT layer present between the p-type conductor and the silver electrodes bordering the cell. In the undoped state, PEDOT is a semiconductor. Conductivity is made possible by the system of conjugated double bonds extending across the entire molecule in combination with the doping with a negatively charged counter-ion. The PEDOTs used which were used for the present experiments were all doped with the negatively charged polymer polystyrene sulfonate (PSS). PEDOT:PSS is available in a wide range of embodiments as regards conductance, solid content, ionisation potential (IP), viscosity and pH.

Factors Affecting the Cross-Resistance:

The PEDOT was also applied to the cells by spin coating. During the spinning process, the solvents ethanol and isopropanol evaporate whereas the low-volatility PEDOT remains on the substrate in the form of a film. The resistance of this layer depends on the conductance of the PEDOT being used and on the thickness of the layer:

$$R = \rho \cdot \frac{l}{A}$$

where $\rho$ is the resistivity, l the distance across which the resistance is measured and A the cross-sectional area through which the charge carriers flow (A is a function of the PEDOT layer's thickness).

According to known principles of spin-coating, the layer thickness d to be expected when coating a non-Newtonian fluid can be determined by:

$$d = \sqrt[3]{\frac{3 \cdot x_s^3 \cdot \upsilon_k \cdot e}{2 \cdot (1-x_s) \cdot \omega^2}} \sim \sqrt[3]{\frac{x_s^3 \cdot \upsilon_k}{(1-x_s) \cdot \omega^{3/2}}}$$

where $x_s$ is the PEDOT percentage in the mixed diluted solution, $\upsilon_k$ is the kinematic viscosity, e the evaporation rate of the solvent(s) and $\omega$ the angular velocity during spin coating. The evaporation rate is proportional to $\omega^{1/2}$.

The thickness of the PEDOT layer can, therefore, be affected by various parameters: the angular velocity, the viscosity of the PEDOT solution and the percentage of PEDOT in the solution. The angular velocity can be varied directly. The viscosity and the percentage of PEDOT in the solution can only be affected indirectly, i.e. via the ratio at which the PEDOT is mixed with ethanol and isopropanol.

The following parameters, therefore, can be used in order to adjust the cross-resistance, and they will be optimized in due course:

The choice of PEDOT
The layer thickness of the PEDOT
The PEDOT/solvent ratio
The spin speed during the PEDOT's spin coating
The number of PEDOT layers
The time interval $\Delta t$ between applying and spin coating the PEDOT Optimizing the Cross-Resistance:

The PEDOT solution was mixed with ethanol and isopropanol in a standard volumetric ratio of 1:1:1, and larger particles removed with a 0.45 micrometer syringe filter. The entire cell was covered with this diluted PEDOT solution (approximately 900 microliters were needed per substrate) and spin coated at a speed of 2000 1/s. At this speed, 30 s turned out to suffice to remove and evaporate the solvents ethanol and isopropanol.

The aforementioned parameters were then varied systematically, with the objective of obtaining a cross-resistance of ca. 2 k$\Omega$ between the opposite electrodes of the square cell.

Choice of PEDOT:

The greatest impact on the PEDOT layer's cross-resistance turned out to come from the conductance of the PEDOT solution used. In order to obtain a first impression of the order of magnitude of the resistances of such a PEDOT layer across 1 cm, three PEDOT products with very different conductances were tested:

Clevios™ PVP Al 4083 from Heraeus
Clevios™ PH 1000 from Heraeus
Orgacon™ N-1005 from Sigma Aldrich The relevant parameters of dynamic viscosity $\eta_d$, ionisation potential IP and resistivity $\square$ are summarised in Table 1. The IP is an important selection criterion for the PEDOT. The PEDOT's IP generally should be less than 5 eV in order to ensure good functionality of the cell.

TABLE 1

Relevant parameters for various PEDOTs.

| | Al 4083 | PH 1000 | N-1005 |
|---|---|---|---|
| $\eta_d$ [mPas] | 5-12 | 15-50 | 7-12 |
| IP [eV] | 5.2 | 4.8 | N/A |
| $\rho$ [$\Omega$cm] | 500-5000 | 0.0012 | 75-120 |

For these first tests, 1.3 micrometer np TiO$_2$ layers were coated onto FTO-free glass substrates. In this first experimental series, only 300 microliters of each of the three prepared PEDOT solutions were coated directly on np TiO$_2$ layers—without the staining or p-type conductor coating steps. For each PEDOT solution, three substrates with 1, 2 and 3 PEDOT layers were made. The resistance was measured by applying a layer of conducting silver paint at 1 cm spacing at several positions on each substrate.

It is to be expected that the resistance of the substrate fabricated in this way, will be smaller than the resistance resulting from applying the PEDOT on a smooth p-type conductor layer.

As expected, the experiments showed a decrease in cross-resistance with an increasing number of layers and therefore increasing total thickness of the PEDOT. The cross-resistance of Al 4083 is in the M$\Omega$ range even with three layers, therefore it was not used in further tests. PH 1000 with two applied layers was in the required range. The cross-resistance of N 1005 is also in the kΩ range, and could be decreased through optimization. Since, however, it can be assumed that when applying the PEDOT on the smooth p-type conductor's surface the resistance will be higher than when applying it directly on the np TiO$_2$ layer as in this test series, further optimizations will focus on PH 1000.

Applying Several PEDOT Layers:

A further option for increasing the total thickness of the PEDOT layer is to apply several PEDOT layers consecutively. Tests were conducted with 1 and 2 applied PEDOT layers. PH 1000 was mixed with ethanol and isopropanol at a 1:1:1 volumetric ratio. The cells were covered completely with 900 microliters of the PEDOT solution and the excess solution was removed by spin coating at an RPM of 2000 l/min.

Unlike the first experimental series, these tests were conducted on 'complete' cells, i.e. stained cells coated with p-type conductor. The cross-resistance was measured between two circular vapour-deposited electrodes ca. 2 mm apart, in order to exclude errors resulting from different contact resistances of PEDOT/conducting silver paint and PEDOT/vapour-deposited silver. In addition, cell efficiency measurements can be automated with this electrode arrangement. These test cells are very much simpler and quicker to make than the square transparent ones, but they suffice for the requirements of these tests (for one thing, the cross-resistance of the PEDOT layer(s) is to be measured here across a defined section; for another, the cells are to be tested for functionality, i.e. whether there is good contact between the p-type conductor and the PEDOT and the IP of the PEDOT matches the energy level of the p-type conductor). The cross-resistance across 1 cm is calculated using equation 3.1—assuming equal layer thickness and therefore equal area A—through multiplication by the factor 5 (the resistivity of the solution is constant).

Table 2 shows the results of the resistance measurement between the two circular vapor-deposited back electrodes and the calculated cross-resistances across 1 cm for 1 and 2 PEDOT layers. The last column shows the efficiency of the cells. The smallest and largest measurements obtained in several tests are shown in each case.

TABLE 2

Results of resistance measurements for one and two PEDOT layers.

| Mixture ratio | Number of layers | RPM [1/min] | $R_{l=2\,mm}$ [kΩ] | $R_{l=1\,cm}$ [kΩ] | η [%] |
|---|---|---|---|---|---|
| 1:1:1 | 1 | 2000 | 6-19 | 30-90 | 1.5-2.5 |
|  | 2 |  | 0.18-0.27 | 0.9-1.35 | 0.4-0.6 |

The difference in cross-resistances between one and two applied PEDOT layers can be seen clearly. For one PEDOT layer it is significantly higher than the required 2 kΩ, for two layers it is very much lower. It is also evident, however, that the efficiency of the cells with two applied PEDOT layers is very much smaller, which means that the contact between the two PEDOT layers is poor. It should be noted that the efficiency being measured here refers to the circular cell, i.e. to a cell with a back electrode vapor-deposited across the whole surface. The efficiency of the square transparent cells, therefore, will be much lower still, which is why the idea of several PEDOT layers applied consecutively has to be discarded. Further experiments will attempt to minimize the cross-resistance of one PEDOT layer only.

It is noticeable that the resistance with two applied PEDOT layers is smaller than in the first experimental series, in which the PEDOT was applied directly onto the np TiO$_2$ layer. Presumably, the reason for this discrepancy is that in the first experiments the layers were applied immediately after each other, even though the first PEDOT layer had not yet dried out completely. In this experiment, the cell was placed on the hotplate at 60° C. between applying the two layers.

As expected, in this experimental series—in which the PEDOT was applied onto the p-type conductor—the cross-resistance with only one applied PEDOT layer was higher than when the PEDOT was applied onto the rough surface of the np TiO$_2$.

Increasing the PEDOT Concentration of the Solution:

As mentioned above, usually, the PEDOT solution is mixed with ethanol and isopropanol at a volume ratio of 1:1:1 in order to decrease the viscosity of the solution and obtain homogeneous layers through spin coating. When the PEDOT proportion in the mixture is increased, the solution's viscosity rises. Due to the higher viscosity, an increase in the thickness of the PEDOT layer remaining on the cell after spin coating is expected (for comparison: $\eta_{d,\,ethanol,\,20°\,C.}$=1.19 mPas; $\eta_{d,\,isopropanol,\,20°\,C.}$=2.43 mPas; $\eta_{d,PEDOT}$=5-50 mPas).

In order to investigate the practical effect of the PEDOT solution's viscosity and the amount of substance it contains on layer thickness and therefore on the cross-resistance, the PEDOT proportion was increased a little to begin with, and then significantly. The volumetric mixture ratios ethanol:isopropanol:PEDOT tested here were as follows:

1:1:1
1:1:2
1:1:5
1:1:10
2:2:1

Since a preliminary experiment showed that small variations in PEDOT concentration do not result in significant differences as far as the resistance is concerned, the PEDOT proportion in the mixed solutions was increased considerably. This was the first experimental series in which the construction of the cells and the arrangement of the electrodes corresponded to those of the actual square cells.

The thickness of the cells' np TiO$_2$ layer was 1.3 micrometers. Each time, a PEDOT layer with a different proportion of PH 1000 was applied. The PEDOT solution was spun for 90 seconds at 2000 or 1500 l/min. Then the PEDOT layer was dried for ca. 1 minute with the hot air blower, before the silver electrodes (ca. 2 micrometers thick) were vapor-deposited.

TABLE 3

Cross-resistances for various mixture ratios and spin speeds of PEDOT layers.

| Mixture ratio | Number of layers | RPM [1/min] | R [kΩ] |
|---|---|---|---|
| 1:1:1 | 1 | 2000 | 22-39 |
| 1:1:5 |  |  | 31-51 |
| 1:1:10 |  |  | 29-36 |
| 1:1:1 | 1 | 1500 | 21-27 |
| 1:1:5 |  |  | 21-32 |
| 1:1:10 |  |  | 26-37 |

As can be seen in Table 3, the cross-resistance does not decrease as expected with the increasing PEDOT proportion in the applied solution. Both at an angular velocity of 2000 and of 1500 l/min, the cross-resistance increases with the increasing PEDOT concentration in the solution. However, it is also noticeable that the resistance tends to decrease with decreasing RPM for the same PEDOT proportion, but is still 10-15 orders of magnitude too high.

Adjusting the Time Interval Between Application and Spin Coating of the PEDOT ($\Delta t$) and Minimizing the RPM During Spin Coating:

The classic method for increasing layer thickness during spin coating is to decrease the angular velocity. In this way, layer thickness can easily be increased and the cross-resistance decreased. In the experimental series thus far, this was the only variation that led to a sensible result. The angular velocity during spin coating cannot, however, be decreased to an arbitrary value, since at excessively low RPM the solvent no longer evaporates sufficiently quickly which results in inhomogeneous PEDOT layers.

Tests have shown, however, that the time interval between applying the PEDOT solution to the substrate and starting the spin coating (and thus, removing excess solution from the substrate) has a significant effect on the cross-resistance. Therefore, subsequently, the cross-resistance was minimized through iterative optimization of the two parameters $\Delta t$ and angular velocity during spin coating.

Therefore, over several tests series, the time interval $\Delta t$ between applying the PEDOT solution to the cell and the start of spin coating was increased in steps from 30 seconds to 2 minutes, later in combination with RPM optimization from 1 to 3 minutes and finally from 3.5 to 5 minutes. This involves decreasing the RPM from 2000 l/min to 350 l/min. When decreasing the RPM to under 1000 l/min, 30 seconds turned out to no longer suffice for complete evaporation of the solvent. This time was, therefore, extended to 2 minutes in every case. Thereafter, the cells were dried with the hot air blower for approximately 1 minute before the electrodes were vapor-deposited.

| RPM [1/min] | 2000 | 1000 | 750 | 600 | 500 | 450 | 400 | 350 |
|---|---|---|---|---|---|---|---|---|

The results of the optimization are summarized in Tables 4 to 7.

In the first experimental series of the final optimization (Table 4), in which to begin with the time interval $\Delta t$ between applying the PEDOT solution on the cell and spinning at constant angular velocity was increased, at an RPM of 1000 l/min there seems to be an optimum at $\Delta t=60$ s (4.1-4.2 k$\Omega$). For this time interval and a further decrease in RPM, a new minimum was obtained for 600 l/min (2.6-2.7 k$\Omega$).

TABLE 4

Optimization of the cross-resistance by optimizing the time interval $\Delta t$ and the angular velocity during PEDOT solution spin coating - experimental series 1.

| Mixture ratio | Number of layers | RPM [1/min] | $\Delta t$ [s] | R [k$\Omega$] |
|---|---|---|---|---|
| 1:1:1 | 1 | 1000 | 30 | 8.5-8.7 |
|  |  |  | 60 | 4.1-4.2 |
|  |  |  | 90 | 4.7-4.8 |
|  |  |  | 120 | 5.4-5.8 |
|  |  | 750 | 60 | 9.0-9.2 |
|  |  | 600 | 60 | 2.6-2.7 |
|  |  | 500 | 60 | 3.7-4.0 |

TABLE 5

Optimization of the cross-resistance by optimizing the time interval $\Delta t$ and the angular velocity during PEDOT solution spin coating - experimental series 2.

| Mixture ratio | Number of layers | RPM [1/min] | $\Delta t$ [s] | R [k$\Omega$] |
|---|---|---|---|---|
| 1:1:1 | 1 | 600 | 60 | 15.8-17.6 |
|  |  |  | 90 | 11.0-11.6 |
|  |  |  | 120 | 11.2-11.4 |
|  |  | 500 | 60 | 6.0-6.8 |
|  |  |  | 90 | 5.0 |
|  |  |  | 120 | 6.4-6.8 |
|  |  |  | 180 | 3.1-4.1 |

TABLE 6

Optimization of the cross-resistance by optimizing the time interval $\Delta t$ and the angular velocity during PEDOT solution spin coating experimental series 3.

| Mixture ratio | Number of layers | RPM [1/min] | $\Delta t$ [s] | R [k$\Omega$] |
|---|---|---|---|---|
| 1:1:1 | 1 | 500 | 180 | 0.4 |
|  |  | 450 | 180 | 0.6 |
|  |  | 400 | 180 | 1.1-1.3 |
|  |  | 350 | 180 | 2.0-2.7 |
|  |  | 350 | 210 | 1.8-2.5 |
|  |  | 350 | 240 | 1.6 |
|  |  | 350 | 270 | 1.5-1.8 |
|  |  | 350 | 300 | 1.8-1.9 |

TABLE 7

Optimization of the cross-resistance by optimizing the time interval $\Delta t$ and the angular velocity during PEDOT solution spin coating - experimental series 4.

| Mixture ratio | Number of layers | RPM [1/min] | $\Delta t$ [s] | R [k$\Omega$] |
|---|---|---|---|---|
| 1:1:1 | 1 | 500 | 180 | 1.3-2.4 |
|  |  | 450 | 180 | 1.0-2.0 |

Since, however, the results do not differ substantially between 600 and 500 l/min, in the next experimental series the time interval $\Delta t$ was increased further stepwise for both RPM values. The results are shown in Table 5.

A further decrease in RPM and increase in $\Delta t$ did not exhibit further improvement. In fact, the cross-resistance even increased again at an RPM <450 l/min (see Table 6).

Since the values for 500 and 450 l/min lie very close together, a last comparative test was performed (see Table 7).

It was shown that the cross-resistance at an RPM of 450 l/min is slightly smaller than at 500 l/min. Since, however, no significant is achieved thereby and since PEDOT layers coated at an excessively low RPM are no longer homogeneous, 500 l/min was chosen as the optimal RPM. The time interval $\Delta t$ is then 180 s.

Generally speaking, it is noticeable that the resistance values in the last set of experimental series, where there was a time interval between applying the PEDOT solution to the cell and starting the spinning, do not fluctuate as much within one series for constant parameters as before. In the last experimental series (Table 7), the two cross-resistances were measured on each of four cells (left-right and top-bottom) and the results varied only by ca. 1 k$\Omega$. The fact that in some cases the results from different series vary significantly for the same experimental parameters, is likely to be due to the production of the PEDOT solution since the individual experimental series in themselves provide coherent results.

The spin coater's open lid during the time interval $\Delta t$ may be an important interference factor in these experiments. In one experimental series, it was not closed immediately after applying the PEDOT solution to the cell but only before spin coating. The cross-resistances measured in this experimental series are very much higher and there is a considerable variation in their values between the substrates—but not on any one substrate. It could not be determined exactly why the cross-resistance is so strongly influenced by the time interval $\Delta t$ before the PEDOT solution's spin coating. Perhaps some of the PEDOT solution dries and adheres to the cell during this time, resulting in a thicker PEDOT layer.

Results of the Optimized Parameters:

The minimum cross-resistance obtained in this way lies between 1 and 3 k$\Omega$. The parameters that bring about a minimum cross-resistance here were:

PEDOT: Clevios☐ PH 1000 from Heraeus
Number of layers: 1
PEDOT:ethanol:isopropanol ratio=1:1:1
Time interval between applying and spin coating the PEDOT: $\Delta t=180$ s
RPM during PEDOT spin coating: n=500 l/min (t=120 s)

The Final Cells Used in the Experiments:

The cells used during the optimization process so far were made on thick 2.5 mm TEC 8 glass carriers, with the FTO layer already applied during the fabrication process. They have a highly homogeneous FTO layer, onto which the application of homogeneous np $TiO_2$ layers is possible. This makes possible the fabrication of cells that appear homogeneous to the human eye.

For the technical realization of the sensor stack, however, the cells were made on thin 1 mm special glass carriers made of quartz glass, which were coated subsequently with FTO. Therein, loss carriers with beveled edges were used. The beveled edges served as bases for cells contacts. The silver contacts were vapor-deposited up to the edge of the bevels. This made it possible to contact the cells directly adjacent to each other in the stack individually with pins.

The subsequently applied FTO layer on these special carriers exhibited in part inhomogeneities arising from the fabrication process. The fabrication of homogeneous cells on these carriers turned out to be very difficult, as was shown by generating current diagrams of the final cells. Even in the first cell of the stack which supplied a homogeneous current signal across its entire area, four locations were identified that supplied lower currents due to inhomogeneities. Current diagrams were obtained by exciting the cells with a laser at a wavelength 690 of nm. The laser scanned the cells at 1 mm intervals. The cells were scanned in their final arrangement as a stack, i.e. the current diagram of the last cells was recorded with five 'thin' cells located in front of the last cell.

At the excitation wavelength of 690 nm, the developed cells had an extinction of 0.13. At the maximum (at ca. 550 nm) the extinction of these cells was ca. 0.4. Despite this low absorption by the cells and the fact that the back electrode consists of a poorly conducting—unlike silver—transparent layer, the efficiency of such a cell is still ~0.3% (AM 1.5*), that of the last cell ~2%.

FIGS. 2A, 4B and 4C show the final cells on the 1 mm special glass carriers. The first cell in the stack, which acts as the transversal optical sensor, requires the special electrode arrangement for x,y-resolution. For cells 2-5, which form the longitudinal optical sensor stack, only the total current is needed for z-resolution, which is why the contacting silver electrodes are combined here into one electrode surrounding the cell. Otherwise, however, the first five cells were made identically.

The last cell of the longitudinal optical sensor stack is intended to absorb the remaining light preferably completely, which is why it was chosen to have a significantly higher extinction than the front cells. In addition, it has a back electrode covering its entire area in order to supply maximum output current.

The cell shown in FIG. 2A, which forms the transversal optical sensor, in this experiment, was used only once for x,y resolution at position 1 in the stack. The cells in FIG. 4B were used four times in the entire stack of the optical sensors, i.e. for positions 2-5 of the entire stack. The last cell, which is depicted in FIG. 4C, was used at position 6 of the entire stack of optical sensors. Thus, generally, a stack of optical sensors was formed with the first optical sensor being the transversal optical sensor (FIG. 2A), followed by four transparent longitudinal optical sensors (FIG. 4B) and a last longitudinal optical sensor having the set-top of FIG. 4C.

When illuminating one of these single transparent final cells with a red laser (690 nm, 1 mW), this cell supplied a current of 30-40 microamps. The last longitudinal optical sensor provided a current of approximately 70 µA. The cross-resistance between any two opposite electrodes in the first cell on these special glass carriers turned out to be 0.1 and 0.3 k$\Omega$.

Since the fabrication of transparent cells on the special glass carriers was problematic due to the poor FTO coating, these cells had to be fabricated in large numbers. The cells were screened, and only selected cells were used for the final setup of the detector forming a prototype 3-D sensor. For this screening procedure, specifically for the transversal optical sensor, the cells were excited by a laser beam (690 nm, 1 mW) at the center of the cell. If the cells are homogenous, the currents at all four contacts are equal (I1=I2=I3=I4). By comparing the currents, specific cells were selected for use in the prototype.

The x,y resolution achieved with the detector of the set-top turned out to be approximately 1 mm at a distance of 3 m. The z-resolution of this detective setup turned out to be approximately 1 cm.

LIST OF REFERENCE NUMBERS 110 detector
111 camera
112 object
114 optical sensors
116 optical axis
118 housing
120 transfer device
122 lens
124 opening
126 direction of view
128 coordinate system
130 transversal optical sensor
132 longitudinal optical sensor
134 longitudinal optical sensor stack
136 sensor region
138 light beam
140 transversal signal lead
142 evaluation device
144 last longitudinal optical sensor
146 longitudinal signal leads 148 transversal evaluation unit
150 longitudinal evaluation unit
152 position information
154 data processing device
156 transformation unit
157 imaging device
158 substrate
159 imaging device signal lead
160 first electrode
161 optically sensitive element
162 blocking layer
163 color wheel
164 n-semiconducting metal oxide
166 dye
168 p-semiconducting organic material
170 second electrode
172 encapsulation
174 electrode contact
176 partial electrode
178 partial electrode, x
180 partial electrode, y
182 contact leads
184 light spot
186 image
188 electrically conductive polymer
190 top contact
192 illumination source
194 focal point
196 human-machine interface
198 entertainment device
199 tracking system
200 user
201 track controller
202 machine
204 beacon device
206 primary light beam
208 display
210 keyboard

The invention claimed is:

1. A detector, comprising:
a transversal optical sensor, the transversal optical sensor being adapted to determine a transversal position of at least one light beam traveling from an object to the detector, the transversal position being a position in at least one dimension perpendicular to an optical axis of the detector, the transversal optical sensor being adapted to affect at least one transversal sensor signal; and
a longitudinal optical sensor, wherein the longitudinal optical sensor has at least one sensor region, wherein the longitudinal optical sensor is designed to affect at least one longitudinal sensor signal in a manner dependent on an illumination of the sensor region by the light beam, wherein the longitudinal sensor signal, given the same total power of the illumination, is dependent on a beam cross-section of the light beam in the sensor region.

2. The detector according to claim 1, wherein the transversal optical sensor is a photo detector having at least one first electrode, at least one second electrode and at least one photovoltaic material, wherein the photovoltaic material is located in between the first electrode and the second electrode, wherein the photovoltaic material is adapted to affect electric charges in response to an illumination of the photovoltaic material with light, wherein the second electrode is a split electrode having at least two partial electrodes, wherein the transversal optical sensor has a sensor region, wherein the at least one transversal sensor signal indicates a position of the light beam in the sensor region.

3. The detector according to claim 2, wherein electrical currents through the partial electrodes are dependent on a position of the light beam in the sensor region, wherein the transversal optical sensor is adapted to affect the transversal sensor signal in accordance with the electrical currents through the partial electrodes.

4. The detector according to claim 3, wherein the detector is adapted to derive the information on the transversal position of the object from at least one ratio of the currents through the partial electrodes.

5. The detector according to claim 2, wherein the photo detector is a dye-sensitized solar cell.

6. The detector according to claim 2, wherein the first electrode at least partially is made of at least one transparent conductive oxide, and wherein the second electrode at least partially is made of an electrically conductive polymer.

7. The detector according to claim 1, wherein at least one of the transversal optical sensor and the longitudinal optical sensor is a transparent optical sensor.

8. The detector according to claim 1, wherein the transversal optical sensor and the longitudinal optical sensor are stacked along the optical axis such that a light beam travelling along the optical axis both impinges on the transversal optical sensor and on the longitudinal optical sensor.

9. The detector according to claim 1, wherein the longitudinal optical sensor comprises at least one dye-sensitized solar cell.

10. The detector according to claim 9, wherein the longitudinal optical sensor comprises at least one first electrode, at least one n-semiconducting metal oxide, at least one dye, at least one p-semiconducting organic material, and at least one second electrode.

11. The detector according to claim 10, wherein both the first electrode and the second electrode are transparent.

12. The detector according to claim 1, further comprising an evaluation device, wherein the evaluation device is designed to generate at least one item of information on a longitudinal position of the object from at least one predefined relationship between a geometry of the illumination and a relative positioning of the object with respect to the detector.

13. The detector according to claim 1, further comprising at least one illumination source.

14. The detector according to claim 1, wherein the detector has a plurality of longitudinal optical sensors, wherein the longitudinal optical sensors are stacked.

15. The detector according to claim 14, further comprising an evaluation device, wherein the longitudinal optical sensors are arranged such that a light beam from the object illuminates all longitudinal optical sensors, wherein at least one longitudinal sensor signal is affected by each longitudinal optical sensor, wherein the evaluation device is adapted to normalize the longitudinal sensor signals and to generate the information on the longitudinal position of the object independent from an intensity of the light beam.

16. The detector according to claim 14, wherein a last longitudinal optical sensor is arranged in a manner that the light beam illuminates all other longitudinal optical sensors apart from the last longitudinal optical sensor, until the light beam impinges on the last longitudinal optical sensor, wherein the last longitudinal optical sensor is intransparent with respect to the light beam.

17. The detector according to claim 14, wherein the stack of at least two optical sensors is partially or fully immersed in an oil, in a liquid and/or in a solid material.

18. The detector according to claim 1, wherein the at least one transversal optical sensor and/or the at least one longitudinal optical sensor uses at least two different transparent substrates.

19. The detector according to claim 1, wherein the detector further comprises an imaging device.

20. The detector according to claim 1, wherein the detector further comprises an optically sensitive element.

21. The detector according to claim 20, wherein the optically sensitive element comprises a color wheel, a color drum, and/or a filter wheel using an elliptically polarizing filter.

22. The detector according to claim 1, further comprising an evaluation device, wherein the evaluation device is adapted to generate the at least one item of information on the longitudinal position of the object by determining a diameter of the light beam from the at least one longitudinal sensor signal.

23. The detector according to claim 22, wherein the evaluation device is adapted to compare the diameter of the light beam with known beam properties of the light beam in order to determine the at least one item of information on the longitudinal position of the object.

24. The detector according to claim 1, wherein the longitudinal optical sensor is furthermore designed in such a way that the longitudinal sensor signal, given the same total power of the illumination, is dependent on a modulation frequency of a modulation of the illumination.

25. A human-machine interface comprising the detector according to claim 1, wherein the human-machine interface is designed to generate at least one item of geometrical information of the user by means of the detector wherein the human-machine interface is designed to assign to the geometrical information at least one item of information.

26. An entertainment device suitable for carrying out at least one entertainment function, wherein the entertainment device comprises the human-machine interface according to claim 25, wherein the entertainment device is designed to enable at least one item of information to be input by a player by means of the human-machine interface, wherein the entertainment device is designed to vary the entertainment function in accordance with the information.

27. A tracking system suitable for tracking the position of at least one movable object, the tracking system comprising the detector according to claim 1, the tracking system further comprising a track controller, wherein the track controller is adapted to track a series of positions of the object, each position comprising at least one item of information on a transversal position of the object at a specific point in time and at least one item of information on a longitudinal position of the object at a specific point in time.

28. A camera comprising the detector according to claim 1.

29. The detector according to claim 1, further comprising an evaluation device, wherein the evaluation device is designed to generate at least one item of information on a transversal position of the object by evaluating the transversal sensor signal and to generate at least one item of information on a longitudinal position of the object by evaluating the longitudinal sensor signal.

30. The detector according to claim 1, wherein said detector is part of a scanner for scanning an environment.

31. A method for scanning an environment,
wherein at least one transversal optical sensor of a detector is used, wherein the transversal optical sensor determines a transversal position of at least one light beam traveling from the environment to the detector, the transversal position being a position in at least one dimension perpendicular to an optical axis of the detector, wherein the transversal optical sensor affects at least one transversal sensor signal; and
wherein at least one longitudinal optical sensor of the detector is used, wherein the longitudinal optical sensor has at least one sensor region, wherein the longitudinal optical sensor generates at least one longitudinal sensor signal in a manner dependent on an illumination of the sensor region by the light beam, wherein the longitudinal sensor signal, given the same total power of the illumination, is dependent on a beam cross-section of the light beam in the sensor region.

* * * * *